United States Patent [19]
Anderson et al.

[11] Patent Number: 6,094,575
[45] Date of Patent: Jul. 25, 2000

[54] COMMUNICATION SYSTEM AND METHOD

[75] Inventors: Gary B. Anderson, Carnelian Bay, Calif.; Sherman Gavette, Colorado Springs, Colo.; Charles L. Lindsay, Monument, Colo.; Ryan N. Jensen, Colorado Springs, Colo.

[73] Assignee: Omnipoint Corporation, Colorado Springs, Colo.

[21] Appl. No.: 08/610,193

[22] Filed: Mar. 4, 1996

Related U.S. Application Data

[63] Continuation-in-part of application No. 08/532,466, Sep. 22, 1995, which is a continuation-in-part of application No. 08/284,053, Aug. 1, 1994, which is a continuation-in-part of application No. 08/215,306, Mar. 21, 1994, abandoned, which is a continuation-in-part of application No. 08/146,496, Nov. 1, 1993, abandoned.

[51] Int. Cl.[7] ............................... N04Q 7/20
[52] U.S. Cl. .................... 455/422; 455/415
[58] Field of Search .................... 455/422, 415, 455/434, 452, 453; 370/348, 263, 329

[56] References Cited

U.S. PATENT DOCUMENTS

| | | | |
|---|---|---|---|
| 4,189,677 | 2/1980 | Cooper et al. | 325/321 |
| 4,222,115 | 9/1980 | Cooper et al. | 375/1 |
| 4,247,942 | 1/1981 | Hauer | 375/25 |
| 4,291,410 | 9/1981 | Caples | 375/1 |
| 4,301,530 | 11/1981 | Gutleber | 370/1 |
| 4,324,001 | 4/1982 | Rhodes | 375/90 |
| 4,355,411 | 10/1982 | Reudink et al. | 455/33 |
| 4,418,393 | 11/1983 | Zachiele, Jr. | 364/724 |
| 4,418,425 | 11/1983 | Fennel, Jr. et al. | 455/27 |
| 4,432,089 | 2/1984 | Wurzburg et al. | 370/110.1 |
| 4,455,651 | 6/1984 | Baran | 370/104 |

(List continued on next page.)

FOREIGN PATENT DOCUMENTS

| | | | |
|---|---|---|---|
| 3984485 | 9/1985 | Australia | H04B 7/26 |
| 0189695 | 6/1986 | European Pat. Off. | H04B 7/26 |
| 0326104 | 2/1989 | European Pat. Off. | H04Q 7/04 |
| 3126333 | 5/1991 | Japan | H04B 7/26 |
| 8700370 | 1/1987 | WIPO | H04J 13/00 |
| 9315573 | 8/1993 | WIPO | H04J 13/00 |
| 9318601 | 9/1993 | WIPO | H04L 27/30 |
| 9406217 | 3/1994 | WIPO | H04B 7/005 |
| 9501018 | 1/1995 | WIPO | H04K 1/00 |
| 9503652 | 2/1995 | WIPO | H04B 7/26 |
| 9512296 | 5/1995 | WIPO | H04Q 7/38 |
| 9512943 | 5/1995 | WIPO | H04L 25/02 |

OTHER PUBLICATIONS

Campbell, Colin K., Applications of Surface Acoustice and Shallow Bulk Acoustic Wave, Devices Proc. of the IEEE, Oct. 1989, pp. 1453–1484.

(List continued on next page.)

*Primary Examiner*—Dwayne D. Bost
*Assistant Examiner*—Myron K. Wyche
*Attorney, Agent, or Firm*—Lyon & Lyon LLP

[57] ABSTRACT

A mobile communication system having a layered architecture communicates user and signaling data among components of the communication system in the form of information elements which are encapsulated within packets and which may be passed across one or more system interfaces. The mobile communication system comprises mobile user stations, base stations, and base station controllers and operates as a transparent data pipeline between application end users, such as a telephone service, connected at base station controllers and mobile user stations. In a particular embodiment, the interface between the base station and the user stations is a TDMA interface, and signaling traffic between the base station and each of the user stations is conducted in either a fast control traffic mode or a slow control traffic mode. In the fast control traffic mode, signaling messages are exchanged between the base station and a user station in a plurality of time slots within a timespan of a single time frame; in the slow control traffic mode, signaling messages are exchanged between the base station and a user station in no more than a single time slot within a timespan of a single time frame.

20 Claims, 21 Drawing Sheets

OMNIPOINT PCS2000 SIGNALLING INTERFACE CONTEXT DIAGRAM

U.S. PATENT DOCUMENTS

| | | | |
|---|---|---|---|
| 4,456,793 | 6/1984 | Baker et al. | 179/99 R |
| 4,479,226 | 10/1984 | Prabhu et al. | 375/1 |
| 4,484,028 | 11/1984 | Kelley et al. | 179/2 DP |
| 4,506,372 | 3/1985 | Massey | 375/116 |
| 4,525,835 | 7/1985 | Vance et al. | 370/29 |
| 4,561,089 | 12/1985 | Rouse et al. | 370/18 |
| 4,567,588 | 1/1986 | Jerrim | 370/18 |
| 4,583,048 | 4/1986 | Gumacos et al. | 329/122 |
| 4,587,662 | 5/1986 | Langewellpott | 375/1 |
| 4,601,047 | 7/1986 | Horwitz et al. | 375/2.2 |
| 4,612,637 | 9/1986 | Davis et al. | 370/95 |
| 4,621,365 | 11/1986 | Chiu | 375/1 |
| 4,630,283 | 12/1986 | Schiff | 375/1 |
| 4,653,069 | 3/1987 | Roeder | 380/31 |
| 4,658,096 | 4/1987 | West et al. | 379/59 |
| 4,672,658 | 6/1987 | Kavehrad et al. | 379/63 |
| 4,675,863 | 6/1987 | Paneth et al. | 370/50 |
| 4,680,785 | 7/1987 | Akiyama | 379/57 |
| 4,688,210 | 8/1987 | Eizenhöfer et al. | 370/18 |
| 4,696,051 | 9/1987 | Breedon | 455/33 |
| 4,701,904 | 10/1987 | Darcie | 370/3 |
| 4,703,474 | 10/1987 | Foschini et al. | 370/18 |
| 4,718,080 | 1/1988 | Serrano et al. | 379/59 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,754,453 | 6/1988 | Eizenhöfer | 370/95 |
| 4,765,753 | 8/1988 | Schmidt | 379/60 |
| 4,769,812 | 9/1988 | Shimizu | 370/67 |
| 4,787,093 | 11/1988 | Rorden | 375/23 |
| 4,797,947 | 1/1989 | Labedz | 455/33 |
| 4,804,938 | 2/1989 | Rouse et al. | 340/310 |
| 4,807,222 | 2/1989 | Amitay | 370/85 |
| 4,811,357 | 3/1989 | Betts | 375/1 |
| 4,815,106 | 3/1989 | Propp et al. | 375/36 |
| 4,829,554 | 5/1989 | Barnes et al. | 379/58 |
| 4,833,702 | 5/1989 | Shitara et al. | 379/60 |
| 4,837,786 | 6/1989 | Gurantz et al. | 370/20 |
| 4,837,802 | 6/1989 | Higashiyama et al. | 379/62 |
| 4,866,732 | 9/1989 | Carey et al. | 375/1 |
| 4,868,795 | 9/1989 | McDavid et al. | 367/77 |
| 4,878,238 | 10/1989 | Rash et al. | 379/62 |
| 4,893,327 | 1/1990 | Stern et al. | 379/59 |
| 4,901,307 | 2/1990 | Gilhousen et al. | 370/18 |
| 4,905,221 | 2/1990 | Ichiyoshi | 370/18 |
| 4,918,689 | 4/1990 | Hui | 370/85.9 |
| 4,918,690 | 4/1990 | Markkula, Jr. et al. | 370/94 |
| 4,943,973 | 7/1990 | Werner | 375/1 |
| 4,953,197 | 8/1990 | Kaewell, Jr. | 379/58 |
| 4,972,431 | 11/1990 | Keegan | 375/1 |
| 4,979,170 | 12/1990 | Gilhousen et al. | 370/104.1 |
| 4,984,247 | 1/1991 | Kaufmann et al. | 375/1 |
| 4,995,083 | 2/1991 | Baker et al. | 380/23 |
| 5,005,183 | 4/1991 | Carey et al. | 375/1 |
| 5,008,925 | 4/1991 | Pireh | 379/60 |
| 5,008,953 | 4/1991 | Dahlin et al. | 455/22 |
| 5,016,255 | 5/1991 | Dixon et al. | 375/1 |
| 5,018,165 | 5/1991 | Sohner et al. | 375/1 |
| 5,022,046 | 6/1991 | Morrow | 375/1 |
| 5,022,047 | 6/1991 | Dixon et al. | 375/1 |
| 5,025,452 | 6/1991 | Sohner et al. | 375/1 |
| 5,029,184 | 7/1991 | Andren et al. | 375/1 |
| 5,042,050 | 8/1991 | Owen | 375/1 |
| 5,042,082 | 8/1991 | Dahlin | 455/33 |
| 5,056,109 | 10/1991 | Gilhousen et al. | 375/1 |
| 5,066,957 | 11/1991 | Mizuno et al. | 342/352 |
| 5,073,899 | 12/1991 | Collier et al. | 375/1 |
| 5,073,900 | 12/1991 | Mallinkdrodt | 375/1 |
| 5,081,642 | 1/1992 | O'Clock et al. | 375/1 |
| 5,093,637 | 3/1992 | Isota et al. | 332/103 |
| 5,093,840 | 3/1992 | Schilling | 375/1 |
| 5,097,484 | 3/1992 | Akaiwa | 375/40 |
| 5,101,501 | 3/1992 | Gilhousen et al. | 455/33 |
| 5,103,459 | 4/1992 | Gilhousen et al. | 375/1 |
| 5,107,225 | 4/1992 | Wheatley, III et al. | 330/279 |
| 5,109,390 | 4/1992 | Gilhousen et al. | 375/1 |
| 5,111,535 | 5/1992 | Tokunaga | 455/33.2 |
| 5,127,042 | 6/1992 | Gillig et al. | 379/59 |
| 5,128,928 | 7/1992 | Wilder | 455/517 |
| 5,153,598 | 10/1992 | Alves, Jr. | 342/352 |
| 5,157,661 | 10/1992 | Kanai et al. | 370/95.1 |
| 5,166,929 | 11/1992 | Lo | 370/85.3 |
| 5,166,952 | 11/1992 | Omura et al. | 375/1 |
| 5,170,412 | 12/1992 | Massey | 375/1 |
| 5,177,765 | 1/1993 | Holland et al. | 375/1 |
| 5,177,766 | 1/1993 | Holland et al. | 375/1 |
| 5,179,571 | 1/1993 | Schilling | 375/1 |
| 5,185,610 | 2/1993 | Ward et al. | 342/357 |
| 5,193,101 | 3/1993 | McDonald et al. | 375/1 |
| 5,195,090 | 3/1993 | Bolliger et al. | 370/94.1 |
| 5,195,091 | 3/1993 | Farwell et al. | 370/94.1 |
| 5,199,031 | 3/1993 | Dahlin | 455/515 |
| 5,200,956 | 4/1993 | Pudney et al. | 370/95.1 |
| 5,206,882 | 4/1993 | Schloemer | 375/1 |
| 5,210,771 | 5/1993 | Schaeffer et al. | 375/1 |
| 5,218,618 | 6/1993 | Sagey | 375/1 |
| 5,224,120 | 6/1993 | Schilling | 375/1 |
| 5,228,053 | 7/1993 | Miller et al. | 375/1 |
| 5,239,572 | 8/1993 | Saegusa et al. | 379/61 |
| 5,241,690 | 8/1993 | Larsson et al. | 455/54.1 |
| 5,243,641 | 9/1993 | Evans et al. | 379/61 |
| 5,257,283 | 10/1993 | Gilhousen et al. | 375/1 |
| 5,263,045 | 11/1993 | Schilling | 375/1 |
| 5,263,047 | 11/1993 | Kotzin et al. | 375/1 |
| 5,265,119 | 11/1993 | Gilhousen et al. | 375/1 |
| 5,267,261 | 11/1993 | Blakeney, II et al. | 375/1 |
| 5,267,262 | 11/1993 | Wheatley, III | 375/1 |
| 5,274,665 | 12/1993 | Schilling | 375/1 |
| 5,278,833 | 1/1994 | Crisler et al. | 370/348 |
| 5,278,835 | 1/1994 | Ito et al. | 370/95.3 |
| 5,280,472 | 1/1994 | Gilhousen et al. | 370/18 |
| 5,280,537 | 1/1994 | Sugiyama et al. | 375/1 |
| 5,285,469 | 2/1994 | Vanderpool | 375/1 |
| 5,289,497 | 2/1994 | Jacobson et al. | 375/1 |
| 5,291,516 | 3/1994 | Dixon et al. | 375/1 |
| 5,299,198 | 3/1994 | Kay et al. | 455/450 |
| 5,299,226 | 3/1994 | Schilling | 375/1 |
| 5,303,287 | 4/1994 | Laborde | 379/59 |
| 5,313,457 | 5/1994 | Hostetter et al. | 370/18 |
| 5,351,269 | 9/1994 | Schilling | 375/1 |
| 5,353,303 | 10/1994 | Walthall | 375/1 |
| 5,355,389 | 10/1994 | O'Clock et al. | 375/1 |
| 5,383,219 | 1/1995 | Wheatley, III et al. | 375/1 |
| 5,392,287 | 2/1995 | Tiedmann, Jr. et al. | 370/95.1 |
| 5,392,459 | 2/1995 | Baba et al. | 455/69 |
| 5,402,413 | 3/1995 | Dixon et al. | 370/18 |
| 5,410,568 | 4/1995 | Schilling | 375/205 |
| 5,414,796 | 5/1995 | Jacobs et al. | 395/2.3 |
| 5,416,797 | 5/1995 | Gilhousen et al. | 375/705 |
| 5,422,930 | 6/1995 | McDonald et al. | 379/58 |
| 5,422,933 | 6/1995 | Barnett et al. | 379/60 |
| 5,430,760 | 7/1995 | Dent | 375/200 |
| 5,434,859 | 7/1995 | Levardon | 370/84 |
| 5,438,329 | 8/1995 | Gastouniotis et al. | 340/870.02 |
| 5,442,682 | 8/1995 | Svedin et al. | 379/59 |
| 5,454,028 | 9/1995 | Hara et al. | 379/61 |
| 5,455,822 | 10/1995 | Dixon et al. | 370/18 |
| 5,467,367 | 11/1995 | Izumi et al. | 375/206 |
| 5,467,390 | 11/1995 | Brankley et al. | 379/229 |
| 5,469,468 | 11/1995 | Schilling | 375/200 |
| 5,481,533 | 1/1996 | Honig et al. | 370/18 |
| 5,483,676 | 1/1996 | Mahany et al. | 455/67.4 |

| | | | |
|---|---|---|---|
| 5,487,083 | 1/1996 | Nakjima et al. | 375/200 |
| 5,490,203 | 2/1996 | Jain et al. | 379/59 |
| 5,727,058 | 3/1998 | Blumhardt et al. | 379/242 |

OTHER PUBLICATIONS

Collins, J.H. et al., The Role of Surface Acoustic Wave Technology in Communication Systems, Ultrasonics, 10(2):59–71, Mar. 1972.

Dixon, Robert C., Spread Spectrum Systems, (J. Wiley & Sons, 2d ed. 1984).

Freret, Payne, Wireless Terminal Communications Using Spread–Spectrum Radio, Proc. of the IEEE, 1980, pp, 244–248.

Kavehrad, M. et al., Performance of Low–Complexity Channel Coding and Diversity for Spread Spectrum in Indoor, Wireless Communication, AT&T Tech. Journal, 64(8):1927–1965, Oct. 1985.

Kavehrad, M. et al., Spread Spectrum for Indoor Digital Radio, IEEE Comms Mag, 25(5):32–40 Jun 1987.

Kavehrad, Mohsen et al., Direct Sequence Spread Spectrum with DPSK Modulation and Diversity for Indoor Wireless Communications, IEEE Trans. on Comms., Com–35(2):224–226, Feb. 1987.

Mohanty, Nirode C., Spread Spectrum and Time Division Multiple Access Satellite Communications, IEEE Trans. on Comms., Com–25(8):810–815, Aug. 1977.

Radio Equipment and Systems Digital European Cordless Telecommunications (DECT) Reference document, ETR 015, Mar. 1991.

European digital cellular telecommunications system (phase 1); Mobile Station—Base Station System (MS–BSS) interface data link layer specification, I–ETS 300 021, May 1992.

European digital cellular telecommunications system (phase 1); MS–BSS Layer 1—General Requirements, I–ETS 300 078, May 1992.

Radio Equipment and Systems (RES); Digital European Cordless Telecommunications (DECT) Common interface services and facilities requirements specification, ETR 043, Jul. 1992.

Radio Sub–system Synchronization, GSM Recommendation 05.10 (Ver. 3.5.1), Released by ETSI/PT, Oct. 1992.

Radio Equipment and Systems (RES); Digital European Cordless Telecommunications (DECT) Common interface Part 9: Public access profile, ETS 300 175–9, Oct. 1992.

European digital cellular telecommunications system (Phase 2); Mobile Station—Base Station System (MS–BSS) interface General Aspects and principles (GSM 04.01), ETS 300 550, Sep. 1994.

European digital cellular telecommunications system (Phase 2); Mobile Station—Base Station (MS–BSS) interface Data Link (DL) layer specification (GSM 04.06), ETS 300 555, Sep. 1994.

Saleh, Adel A.M. et al., An Experimental TDMA Indoor Radio Communications System Using Slow Frequency Hopping and Coding, IEEE Trans. on Comms., 39(1):152–161, Jan. 1991.

Sust, M. K. et al., All Digital Signal Processing In A Spread Spectrum Communication System, Proc. of MELECON '87, Mar. 24–26, 1987, pp. 157–161.

Unkauf, Manfred G., "Surface Wave Devices in Spread Spectrum Systems", reprinted in H. Matthews (ed.), *Surface Wave Filters* (Wiley 1977), pp. 477–509.

In the Matter of: Amendment of the Commission's Rules to Establish New Personal Communications Services, *Comments of Omnipoint Communications, Inc.*, Dated: Nov. 9, 1992.

In the Matter of: Amendments of the Commission's Rules to Establish New Personal Communications Services, *Reply Comments of Omnipoint on 1850–1990 MHz Personal Communications Services*, Dated: Jan. 8, 1993.

In the Matter of: Amendment of the Commission's Rules to Establish New Personal Communications Services, *Reply Comments of Omnipoint Communications Inc.*, Dated: Mar. 1, 1993.

In the Matter of: Amendment of the Commission's Rules to Establish New Personal Communications Services, *Opposition to Motion for Leave to File Supplemental Comments*, Dated: Aug. 11, 1993.

In the Matter of: Amendment of the Commission'Rules to Establish New Personal Communications Services, *Adelphia Comm. Corp.—SATCOM, Inc.*, Dated: Jun. 25, 1992.

In the Matter of: Amendment of the Commission's Rules to Establish New Personal Communications Services, A Request for a Pioneer's Preference for Personal Communications Services, Requested by Omnipoint Mobile Data Company, *Request for Pioneer's Preference*, Dated: May 4, 1992.

In the Matter of: Omnipoint Corporation, Oracle Data Publishing, Inc., and McCaw Cellular Comms., Inc., Request for a Pioneer's Preference, Dated: May 4, 1992.

In the Matter of Omnipoint Corporation Amendment of the Commission's Rules to Establish New Personal Comms. Srvcs, *Semi–Annual Experimental License Progress Report*, Aug. 1993.

In the Matter of: Request of Omnipoint Communications, Inc. For a Pioneer's Preference in the Licensing Process for Personal Communications Services (FCC Gen. Docket 90–314) *Request for a Pioneer's Preference*, Dated: May 4, 1992.

Omnipoint Data Experimental License Progress Report to the Federal Communications Commission, Oct. 28, 1991, *Experimental License Issued Dec. 21, 1990*.

Omnipoint Corporation *Progress Report*—(Submitted with respect to Omnipoint's 1850–2200MHz Experimental License KK2XCV, File No. 2174–EX–PL–91), Dated: Jul. 8, 1992.

Joint Technical Committee on Wireless Access (JTC)— Omnipoint Candidate Air Interface Solution [Includes Proprietary Information], Date: Nov. 1, 1993.

Joint Technical Committee on Wireless Access—(JTC)— Standards Contribution (Air Interface Standards Project), Date: Mar. 21, 1994.

Omnipoint Corporation—*FCC Experimental License Semi- –annual Progress Report*, Apr. 1992.

Omnipoint Corporation—FCC Experimental License Semi- –annual Progress Report Rev. May 01, 1992.

Omnipoint Corporation—PCS2000—A Composite CDMA/ TDMA Air Interface Compatibility Standard For Personal Comm. in 1.8–2.2 GHz For License And Unlicensed Applications, Aug. 1994.

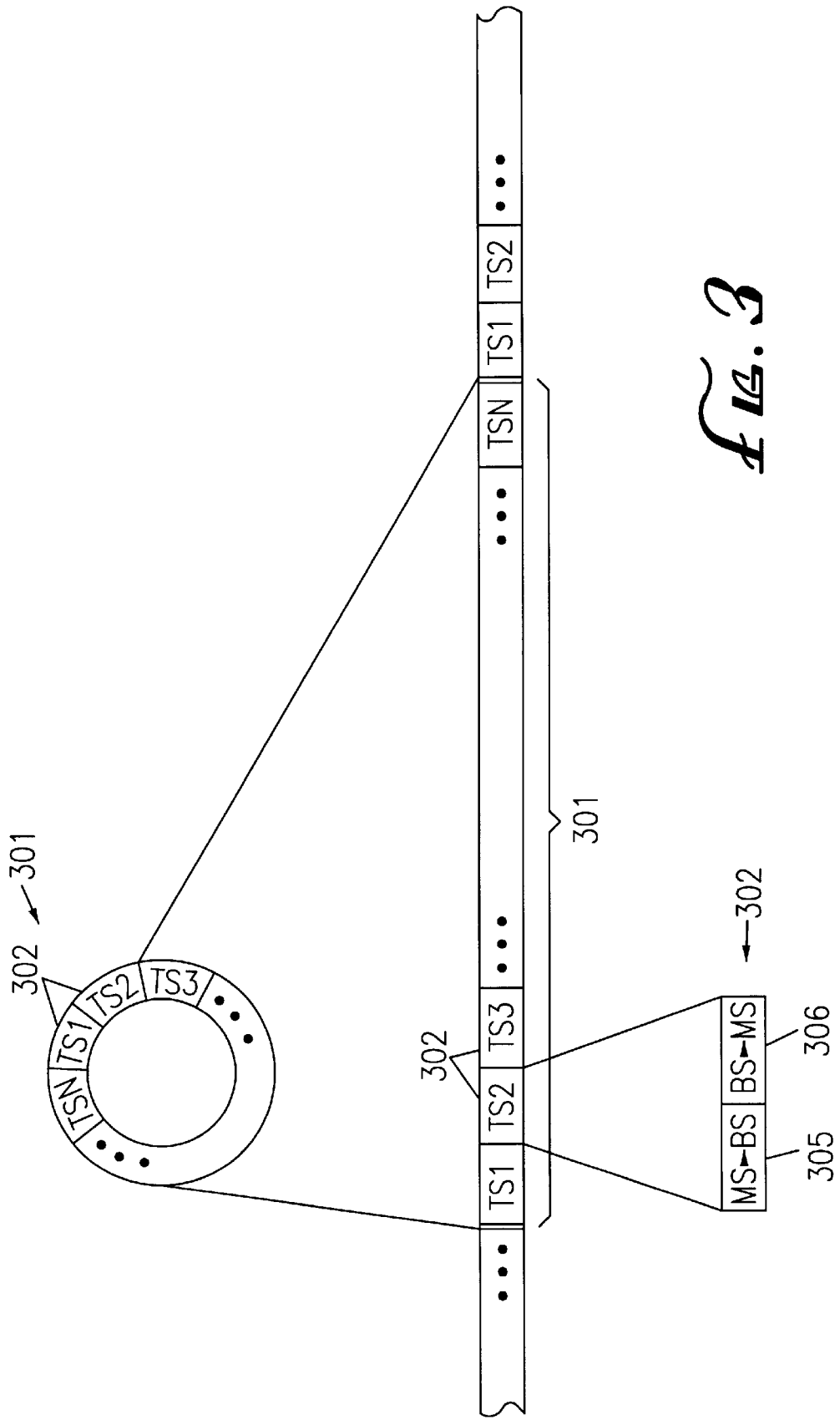

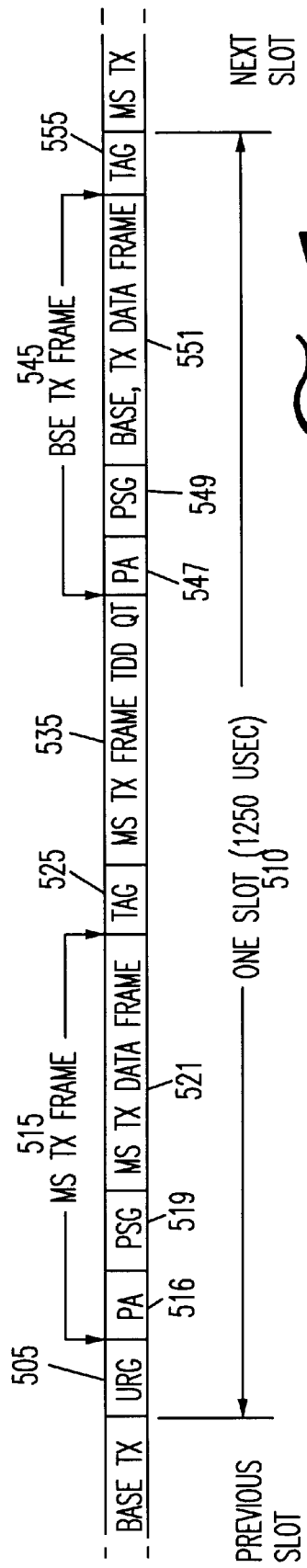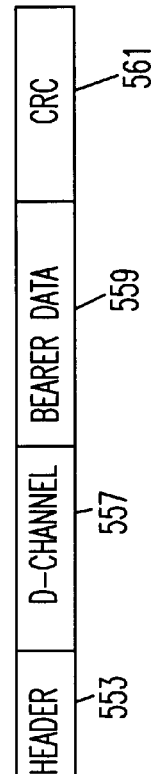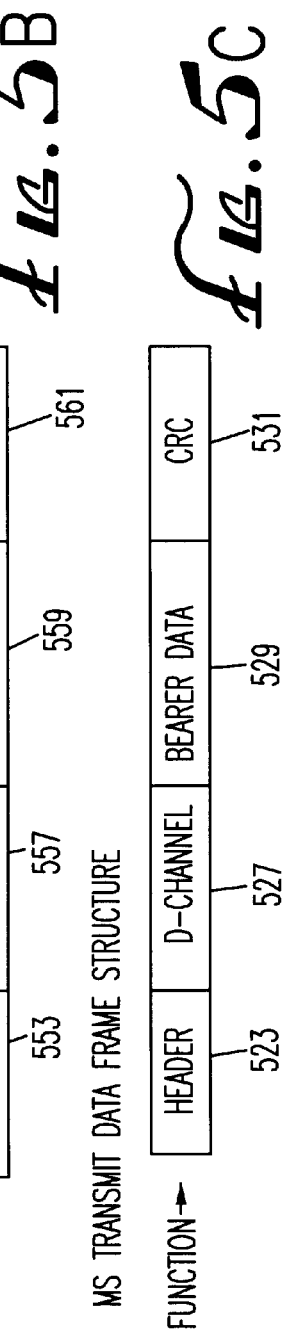

OMNIPOINT PCS2000 SIGNALLING INTERFACE CONTEXT DIAGRAM

| INFORMATION ELEMENT | LENGTH IN BITS |
|---|---|
| HEADER | 24 |
| D CHANNEL | 8 |
| O NOTE | 192 |
| FCW | 16 |

*fig. 10*

- OPENING FLAG
- ADDRESS
- ADDRESS
- CONTROL
- N-NOTE
- FCS
- FCS
- CLOSING FLAG

*fig. 11*

| | |
|---|---|
| ELEMENT IDENTIFIER | 1 BYTE |
| NUMBER OF QUEUES. INDICATES THE NUMBER OF PRIORITIZED QUEUES IN THE LINE CARD DP RAM. | 1 BYTE |
| QUEUE 1 PUT PTR. THE ADDRESS OF THE POINTER USED FOR WRITING TO QUEUE 1 OF THE LINE CARD DP RAM. | 2 BYTES |
| QUEUE 1 GET PTR. THE ADDRESS OF THE POINTER USED FOR READING FROM QUEUE 1 OF THE LINE CARD DP RAM. | 2 BYTES |
| QUEUE 1 START ADDRESS. THE ADDRESS OF THE START OF QUEUE 1 OF THE LINE CARD DP RAM. | 2 BYTES |
| QUEUE 1 LENGTH. THE NUMBER OF BYTES IN QUEUE 1 OF DP RAM. | 4 BYTES |
| | |
| QUEUE N PUT PTR. THE ADDRESS OF THE POINTER USED FOR WRITING TO QUEUE 1 OF THE LINE CARD DP RAM. | 2 BYTES |
| QUEUE N GET PTR. THE ADDRESS OF THE POINTER USED FOR READING FROM QUEUE 1 OF THE LINE CARD DP RAM. | 2 BYTES |
| QUEUE N START ADDRESS. THE ADDRESS OF THE START OF QUEUE 1 OF THE LINE CARD DP RAM. | 2 BYTES |
| QUEUE N LENGTH. THE NUMBER OF BYTES IN QUEUE 1 OF DP RAM. | 4 BYTES |

*Fig. 15*

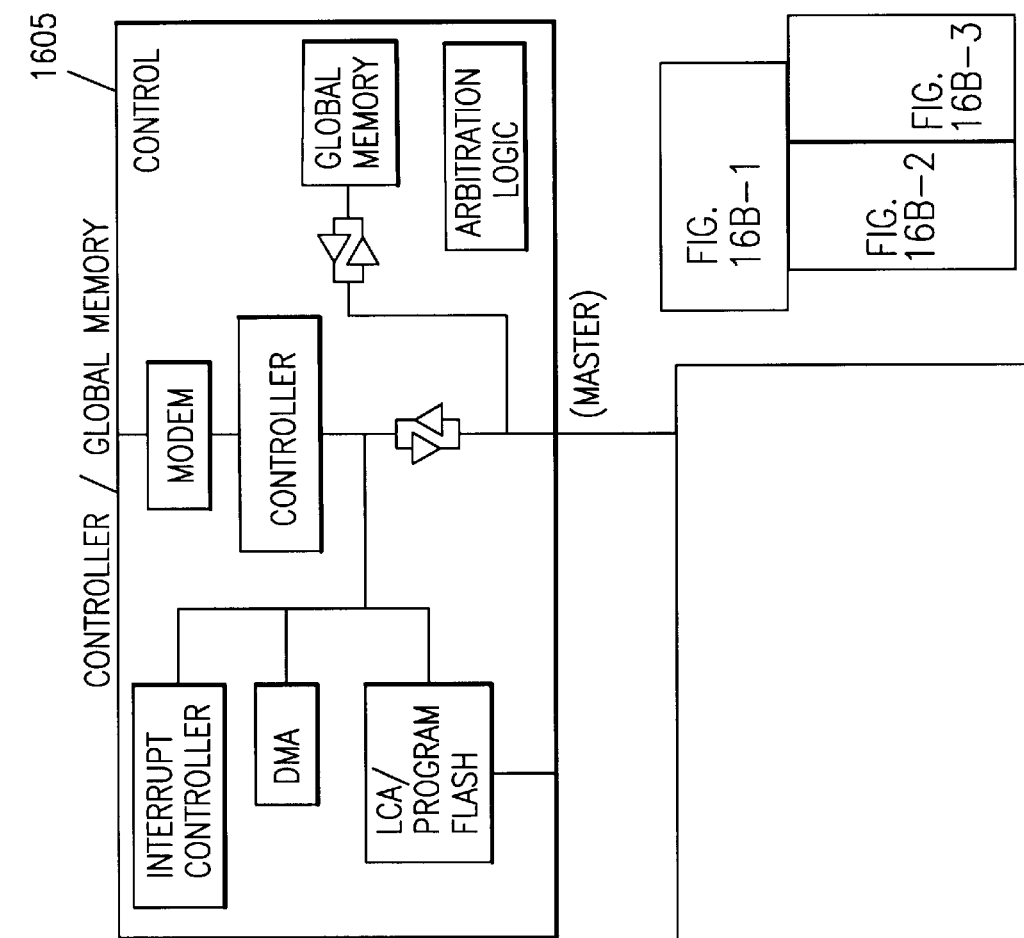
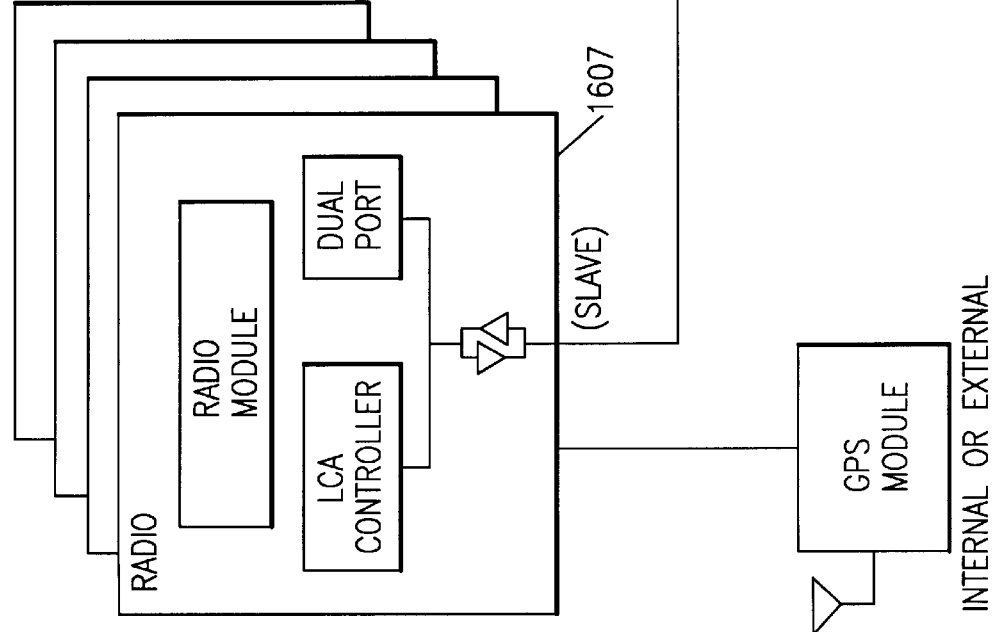
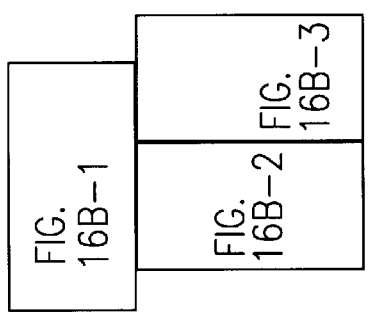
Fig. 16B
Fig. 16B-1

COMMUNICATION SYSTEM AND METHOD

RELATED APPLICATION DATA

This application is a continuation-in-part application of copending U.S. application Ser. No. 08/532,466 filed on Sep. 22, 1995 and hereby incorporated by reference as if fully set forth herein, which is a continuation-in-part application of U.S. application Ser. No. 08/284,053 filed on Aug. 1, 1994, which is a continuation-in-part of U.S. application Ser. No. 08/215,306 filed on Mar. 21, 1994, now abandoned, which is a continuation-in-part of U.S. application Ser. No. 08/146,496 filed on Nov. 1, 1993, now abandoned.

BACKGROUND OF THE INVENTION

1) Field of the Invention

The field of this invention pertains to communications and, more particularly, to means for transferring information within a mobile communication system.

2) Description of the Related Art

Digital communication systems have become increasingly popular for many applications. One advantage of a digital communication system is the flexibility to carry many different types of information over a single system. A single digital communication system may be used, for example, to transmit digitized sound, text, computer data, digital video, or other information existing in digital form.

To achieve flexibility, a communication system may be designed to transfer digital information from one end user to another in a transparent fashion. The communication system then operates as a transparent data pipeline for one or more other systems which are called application end users. Each application end user connected to the communication system generally has the responsibility for ensuring that the data ultimately delivered is in a form which is properly recognized by the user.

To better achieve such flexibility, it has been suggested that a communication system be designed with a layered architecture. One example of a general layered architecture for digital communication systems is the International Organization for Standardization (ISO) Reference Model for Open Systems Interconnection ("OSI Reference Model"). The OSI Reference Model has been adopted as an international standard by the ISO and by the International Telephone and Telegraph Consultative Committee (CCITT).

FIG. 4A is a diagram showing the OSI Reference Model 401. The OSI Reference Model 401 comprises a communication system having seven layers which form a communication path between a first end user 405 and a second end user 410. The seven layers may be divided into two sets—a set of upper layers 415 and a set of lower layers 420. The upper four layers 415 normally reside in the application end users desiring to communicate. A communication system may in some cases be defined by the lower three layers 420, individually known as the network layer 422, the data link layer 424 and the physical layer 426.

In the OSI Reference Model, each layer is responsible for specific, defined operations in the communication process between application end users 405, 410. In furtherance of these operations, each layer may communicate information with the layers above and below it through defined interfaces (although there is not always a definitive separation between layers). Thus, for example, the transport layer may operate independently of the specific operational details of the network layer 422, the data link layer 424, and the physical layer 426 below it. The set of lower layers 420 thus operates as a transparent data pipeline to an application end user connected to the system at the transport layer interface.

FIG. 4B illustrates a flow of data between layers such as may occur during communication between two application end users. As shown in FIG. 4B, information may be passed between like layers (e.g., the transport layer in the FIG. 4B example) of each end user through a path ultimately connected at the physical layer 426. The rules that govern how data is passed between like layers at each end user are collectively referred to as a "peer-to-peer protocol." A variety of different application end users operating with different peer-to-peer protocols may communicate over a communication system so long as each application end user presents the proper upper layer interface to the communication system. Conversely, an application end user may connect with any communication system having a compatible lower layer interface.

Additional details regarding the OSI Reference Model may be found in "Telecommunication Networks" by Mischa Schwartz (Addison-Wesley Publishing Co., 1987).

One class of digital communication systems provides wireless data communication connections to stationary or mobile user stations (e.g., handsets). Examples of such wireless mobile communication systems include public safety radio systems, cellular telephone systems, and personal communication systems (PCS). A wireless communication system may include a number of base stations for completing communication paths with the user stations. The base stations may be connected to a network, either directly of via a switch.

In many mobile communication systems it is desired that user stations have the ability to initiate and receive telephone calls. By connecting a communication system to a public switched telephone network (PSTN), a user station may generally communicate with any telephone connected to the telephone network. Alternatively, a communication system may access the telephone system through an intermediate communication system such as the Global System for Mobile Communications (GSM).

In operation, it is often necessary to pass signaling information among various components of a communication system. Signaling information may, for example, comprise control messages relating to the operation of the communication system. An example of signaling information is a message from a user station to a base station indicating a malfunction. One difficulty with the user of signaling information is that it must be distinguished within the system from data communication (i.e., information intended solely for the application end user), and must be extracted by the system component needing the signaling information to perform its tasks.

The transfer of necessary control and data information can be difficult within certain types of wireless systems. For example, in a time division multiple access (TDMA) system, wherein a base station communicates with a plurality of user stations (typically mobile) in a different time slots, the amount of information that can be transferred between the base station and the user station in a given time slot is necessarily limited. In contrast, a network to which a call is connected often transfers information in large data blocks (e.g., 64 kilobyte segments). The base station should have the capability of supporting data transfers and control functions required by the network, while at the same time supporting the transfer of information and control messages to the user station over a TDMA channel.

It would be advantageous to provide a mobile communication system with an improved method of communicating both user and signaling data among system components. It would be further advantageous to provide a mobile communication system having the characteristics of a layered architecture so as to provide a transparent data pipeline to application end users.

SUMMARY OF THE INVENTION

The present invention comprises in one aspect a system and method of transferring information (including user data and signaling information) within a mobile communication system.

In one aspect of the invention, internal components of a mobile communication system communicate system signaling data across internal interfaces implemented according to a layered architecture. System interfaces effectively function as communication channels between the system components. The system components appear as application end users to the internal communication channels defined by the system interfaces.

In another aspect of the invention, a mobile communication system transfers signaling data and end user data over a common set of interfaces, without using separate or dedicated internal communication channels for signaling data.

In a preferred embodiment, the communication system includes a base station capable of communicating with a plurality of user stations. The base station is connected with a base station controller (which may also be connected to other base stations). The base station controller may be connected to a network. In a preferred embodiment, the base station comprises two separate processors, an over-the-air (OTA) processor and a base station controller (BSC) interface processor (also called a line card processor). The OTA processor controls a base station transceiver which carries out communication with user stations over communication links. In a preferred embodiment, the interface between the OTA processor and the line card processor comprises a dual-port RAM which is used as a shared resource across the interface. Prioritized queues may be used to facilitate response to relatively higher priority signaling and control messages.

In another aspect of the invention, an over-the-air interface provides for the transfer of signaling information or data information, or both. The over-the-air interface comprises a plurality of time division multiple access (TDMA) channels. An information packet sent over a TDMA channel includes a relatively long bearer field (B-field) and a relatively short byte-serial field (also called a D-field). Low priority signaling messages may be segmented and transmitted over a plurality of time slots in the D-field. Higher priority signaling messages may be sent in the B-field, pre-empting normal bearer traffic. A field or flag in a header of an OTA information packet indicates to the receiving entity the usage of the B-field and the D-field for a given packet.

In a particular embodiment of the invention where the interface between the base station and the user stations is a TDMA interface, signaling traffic between the base station and each of the user stations is conducted in either a fast control traffic mode or a slow control traffic mode. In the fast control traffic mode, signaling messages are exchanged between the base station and a user station in a plurality of time slots within a timespan of a single time frame; in the slow control traffic mode, signaling messages are exchanged between the base station and a user station in no more than a single time slot within a timespan of a single time frame.

The above aspects of the invention are described with respect to preferred sets of messages, wherein each set of messages is associated with a different interface between system components.

BRIEF DESCRIPTION OF THE DRAWINGS

The various objects, features and advantages of the present invention may be better understood by examining the Detailed Description of the Preferred Embodiments found below, together with the appended figures, wherein:

FIG. 5A is a diagram of a preferred slot structure, and FIGS. 5B and 5C are diagrams of a base station traffic message structure and a user station traffic message structure, respectively.

FIG. 10 is a diagram of an information packet in accordance with one embodiment of the present invention.

FIG. 11 is a diagram of an exemplary data frame for transmitting messages to and from a base station controller.

FIG. 15 is a table of an exemplary dual-port RAM map.

DESCRIPTION OF THE PREFERRED EMBODIMENTS

Figure 1A:
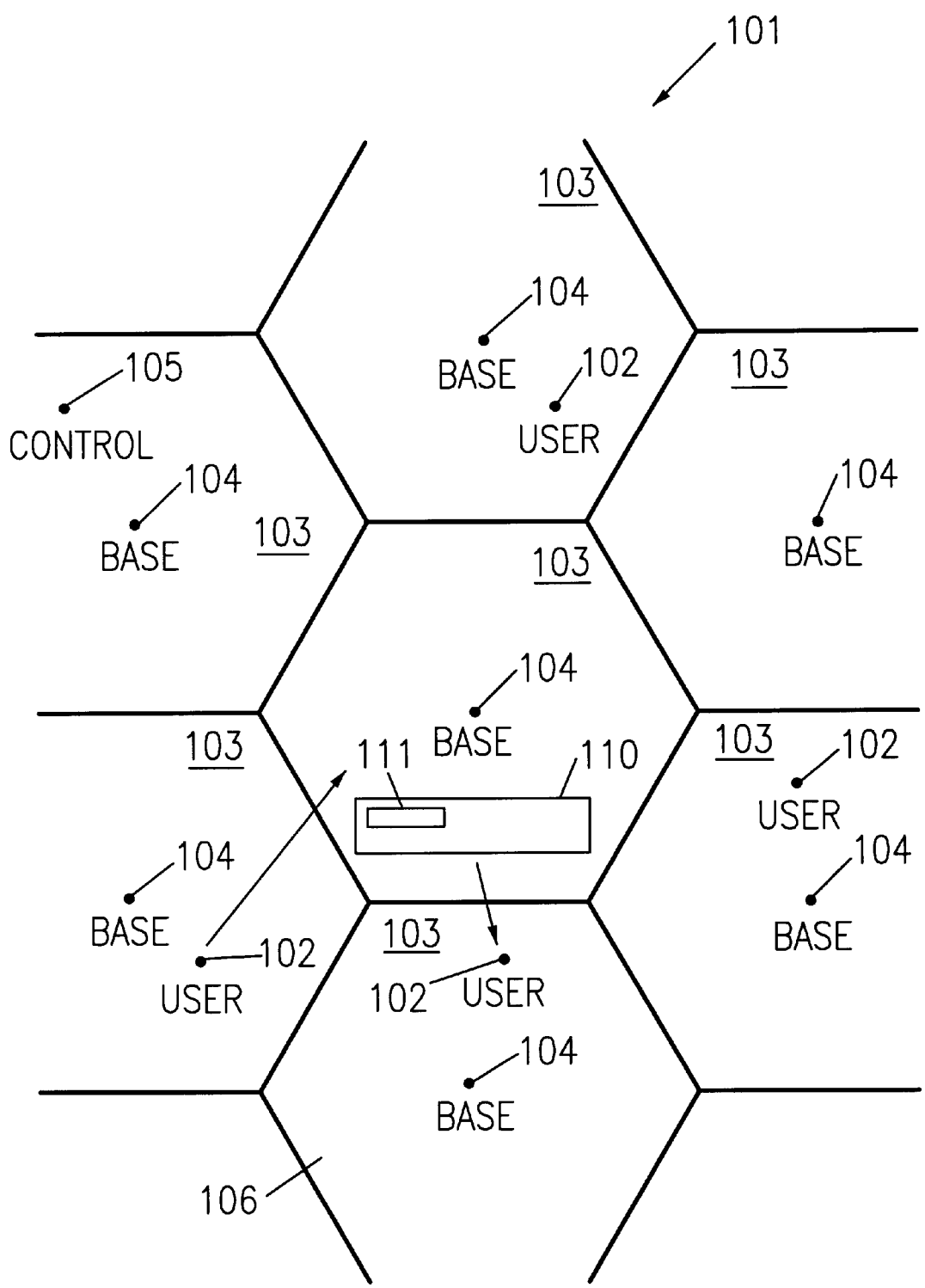
FIG. 1A is a diagram of a pattern of cells in a wireless communication system.

FIG. 1A is a diagram of a pattern of cells in a wireless communication system 101 for communication among a plurality of user stations 102. The wireless communication system 101 of FIG. 1A includes a plurality of cells 103, each with a base station 104, typically located at the center of the cell 103. Each station (both the base stations 104 and the user stations 102) generally comprises a receiver and a transmitter.

In a preferred embodiment, a control station 105 (also comprising a receiver and a transmitter) manages the resources of the system 101. The control station 105 (sometimes referred herein as a "base station controller") may assign the base station 104 transmitters and user station 102 transmitters in each cell 103 a spread-spectrum code for modulating radio signal communication in that cell 103. The resulting signal is generally spread across a bandwidth exceeding the bandwidth necessary to transmit the data, hence the term "spread spectrum". Accordingly, radio signals used in that cell 103 are spread across a bandwidth sufficiently wide that both base station 104 receivers and user station 102 receivers in an adjacent cell 103 may distinguish communication which originates in the first cell 103 from communication which originates in the adjacent cell 106.

Figure 1B:
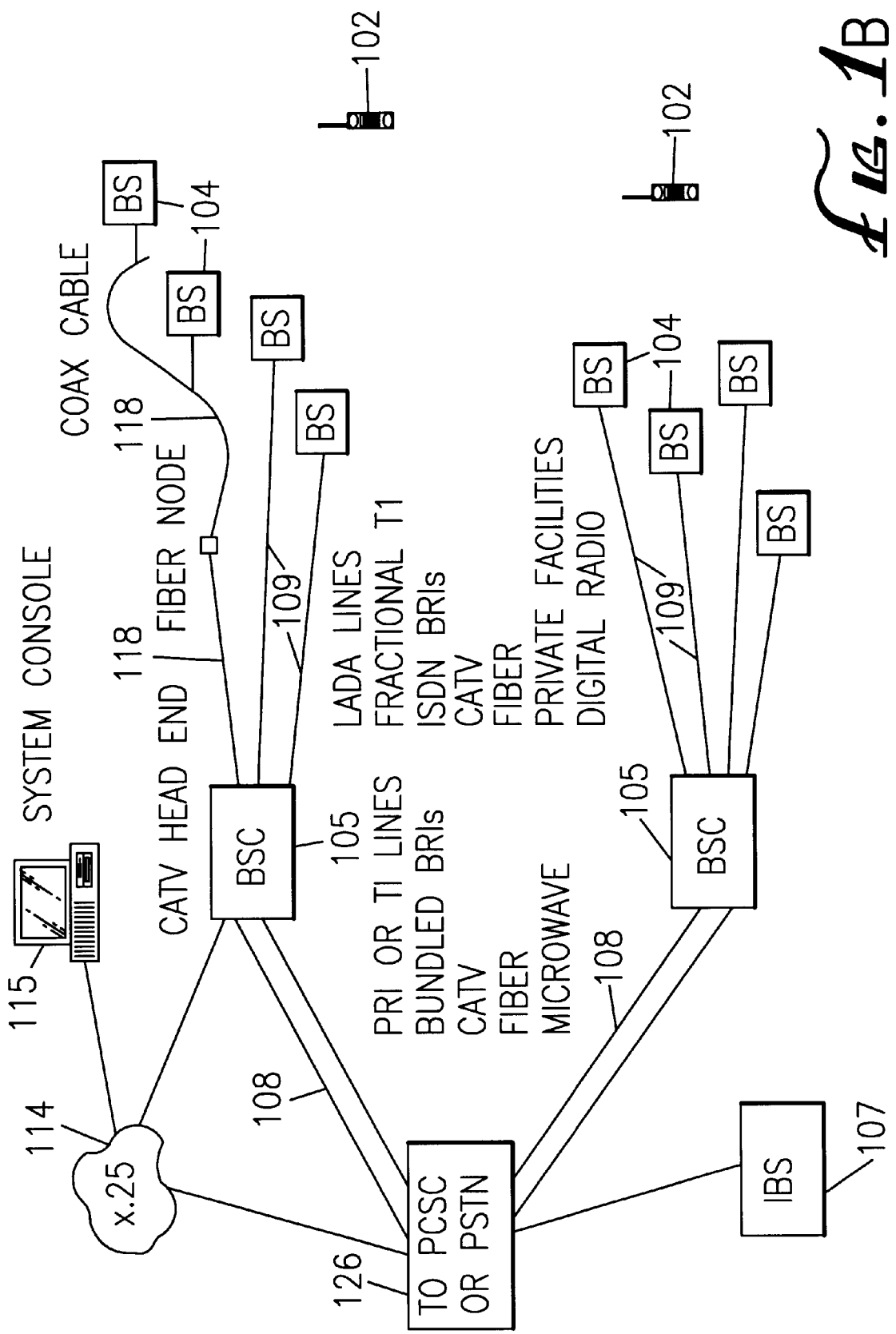
FIG. 1B is a block diagram of a communication system.

FIG. 1B is a block diagram of a communication system architecture utilized in a preferred embodiment of the present invention. The FIG. 1B communication system comprises a plurality of base stations 104 for communicating with a plurality of user stations 102. The base stations 104 and user stations 102 may operate in a personal communications system (PCS), such as may be authorized under rules prescribed by the Federal Communications Commission (FCC).

Each base station 104 may be coupled to a base station controller 105 by any of a variety of communication paths 109. The communication paths 109 may each comprise one or more communication links 118. Each communication link 118 may include a coaxial cable, a fiber optic cable, a digital radio link, or a telephone line.

Each base station controller 105 may also be connected to one or more communication networks 126, such as a public switched telephone network (PSTN) or personal communication system switching center (PCSC). Each base station controller 105 is connected to a communication network 126 by means of one or more communication paths 108, each of which may include a coaxial cable, a fiber optic cable, a digital radio link, or a telephone line.

The FIG. 1B communication system also may include one or more "intelligent" base stations 107 which connect directly to a communication network 126 without interfacing through a base station controller 105. The intelligent base stations 107 may therefore bypass the base station controllers 105 for local handoffs and switching of user stations 102, and instead perform these functions directly over the network 126. In terms of the interfaces described hereinafter (see FIG. 6), an intelligent base station 107 does not require an N-Interface, and the functions of the base station controller 105 for transmitting to the network 126 are incorporated within the intelligent base station 107.

In operation each base stations 104 formats and sends digital information to its respective base station controller 105 (or directly to the network 126 in the case of an intelligent base station 107). The base station controllers 105 receive inputs from multiple base stations 104, assist handoffs between base stations 104, and convert and format channel information and signaling information for delivery to the network 126. The base station controllers 105 may also manage a local cache VLR database, and may support basic operation, administration and management functions such as billing, monitoring and testing. Each base station controller 105, under control of the network 126, may manage local registration and verification of its associated base station 104 and may provide updates to the network 126 regarding the status of the base stations 104.

The network 126 connects to the base station controllers 105 for call delivery and outgoing calls. Intelligent base stations 107 may use ISDN messaging for registration, call delivery and handoff over a public telephone switch. The intelligent base station 107 may have all the general capabilities of a base station 104 but further incorporate a BRI card, additional intelligence and local vocoding.

If the network 126 is a GSM network, then base stations 104 may connect to the network 126 through a defined "A" interface. The "A" interface may be incorporated in base station controllers 105 and in intelligent base stations 107. Features and functionality of GSM may be passed to and from the base stations 104 over the "A" interface in a manner that is transparent to the end user.

The system may also interconnect to cable television distribution networks. The base stations 104 may be miniaturized so that they can be installed inside standard cable TV amplifier boxes. Interfacing may be carried out using analog remote antenna systems and digital transport mechanisms. For example, T1 and FT1 digital multiplexer outputs from the cable TV network may be used for interfacing, and basic rate (BRI) ISDN links may be used to transport digital channels.

Figure 1C:
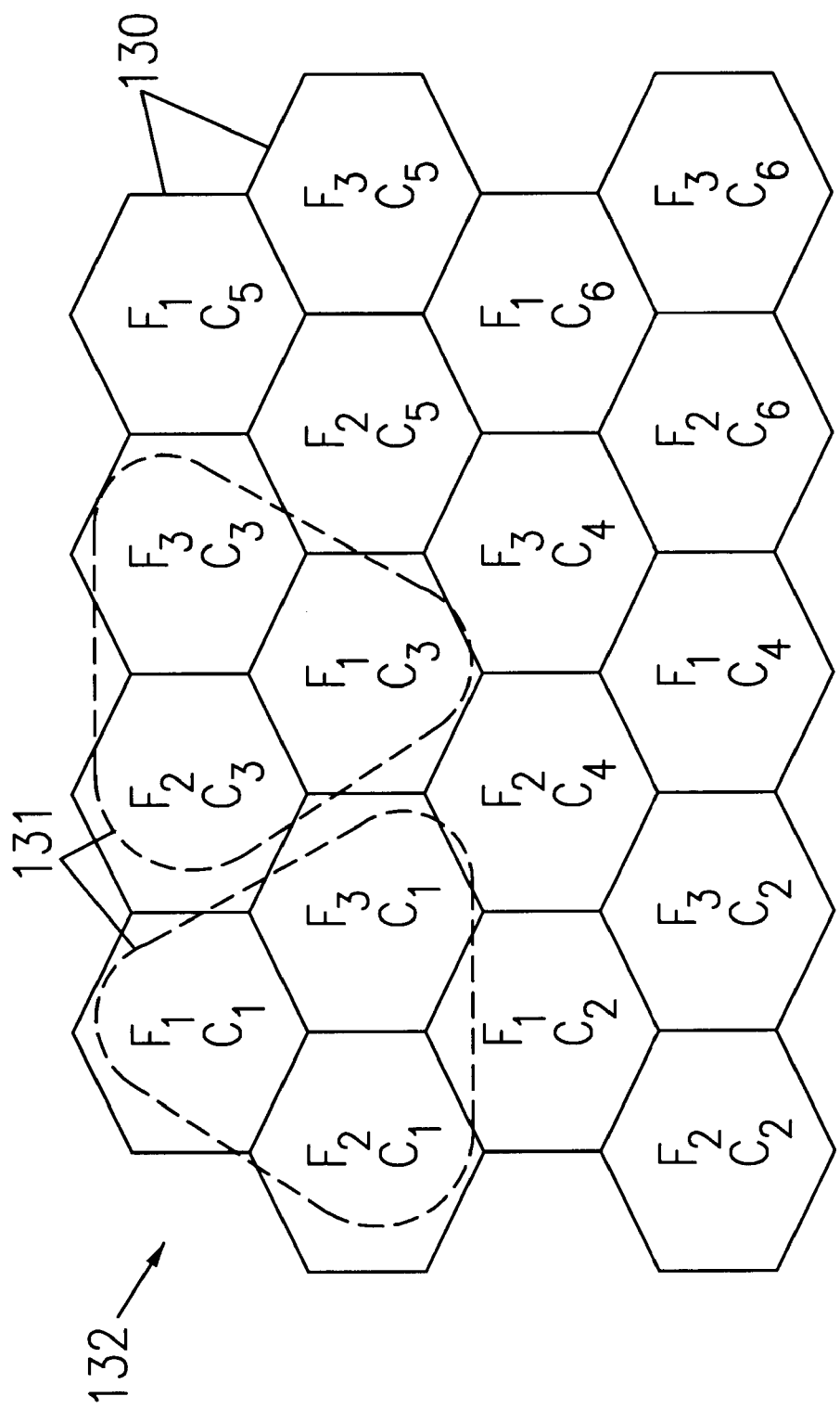
FIG. 1C is a diagram of an arrangement of cells in a wireless communication system showing an exemplary code and frequency reuse pattern.

FIG. 1C is a diagram of a particular cellular environment in which the invention may operate. In FIG. 1C, a geographical region 132 is divided into a plurality of cells 130. Associated with each cell 130 is an assigned frequency from among frequencies F1, F2 and F3, and an assigned spread spectrum code (or code group) from among the codes (or code groups) C1, C2, C3, C4, C5 and C6. The three different frequencies F1, F2 and F3 are preferably assigned in such a manner that no two adjacent cells 130 have the same assigned frequency F1, F2 or F3, thereby resulting in minimization of interference between adjacent cells 130. The spread spectrum codes C1 through C6 are preferably orthogonal and may be assigned in adjacent clusters 131 such as shown in FIG. 1C. Although six spread spectrum codes C1 through C6 are depicted in FIG. 1C, other numbers of spread spectrum codes may be used depending upon the particular application.

Further details regarding an exemplary cellular pattern are described in, e.g., U.S. Pat. No. 5,402,413, entitled "Three Cell Wireless Communication System," which application is assigned to the assignee of the present invention, and is hereby incorporated by reference as if fully set forth herein.

Figure 2:
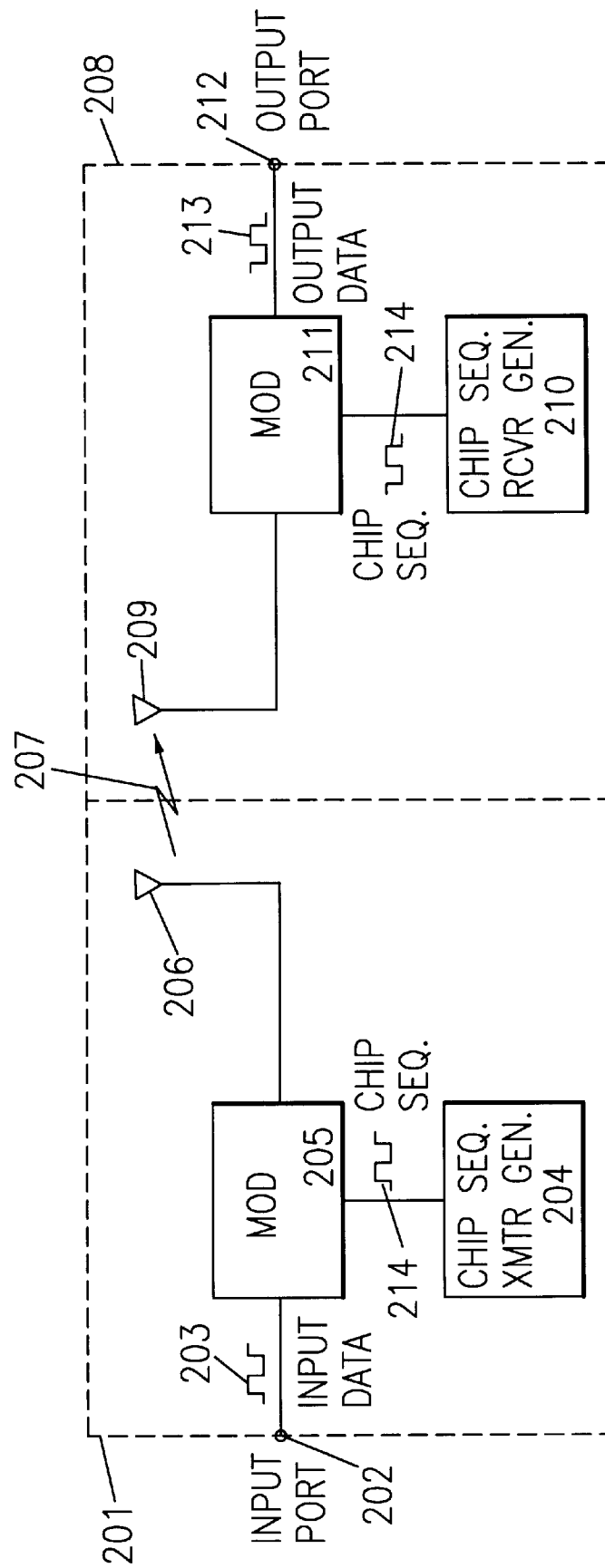
FIG. 2 is a block diagram of a transmitter and a receiver in a spread spectrum communication system.

FIG. 2 is a block diagram of an exemplary transmitter and receiver in a spread spectrum communication system as may be employed for spreading and despreading signals in the communication system of FIG. 1A. In FIG. 2, a spread-spectrum transmitter 201 comprises an input port 202 for input data 203, a chip sequence transmitter generator 204, a modulator 205, and a transmitting antenna 206 for transmitting a spread-spectrum signal 207. A spread-spectrum receiver 208 comprises a receiver antenna 209, a chip sequence receiver generator 210, a demodulator 211, and an output port 212 for output data 213. In operation, a single chip sequence 214 is identically generated by both the transmitter generator 204 and the receiver generator 210, and appears essentially random to others not knowing the spreading code upon which it is based. The spread-spectrum signal 207 is despread with demodulator 211 by correlating the received signal with a locally generated version of the chip sequence 214. Exemplary correlators are described in, e.g., U.S. Pat. Nos. 5,022,047 and 5,016,255, each of which are assigned to the assignee of the present invention, and each of which are incorporated by reference as if fully set forth herein. A preferred method of correlation is described in U.S. patent application Ser. No. 08/481,613 entitled "Multi-Bit Correlation of Continuous Phase Modulated Signals," filed Jun. 7, 1995, hereby incorporated by reference as if set forth fully herein.

Spread spectrum communication techniques are further described in, e.g., Robert C. Dixon, *Spread Spectrum Systems with Commercial Applications* (John Wiley & Sons, 3d ed. 1994).

Data may be transmitted between the base station 104 and user stations 102 using an M-ary spread spectrum technique. Suitable M-ary spread spectrum transmission and reception techniques are described in, e.g., U.S. Pat. No. 5,022,047 and in U.S. patent application Ser. No. 08/484,007 entitled "Method and Apparatus for Decoding a Phase Encoded Signal," filed June 7, both of which are incorporated by reference as if set forth fully herein. In a preferred embodiment, the base station 104 and user stations 102 each transmit an M-ary direct sequence spread spectrum signal, with M=6, using spread spectrum codes (called "symbol codes") of 32 chips. Thirty-two different symbol codes are used to represent up to thirty-two different data symbols, each comprising five bits of data; phase encoding may also be used to allow transmission of a 6th bit of data for each symbol code. Techniques of phase encoding for transmission of an additional bit of information per symbol code are described in, e.g., U.S. patent application Ser. No. 08/484, 007, referenced above.

User stations 102 in one embodiment may comprise mobile handsets capable of multi-band and/or multi-mode operation. The user stations 102 may be multi-mode in that they may be capable of both spread spectrum (i.e., wideband) communication and also narrowband communication. The user stations 102 may be multi-band in the sense that they may be set to operate on a plurality of different frequencies, such as frequencies in either the licensed or unlicensed PCS bands. The user stations 102 may operate in one mode (e.g., wideband) over a first frequency band, and another mode (e.g., narrowband) over a second frequency band.

As an example, a user station 102 may be set to operate on a plurality of frequencies between 1850 and 1990 MHz, with the frequencies separated in 625 kHz steps. Each user station 102 may be equipped with a frequency synthesizer that may be programmed to allow reception and/or transmission on any one of the plurality of frequencies. Further information regarding dual-mode and/or dual-band communication is set forth in U.S. patent application Ser. No. 08/483,514 (attorney docket 214/071) entitled "Dual-Mode Wireless Unit with Two Spread Spectrum Frequency Bands," filed on Jun. 7, 1995 in the name of inventors Robert C. Dixon et al.

Figure 3:
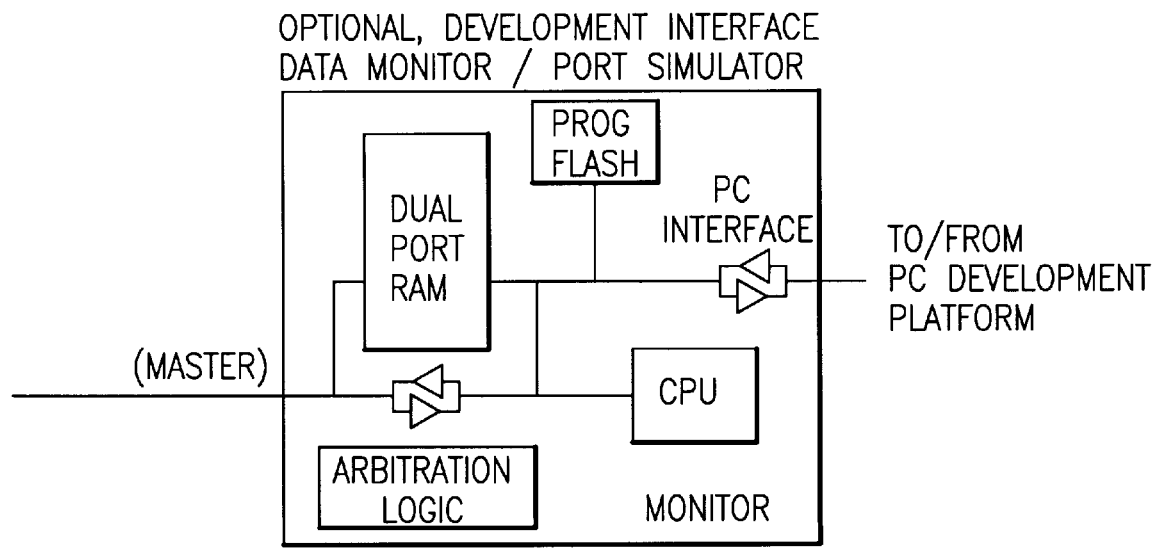
FIG. 3 is a diagram of a time frame divided into a plurality of time slots.

FIG. 3 is a diagram showing a timing structure for a particular TDMA system. According to the timing structure of FIG. 3, communication over time is broken into a continuous series of time frames 301. A single complete time frame 301 is shown along a timeline 310 in FIG. 3; similar time frames are assumed to precede and follow time frame 301 in a continuous pattern along the timeline 310.

Time frame 301 is divided into a plurality of time slots 302 numbered consecutively TS1, TS2 . . . TSN, each of which may support duplex communication with a user station 102. Time frame 301 may be thought of as a "polling loop" or a time loop, as depicted in FIG. 3, whereby user stations 102 are communicated with sequentially over the time frame 301 in a manner analogous to polling, each user station 102 transmitting and receiving messages in its designated time slot 302. In the FIG. 3 embodiment, each time slot 302 comprises a user portion 305, wherein a user station 102 transmits a user-to-base message to the base station 104, and a base portion 306, wherein the base station 104 transmits a base-to-user message to the user station 102.

Time slots 302 define a set of transmission channels. Each transmission channel may further defined by a distinct frequency channel, a distinct spread spectrum code, a distinct spatial direction, or some combination thereof.

In an exemplary TDMA communication system, time frames 301 are each 20 milliseconds in duration, and each time frame 301 comprises sixteen time slots 302 or, alternatively, eight time slots 302 to support extended range through increased guard times. In a preferred embodiment, each time slot 302 is 1.25 milliseconds long. Each time slot 302 in such an embodiment comprises a total of 3125 chip periods, and base station transmissions sent during base portions 306 of the time slot 302 and user station transmissions sent during user portions 305 of the time slot 302 each have a chipping rate of 2.5 Megachips/second.

In some embodiments, a user station 102 may communicate in more than one time slot 302 in each time frame 301, so as to support an increased data rate. Similarly, in some embodiments, a user station 102 may periodically skip time frames 301 and communicate in some subset of all time frames 301 (e.g., every other time frame 301, or every fourth time frame 301), so as to support a reduced data rate where a full speed communication link is not necessary. Further information about an exemplary TDMA system supporting variable data rates may be found in copending U.S. patent application Ser. No. 08/284,053 filed Aug. 1, 1994, which is hereby incorporated by reference as if fully set forth herein. An alternative over-the-air protocol is also described therein.

FIG. 5A is a diagram of a preferred slot structure, and FIGS. 5B and 5C are diagrams of a base station traffic message structure and a user station traffic message structure, respectively. In FIG. 5A, a time slot 510 comprises a variable radio delay gap 505, a user station transmit frame 515, a base processor gap 525, a guard time 535, a base station transmit frame 545, and a radar gap 555. Each user station transmit frame 515 comprises a user preamble 516, a user preamble sounding gap 519, and a user station data frame 521. Similarly, each base station transmit frame 545 comprises a base preamble 547, a base preamble sounding gap 549, and a base transmit data frame 551.

FIG. 5B illustrates a preferred message structure for the base transmit data frame 551. The message structure of FIG. 5B comprises a base header field 553, a base D-channel field 557, a base data field 559, and a base cyclical redundancy check (CRC) field 561. In a preferred embodiment, the base header field 553 is 23 bits, the base D-channel field 557 is 8 bits, the base data field 559 is 192 bits, and the base CRC field 561 is 16 bits.

FIG. 5C illustrates a preferred message structure for the user station transmit data frame 521. The message structure of FIG. 5C comprises a user header field 523, a user D-channel field 527, a user data field 529, and a user CRC field 531. In a preferred embodiment, the user header field 523 is 17 bits, the user D-channel field 527 is 8 bits, the user data field 529 is 192 bits, and the user CRC field 531 is 16 bits.

Signaling messages (i.e., messages used for control traffic) may be used to assist in acquisition and maintenance of a channel from the network. A message may include a message type data element located in a message type field. The message type data element defines the format of the rest of the message, and acts as an operation code to the destination unit (either user station 102 or base station 104). Exemplary message types (and their abbreviations) appear in Table 6-1 below.

TABLE 6-1

| Message Type | Message |
|---|---|
| ACK | Acknowledge |
| AUT | Authentication Request |
| AUR | Authentication Response |
| BAI | Base Assist Information |
| BAR | Base Assist Request |
| CIP | Set Cipher Mode |
| CNC | Call Connected |
| CNL | Connect Link |
| CSC | Circuit Switch Cotnplete |
| DRG | De-registration Request |
| HLD | Hold |
| HOF | Handover Failed |
| MAI | User Station Assist Information |
| MAR | User Station Assist Request |
| OHC | Originating Handover Complete |
| ORH | Originating Handover Request |
| ORG | Originate Call |
| RCP | Registration Complete |
| REL | Release Link |
| RRQ | Registration Request |
| SPR | Specific Response |
| STL | Set Link |
| SYN | Synchronize |
| THC | Terminating Handover Complete |
| THR | Target handover Request |
| TRA | Transport Message with TCID |

The message type data element may be, e.g., 8 bits in length.

Figure 6:
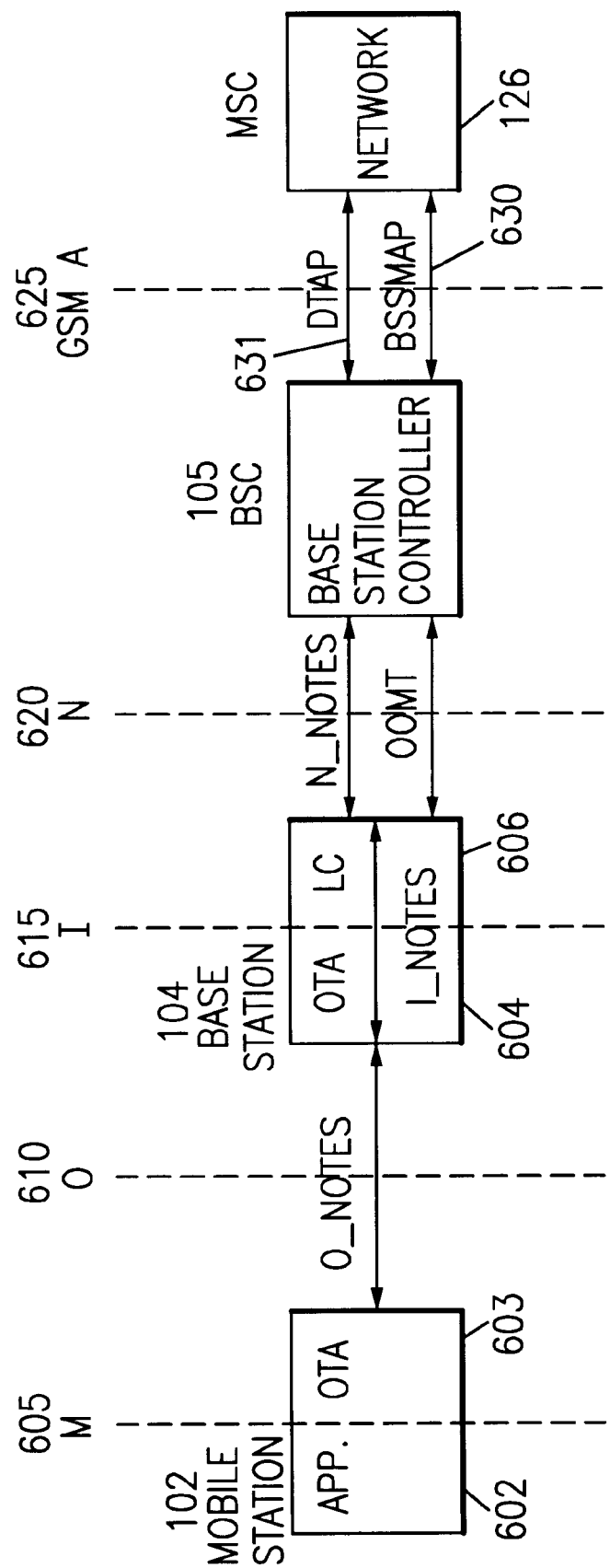
FIG. 6 is an abstract diagram illustrating the transfer of information (including internal signaling messages) among system components in a preferred wireless communication system.
Figure 7:
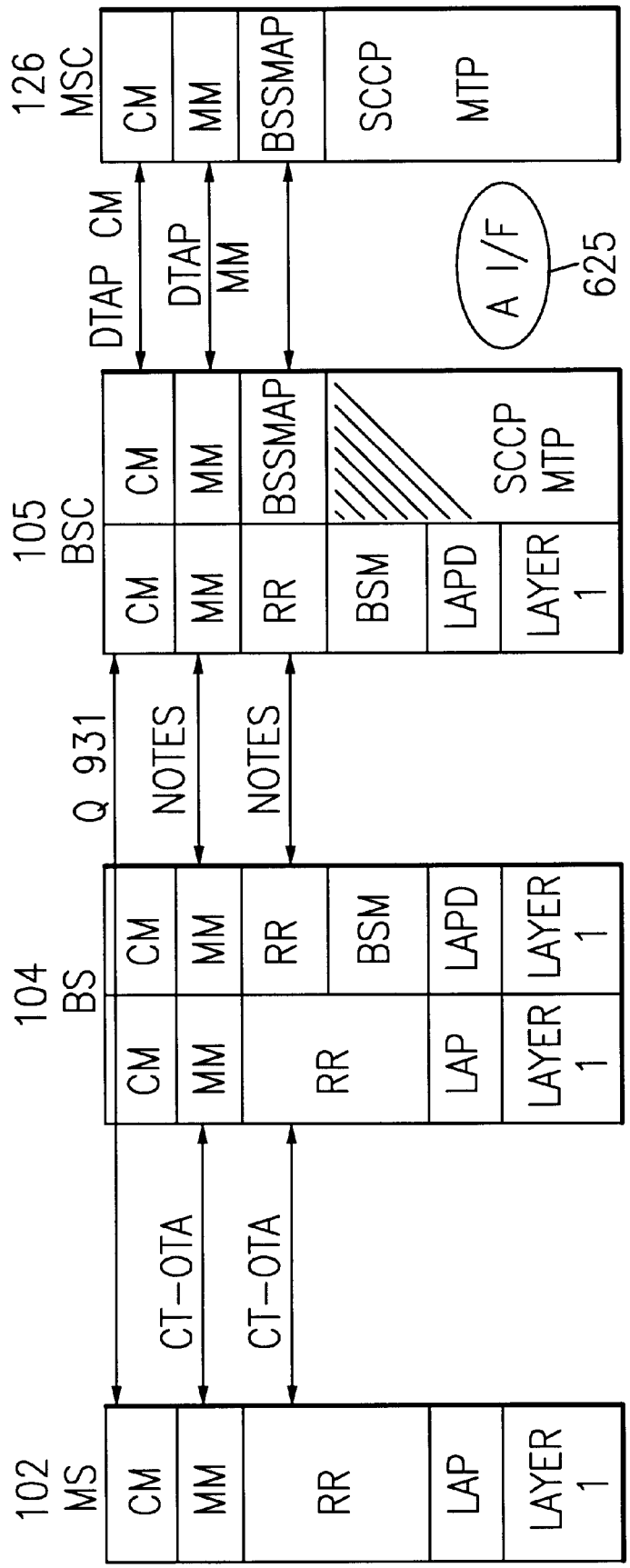
FIG. 7 is an abstract diagram illustrating the transfer of information to and from a particular network in accordance with the system components and interfaces of FIG. 6.

FIG. 6 is a diagram of various system components within a preferred wireless communication system showing interfaces between the components. Four distinct interfaces are defined in the FIG. 6 system, labeled "M", "O", "I", and "N", and are referred to herein as the M-Interface 605, O-Interface 610, I-Interface 615, and N-Interface 620, respectively.

The M-Interface 605 may be internal to a user station 102 and generally defines a boundary between an application end user 602 and a mobile communication transceiver 603 in the user station 102. The O-Interface 610 generally comprises communication channel (typically an over-the-air communication channel) between the mobile communication transceiver 603 in the user station 102 and a base station transceiver 604. The I-Interface 615 may be thought of as "internal" to a base station 104 and generally defines a boundary between the base station transceiver 604 and a base station line card processor 606. Finally, the N-Interface 620 comprises an information channel 607 between the line card processor 606 and a base station controller 609 (such as, e.g., base station controller 105 shown in FIG. 1B).

Within the communication system 101, information is communicated across each interface 605, 610, 615, and 620 according to a particular protocol governing exchange of information across that interface. Thus, a total of four protocols are defined, one for each interface 605, 610, 615, 620. A fifth protocol may be defined for an adaptation layer interface (e.g., the GSM "A" interface) at the base station controller 105.

In a preferred embodiment, the communication system 101 communicates both user data and signaling data across one or more of the system component interfaces under the same or similar protocols. User data (also referred to as bearer data) comprises, in general, data which originates at the application end user and is passed to the communication system across an adaptation layer interface. User data may include voice, error-controlled data, or non-error controlled (raw) data. Signaling data (also called control data), on the other hand, generally comprises information exchanged within the communication system, or between the communication system and application end users, for the purpose of service connection (i.e., connection establishment and maintenance).

The mobile communication system 101 transfers information across one or more system interfaces through a series of packetized messages referred to as "Notes". Each Note may contain data intended for receipt by an application end user (user data) or data to be used for link establishment and maintenance (signaling data), or both. Each interface 605, 610, 615, 620 communicates with Notes formatted according to a particular protocol specific to the interface.

The communication system 101 transfers information in the form of signaling data between the mobile communication transceiver 603 and the application end user 602 across the M-Interface 605 in the form of packetized messages referred to as "M-Notes". Table 1-1 through Table 1-18 describe exemplary M-Notes which may be communicated across the M-Interface 605 in a preferred embodiment of the communication system 101. In Tables 1-1 through 1-18, the application end user 602 may be abbreviated as "MSAPP", and the mobile communication transceiver 603 as "MS-OTA."

TABLE 1-1

| Acknowledge [MSAPP <=> MS-OTA] | |
|---|---|
| Information Element | Length in Octets |
| Command Type | 1 |
| ACK'ed Command | 1 |
| ACK Response | 2 |

This message is sent by either the application end user 602 or the mobile communication transceiver 603 to indicate the acknowledgment of an action based on the receipt of the Message Type identified in the ACK Message Type field. A positive acknowledgment is always indicated by a 0 in the ACK Response IE.

TABLE 1-2

| Assist Information [MSAPP <=> MS-OTA] | |
|---|---|
| Information Element | Length in Octets |
| Command Type | 1 |
| Assist Type | 1 |
| Assist Data | 18 |

This message is sent either from the application end user 602 to the mobile communication transceiver 603 or from the mobile communication transceiver 603 to the application end user 602. It provides a mechanism to impart various items of information to assist the recipient in making well informed decisions. It may be sent in response to a CT-ASR message or it may be unsolicited.

TABLE 1-3

Assist Request [MSAPP <=> MS-OTA]

| Information Element | Length in Octets |
|---|---|
| Message Type | 1 |
| Assist Type | 1 |
| Assist Request Info | 18 |

This message is sent either from the application end user 602 to the mobile communication transceiver 603 or from the mobile communication transceiver 603 to the application end user 602 to request information. It provides a mechanism for the sender to request various items of information to assist in making well informed decisions.

TABLE 1-4

Authenticate [MSAPP <= MS-OTA]

| Information Element | Length in Octets |
|---|---|
| Message Type | 1 |
| TCID | 1 |
| Cipher Type | 1 |
| Cipher Key Sequence # | 1 |
| Authentication Test Number | 16 |

The Authenticate M-Note shall be sent to the application end user 602 from the mobile communication transceiver 603 in response to an Authenticate N-Note as discussed below. The application end user 602 will then encrypt the "random" number using the authentication key provisioned into the mobile user station 102 and send this encrypted number back to the mobile communication transceiver 603 in an Authentication Reply M-Note.

TABLE 1-5

Authenticate Reply [MSAPP => MS-OTA]

| Information Element | Length in Octets |
|---|---|
| Message Type | 1 |
| TCID | 1 |
| Cipher Type | 1 |
| Authentication Test Response | 16 |

The Authenticate Reply M-Note from the application end user 602 to the mobile communication transceiver 603 is the response to an Authentication M-Note from the mobile communication transceiver 603. The M-Note communicates the sixteen octet encrypted response from the application end user 602 to the network 126 for confirmation. In some infrastructure systems, the network 126 will perform encryption on the original random number and compare the results for authentication. In others, the encryption and comparison will be performed by higher level systems. The Authenticate Reply should be the response to an earlier Authenticate N-Note issued for the given personal identification number (PID) by the network 126. If the returned value is incorrect, the proper response of the network 126 shall be to deny access by the mobile user station 102 to the network.

TABLE 1-6

Begin Traffic [MSAPP => MS-OTA]

| Information Element | Length in Octets |
|---|---|
| Message Type | 1 |
| Traffic Type | 1 |

This message indicates to the mobile communication transceiver 603 that traffic of the specified type is to commence.

TABLE 1-7

Circuit Switch Compete [MSAPP <= MS-OTA]

| Information Element | Length in Octets |
|---|---|
| Message Type | 1 |
| (New) Service Provider | 2 |
| (New) Zone | 5 |
| (New) BSC ID | 2 |
| (New) Base ID | 4 |
| (New) Facility | 4 |

This message is sent from the mobile communication transceiver 603 to the application end user 602 upon successful completion of handover between base stations 104.

TABLE 1-8

Connect Link [MSAPP => MS-OTA]

| Information Element | Length in Octets |
|---|---|
| Message Type | 1 |
| Connection Number | 3 |
| Cause | 1 |

This message is sent from the mobile communication transceiver 603 to the application end user 602 when the base station transceiver 604 receives a CT-CNC from a base station 104 over the O-interface 610.

TABLE 1-9

Deregister [MSAPP => MS-OTA]

| Information Element | Length in Octets |
|---|---|
| Message Type | 1 |
| PID | 9 |
| Cause | 1 |

This message is sent from the MS-OTA to the application end user 602 to indicate that the mobile communication transceiver should deregister the PID from the base station 104.

TABLE 1-10

Deregister Complete [MSAPP <= MS-OTA]

| Information Element | Length in Octets |
|---|---|
| Message Type | 1 |
| PID | 9 |
| Cause | 1 |

This message is sent from the mobile communication transceiver 603 to the application end user 602 to indicate that the mobile user station 102 has deregistered from a base station

TABLE 1-11

Initialize MS-OTA [MSAPP => MS-OTA]

| Information Element | Length in Octets |
|---|---|
| Message Type | 1 |
| Service Provider | 2 |
| Class | 2 |
| PID | 9 |
| ESN | 8 |

This message defines the capabilities and identity of the mobile user station 102 to the mobile communication transceiver 603. Upon receipt of the message the mobile communication transceiver 603 shall attempt to register with the specified Service Provider using the specified PID. In the event that the mobile user statiom is currently registered when it receives this message it shall first de-register—using the previous PID, if different—and then attempt to re-register.

TABLE 1-12

Link Lost [MSAPP <= MS-OTA]

| Information Element | Length in Octets |
|---|---|
| Message Type | 1 |
| Cause | 1 |

The mobile communication transceiver 603 sends this message to the application end user 602 when the link to the base station 104 is lost.

TABLE 1-13

Register [MSAPP => MS-OTA]

| Information Element | Length in Octets |
|---|---|
| Message Type | 1 |
| Registration Status | 1 |
| Service Provider | 2 |
| Zone | 5 |
| BSC ID | 2 |
| Base ID | 4 |

This message is sent from the mobile communication transceiver 603 to the application end user 602 upon each completion of a registration by the mobile user station 102.

TABLE 1-14

Release Link [MSAPP <=> MS-OTA]

| Information Element | Length in Octets |
|---|---|
| Message Type | 1 |
| Cause | 1 |

This message is sent from the mobile communication transceiver 603 to the application end user 602 to indicate that the communication system 101 has dropped the link. This message is sent from the application end user 602 to the mobile communication transceiver 603 to indicate that the application end user 602 has dropped the link.

TABLE 1-15

Service Request [MSAPP => MS-OTA]

| Information Element | Length in Octets |
|---|---|
| Message Type | 1 |
| Resource Request Data | 4 |
| Service Type | 1 |
| Key Sequence # | 1 |
| Class | 2 |
| TCID | 1 |

The application end user 602 sends the Service Request message to the mobile communication transceiver 603 to request call management access to the communication system 101.

TABLE 1-16

Set Link [MSAPP <=> MS-OTA]

| Information Element | Length in Octets |
|---|---|
| Message Type | 1 |
| In-bound Bandwidth | 1 |
| Out-bound Bandwidth | 1 |

This message is sent by either the application end user 602 or the mobile communication transceiver 603 to specify the data bandwidth requirements of the current link (or the link being established). If the mobile communication transceiver 603 receives this message when a link is not established, it initiates the link acquisition sequence.

TABLE 1-17

Transport Data [MSAPP <=> MS-OTA]

| Information Element | Length in Octets |
|---|---|
| Message Type | 1 |
| Transport Data | 19 |

The message is used by the application end user 602 and the mobile communication transceiver 603 to transport peer to peer data between the application end user 602 and an application end user connected to a base station controller 105.

TABLE 1-18

Update ID [MSAPP <= MS-OTA]

| Information Element | Length in Octets |
|---|---|
| Message Type | 1 |
| PID | 9 |
| New PID | 9 |

The Update ID M-Note is sent to the application end user 602 from the mobile communication transceiver 603 to notify the application end user 602 to update the identity of the mobile user station 102 described by the PID information element. The New PID information element may represent a temporary identification for the mobile user station 102 as provided for in the definition of the New Personal ID.

The mobile communication system 101 transfers information comprising signaling data and user data between a base station 104 (i.e., the base station transceiver 604) and a user station 102 (i.e., the mobile station transceiver 603) across the O-Interface 610. In a preferred embodiment, the O-Interface 610 operates according to an over-the-air protocol with time division duplexing (TDD) and time division multiple access (TDMA) techniques. A preferred protocol for the O-Interface 610 is shown in and described with respect to FIG. 3.

Signaling data is passed across the O-Interface 610 in the form of messages referred to as "O-Notes". In a preferred embodiment, the O-Notes are contained either within the base data field 559 (see FIG. 5B) or the user data field 529 (see FIG. 5C), depending upon the origin of the message. Alternatively, an O-Note may be segmented into, e.g., 8-bit segments and transmitted over a plurality of time slots 302 in the D-field 557 of the base message (see FIG. 5B) or the D-field 527 of the user message (see FIG. 5C). Generally, lower priority O-Note messages may be segmented and transmitted in the D-fields 557 or 527, while higher priority O-Note messages may be transmitted in the B-fields 579 or 529. Also, O-Notes may be transmitted in the B-field 579 or 529 when it is not otherwise being used (e.g., when the link is first being established and voice data is not being transferred yet).

A field or flag in the header of a base message or user message can be used to indicate whether an O-Note is contained in the B-field 579 or 529, or in the D-field 557 or 527. In some circumstances, an extended O-Note may be sent in a message covering both the D-field and the B-field.

FIG. 10 is a diagram of an information packet 1005 (e.g., the base message of FIG. 5B or the user message of FIG. SC) which may be passed across the O-Interface 610. An O-Note 1010 is encapsulated within the packet 1005, and resides in the data field 529, 559 ordinarily reserved for bearer traffic. Each information packet 1005 generally also comprises a header 1015 of, e.g., 24 bits, a D-field of, e.g., 8 bits, and a frame check word 1020 of, e.g., 16 bits, for a total of 240 bits.

In a preferred embodiment, each O-Note 1010 has a length of no more than 160 bits, thereby taking up less space than the entire B-field 529 or 569 The latter 32 bits of the O-Note 1010 (appended to the first 160 bits) may be used for forward error correction.

Table 2-1 through Table 2-30 illustrate exemplary O-Notes 1010 which may be transferred across the O-Interface 610 in a preferred embodiment of the communication system 101. In Table 2-1 through Table 2-30, a mobile communication transceiver 603 may be denoted "MS-OTA" and a base station transceiver 604 may be denoted "BS-OTA."

TABLE 2-1

CT-ACK (Acknowledge) [MS-OTA <=> BS-OTA]

| Information Element | Length in Bits |
|---|---|
| Message Type | 8 |
| ACK Response | 8 |
| ACK'ed Command | 8 |
| Cause | 8 |
| Reserved | 128 |

Acknowledge messages can be transmitted by either the BS-OTA or the mobile communication transceiver 603. They are usually the last element of a larger signaling exchange.

TABLE 2-2

CT-ASI (Assist Information) [MS-OTA <=> BS-OTA]

| Information Element | Length in Bits |
|---|---|
| Message Type | 8 |
| Assist Type | 8 |
| Assist Data | 144 |

This message is sent either from the BS-OTA to the mobile communication transceiver 603 or from the mobile communication transceiver 603 to the BS-OTA. It provides a mechanism to impart various items of information to assist the recipient in making well formed decisions. It may be sent in response to a CT-ASR message or it may be unsolicited.

TABLE 2-3

CT-ASR (Assist Request) [MS-OTA <=> BS-OTA]

| Information Element | Length in Bits |
|---|---|
| Message Type | 8 |
| Assist Type | 8 |
| Assist Request Info | 144 |

This message is sent either from the BS-OTA to the mobile communication transceiver 603 or from the mobile communication transceiver 603 to the BS-OTA to request information. It provides a mechanism for the sender to request various items of information to assist it making well informed decisions.

TABLE 2-4

CT-AUR (Authentication Reject) [MS-OTA <=> BS-OTA]

| Information Element | Length in Bits |
|---|---|
| Message Type | 8 |
| TCID | 8 |
| Cause | 8 |
| Reserved | 136 |

This message shall be sent to the mobile communication transceiver 603 from the BS-OTA to inform the mobile communication transceiver 603 that the Network Application has rejected its Authentication Response.

TABLE 2-5

CT-AUR (Authentication Response) [MS-OTA <=> BS-OTA]

| Information Element | Length in Bits |
|---|---|
| Message Type | 8 |
| TCID | 8 |
| Authentication Test Response | 128 |
| Reserved | 16 |

The authentication response message shall be the mobile communication transceiver 603 response to an authentication challenge. It shall contain the results of encrypting the test number supplied by the authenticate message using the secret unique mobile user station traffic key.

TABLE 2-6

| CT-AUT (Authentication Challenge) [MS-OTA <= BS-OTA] | |
| --- | --- |
| Information Element | Length in Bits |
| Message Type | 8 |
| TCID | 8 |
| Cipher Type | 8 |
| Cipher Key Sequence # | 8 |
| Authentication Test Number | 128 |

This message shall be sent to the mobile communication transceiver 603 from the BS-OTA whenever the BS starts an authentication sequence. This message shall supply a 128 bit challenge number to be used by the mobile user station 102 using the unique secret mobile user station traffic key to generate the authentication response message.

TABLE 2-7

| CT-AUG (Authentication Rejection) [MS-OTA <= BS-OTA] | |
| --- | --- |
| Information Element | Length in Bits |
| Message Type | 8 |
| TCID | 8 |
| Cause | 8 |
| Reserved | 136 |

This message shall be sent to the mobile communication transceiver 603 from the BS-OTA whenever the communication system 101 rejects an Authentication Response from the mobile communication transceiver 603.

TABLE 2-8

| CT-CIP (Set Cipher Mode) [MS-OTA <= BS-OTA] | |
| --- | --- |
| Information Element | Length in Bits |
| Message Type | 8 |
| Cipher Type | 8 |
| Cipher Algorithm ID | 8 |
| Frame Number | 24 |
| Cause | 8 |
| Reserved | 104 |

This message is sent to the mobile communication transceiver 603 from the BS-OTA whenever the base station 104 wishes the mobile communication transceiver 603 to switch to cipher mode. When the mobile communication transceiver 603 receives this message the mobile communication transceiver 603 uses the cipher mode parameters to set its ciphering equipment and then switches into or out of cipher mode. All traffic after this point will be ciphered.

TABLE 2-9

| CT-CNC (Connection Complete) [MS-OTA <= BS-OTA] | |
| --- | --- |
| Information Type | Length in Bits |
| Message Type | 8 |
| TCID | 8 |
| Connection Number | 24 |
| OTA Map Type | 8 |
| OTA Map | 32 |
| Cipher Algorithm ID | 8 |

TABLE 2-9-continued

| CT-CNC (Connection Complete) [MS-OTA <= BS-OTA] | |
| --- | --- |
| Information Type | Length in Bits |
| Frame Number | 24 |
| Reserved | 48 |

The CT-CNC message is set from the terminating base station 104 to the mobile communication transceiver 603 when a handover is completed.

TABLE 2-10

| CT-CSC (Circuit Switch Complete) [MS-OTA <= BS-OTA] | |
| --- | --- |
| Information Element | Length in Bits |
| Message Type | 8 |
| (New) Zone | 40 |
| (New) Base ID | 32 |
| HRef | 48 |
| Reserved | 32 |

This message is set from the source base station 104 to the mobile communication transceiver 603 to signal that the communication system connection is available at the target base station 104.

TABLE 2-11

| CT-DRG (De-registration) [MS-OTA => BS-OTA] | |
| --- | --- |
| Information Element | Length in Bits |
| Message Type | 8 |
| Cause | 8 |
| Reserved | 144 |

The mobile communication transceiver 603 shall send a de-registration message to the BS-OTA when the mobile communication transceiver 603 de-registers itself from the base station 104. If the mobile communication transceiver 603 does not send this message, de-registration shall automatically occur a fixed time-out period (e.g., 30 seconds) from the last time the mobile communication transceiver 603 sent a registration request to the base station 104.

TABLE 2-12

| CT-HLD (Hold) [MS-OTA <=> BS-OTA] | |
| --- | --- |
| Information Element | Length in Bits |
| Message Type | 8 |
| Reserved | 152 |

Hold packets can be transmitted by either the BS-OTA or the mobile communication transceiver 603. They are always part of a larger signaling traffic exchange and are used to maintain the communication link across the O-Interface 610 while waiting for an external event.

TABLE 2-13

| CT-IRP (Identity Reply) [MS-OTA => BS-OTA] | |
| --- | --- |
| Information Element | Length in Bits |
| Message Type | 8 |

TABLE 2-13-continued

| CT-IRP (Identity Reply) [MS-OTA => BS-OTA] | |
| --- | --- |
| Information Element | Length in Bits |
| Identity Type | 8 |
| Identity Data | 72 |
| Reserved | 72 |

The mobile communication transceiver 603 sends a CT-IRP message to the BS-OTA in response to a CT-IRQ message.

TABLE 2-14

| CT-IRQ (Identity Request) [MS-OTA <= BS-OTA] | |
| --- | --- |
| Information Element | Length in Bits |
| Message Type | 8 |
| Identity Type | 8 |
| Reserved | 144 |

The BS-OTA sends a CT-IRQ message to the mobile communication transceiver 603 when it receives an Identity Request Note from an application end user connected to a base station controller 105. This allows the application end user to obtain one of the mobile user station's Identifiers that is not normally included in the protocol.

TABLE 2-15

| CT-HOF (Handover Failure) [MS-OTA <= BS-OTA] | |
| --- | --- |
| Information Element | Length in Bits |
| Message Type | 8 |
| Cause | 8 |
| Reserved | 144 |

This message is sent to the mobile communication transceiver 603 by either the originating base station or the terminating base station to indicate to the mobile user station that the request handover (OHR or THR) has failed.

TABLE 2-16

| CT-OHC (Originating Handover Complete) [MS-OTA => Target BS-OTA] | |
| --- | --- |
| Information Element | Length in Bits |
| Message Type | 8 |
| HRef | 48 |
| PID | 72 |
| Registration Type | 8 |
| Registration Status | 8 |
| Reserved | 16 |

The Originating Handover Complete message is sent from the mobile communication transceiver 603 to the target base station to complete the Originating Handover procedure.

TABLE 2-17

| CT-OHR (Originating Handover Request) [MS-OTA => Originating BS-OTA] | |
| --- | --- |
| Information Element | Length in Bits |
| Message Type | 8 |

TABLE 2-17-continued

| CT-OHR (Originating Handover Request) [MS-OTA => Originating BS-OTA] | |
| --- | --- |
| Information Element | Length in Bits |
| (New) Zone | 40 |
| (New) BSC ID | 16 |
| (New) Base ID | 32 |
| Remaining Base Count | 8 |
| Reserved | 56 |

Originating Handovers will be attempted in cases when supporting a system such as DCS1900, where a terminating handover is not possible because there is no way the new base station controller 105 can notify the old base station controller 105 that the handover is required. The Originating Handover Request message is sent from the mobile communication transceiver 603 to the source BS-OTA to initiate the originating handover procedure.

TABLE 2-18

| CT-RCP (Registration Complete) [MS-OTA <= BS-OTA] | |
| --- | --- |
| Information Element | Length in Bits |
| Message Type | 8 |
| Registration Status | 8 |
| Cause | 8 |
| Reg Timers | 8 |
| SBT | 128 |

Upon initial or periodic registration completion, the BS-OTA responds to the mobile communication transceiver 603 with a registration complete message.

TABLE 2-19

| CT-REL (Release Link) [MS-OTA <=> BS-OTA] | |
| --- | --- |
| Information Element | Length in Bits |
| Message Type | 8 |
| Cause | 8 |
| Reserved | 144 |

This message is sent by either the mobile communication transceiver 603 or the BS-OTA when the sending side released the connection in progress or during link setup.

TABLE 2-20

| CT-RRQ (Registration Request) [MS-OTA => BS-OTA] | |
| --- | --- |
| Information Element | Length in Bits |
| Message Type | 8 |
| Cipher Key Sequence # | 8 |
| Registration Type | 8 |
| Registration Status | 8 |
| Registration Info | 128 |

A registration request shall be sent from a mobile communication transceiver 603 to a BS-OTA on an initial and a periodic basis. Upon the initial request, the base station 104 shall enter the registration process. If the base station does not receive a periodic (30 seconds or as determined by the service provider) registration request from a mobile communication transceiver 603 which is currently registered with the base station, then the base station will initiate a de-registration procedure.

TABLE 2-21

| CT-SPR (Specific Poll Response) [MS-OTA => BS-OTA] | |
|---|---|
| Information Element | Length in Bits |
| Message Type | 8 |
| PID | 72 |
| Serviae Provider | 16 |
| Class | 16 |
| Cipher Key Sequence # | 8 |
| Reserved | 40 |

The mobile communication transceiver 603 sends the CT-SPR message to the BS-OTA in response to an unsolicited Specific Poll (i.e., one that is not part of link acquisition). This occurs when the base station 104 wishes to initiate a transaction (e.g., incoming call or special operation).

TABLE 2-22

| CT-SRS (Service Response) [MS-OTA <= BS-OTA] | |
|---|---|
| Information Element | Length in Bits |
| Message Type | 8 |
| TCID | 8 |
| Cause | 8 |
| Reserved | 136 |

The BS-OTA sends the CT-SRS message to the mobile communication transceiver 603 to inform the mobile user station of the communication system's response to a Service Request.

TABLE 2-23

| CT-SRQ (Service Response) [MS-OTA => BS-OTA] | |
|---|---|
| Information Element | Length in Bits |
| Message Type | 8 |
| Resource Request Data | 32 |
| Service Type | 8 |
| Key Sequence # | 8 |
| TCID | 8 |
| Reserved | 96 |

The mobile communication transceiver 603 sends the service request message to the BS-OTA to request call management access to the communication system 101.

TABLE 2-24.1

| CT-STL (Set Link) [BS-OTA => MS-OTA] | |
|---|---|
| Information Element | Length in Bits |
| Message Type | 8 |
| Resource Request Data | 32 |
| OTA Map Type | 8 |
| OTA Map | 32 |
| Cause | 8 |
| TCID | 8 |
| Connection Number | 24 |
| Reserved | 40 |

The BS-OTA sends the STL message to the mobile communication transceiver 603 when the BS-OTA wishes to change the characteristics of the over the air service across the O-Interface 610.

TABLE 2-24.2

| CT-STL (Set Link) [MS-OTA => BS-OTA] | |
|---|---|
| Information Element | Length in Bits |
| Message Type | 8 |
| Resource Request Data | 32 |
| OTA Map Type | 8 |
| OTA Map | 32 |
| TCID | 8 |
| Reserved | 72 |

The mobile communication transceiver 603 sends the CT-STL message to the BS-OTA when the mobile user station wishes to change the characteristics of the over the air service across the O-Interface 610.

TABLE 2-25

| CT-SYN (Synchronize) [MS-OTA <=> BS-OTA] | |
|---|---|
| Information Element | Length in Bits |
| Message Type | 8 |
| Reserved | 152 |

Synchronize messages can be transmitted by either the BS-OTA or the mobile communication transceiver 603. They are always part of recovery from an error in a signaling transaction. They are initiated by whichever side discovered the error.

TABLE 2-26

| CT-THC (Terminating Handover Complete) [MS-OTA => Target BS-OTA] | |
|---|---|
| Information Element | Length in Bits |
| Message Type | 8 |
| Registration Type | 8 |
| Registration Status | 8 |
| Reserved | 136 |

The terminating Handover Complete message is sent from the mobile communication transceiver 603 to the target base station to complete the Terminating Handover procedure.

TABLE 2-27

| CT-THR (Terminating Handover Request) [MS-OTA => Target BS-OTA] | |
|---|---|
| Information Element | Length in Bits |
| Message Type | 8 |
| (Old) Zone | 40 |
| (Old) BSC ID | 16 |
| (Old) BS ID | 32 |
| (Old) Connection Number | 24 |
| Resource Request Data | 32 |
| Service Type | 8 |

Handovers can, with certain limitations, be initiated either from the old base station 104 (an originating handover) or the new base station 104 (a terminating handover). The mobile communication transceiver 603 will attempt a terminating handover whenever possible because they are faster and more robust. The Terminating Handover Request message is sent from the mobile communication transceiver 603 to the target BS-OTA to initiate the terminating handover procedure.

TABLE 2-28

CT-TRA (Transport Message) [MS-OTA <=> BS-OTA]

| Information Element | Length in Bits |
| --- | --- |
| Message Type | 8 |
| Transport Data | 152 |

The Transport message transports bearer or user data between the BS-OTA and mobile communication transceiver 603 on the circuit specified by TCID (part of the Message Type for CT-TRA Notes).

TABLE 2-29

CT-TSI (Time Slot Interchange) [MS-OTA => BS-OTA]

| Information Element | Length in Bits |
| --- | --- |
| Message Type | 8 |
| Reserved | 152 |

A Time Slot Interchange request shall be sent from a mobile communication transceiver 603 to a BS-OTA when the mobile communication transceiver 603 determines that its signal quality might improve if it were communicating with the BS-OTA on different time slot(s). The BS-OTA will respond with a CT-STL message, giving the mobile communication transceiver 603 a different time slot map, if it can accommodate the TSI request. If the BS-OTA cannot accommodate the TSI request it will respond with a CT-HOF message.

TABLE 2-30

CT-UID (Update ID) [MS-OTA <= BS-OTA]

| Information Element | Length in Bits |
| --- | --- |
| Message Type | 8 |
| New Personal ID | 72 |
| Reserved | 80 |

Upon receipt of an Update ID N-Note from a base station controller 105, the base station 104 sends the mobile user station 102 a CT-UID message.

The mobile communication system 101 transfers information in the form of signaling data and user data between a base station 104 and a base station controller 105 across an N-Interface 620. In a preferred embodiment, the N-Interface 620 comprises one or more 64 kbps DS0 lines between the base station 104 and base station controller 105. In a presently preferred embodiment, a base station 104 and base station controller 105 communicate signaling data across a single dedicated 64 kbps DS0 line, while user data is communicated across one or more separate 64 kbps DS0 lines. Each DS0 line operates according to the same protocol for the N-Interface 620.

Signaling data is communicated across the N-Interface 620 according to a protocol described in CCITT Recommendation Q.920/Q.921 called "Link Access Procedures on the D-channel ("LAPD"). LAPD is a subset of the ISO standard protocol High-level Data Link Control ("HDLC"). Further information regarding the LAPD protocol may be found in the CCITT IX Plenary Assembly Recommendations ("CCITT Blue Book"), Vol. VI, pp. 19–60, which is incorporated by reference as if set forth fully herein.

Signaling data information is transferred over the N-Interface 620 in the form of N-Notes. FIG. 11 is a diagram of a preferred format for a data frame 1105 which may be passed across the N-Interface 620 in the communication system 101. Each N-Note 1110 is encapsulated within a data frame 1105.

Each data frame 1105 generally begins with an opening flag 1115 and ends with a closing flag 1120. The opening flag 1115 and closing flag 1120 each comprise a predefined bit sequence (e.g., "01111110") which signals the beginning and end of a data frame 1105. A system component sending data across the N-Interface 620 examines the frame content between the opening flag 1115 and closing flag 1120, and inserts a 0-bit after all sequences of five consecutive 1-bits. A system component receiving data across the N-Interface 620 discards any 0-bit which directly follows five consecutive 1-bits.

Figure 12:
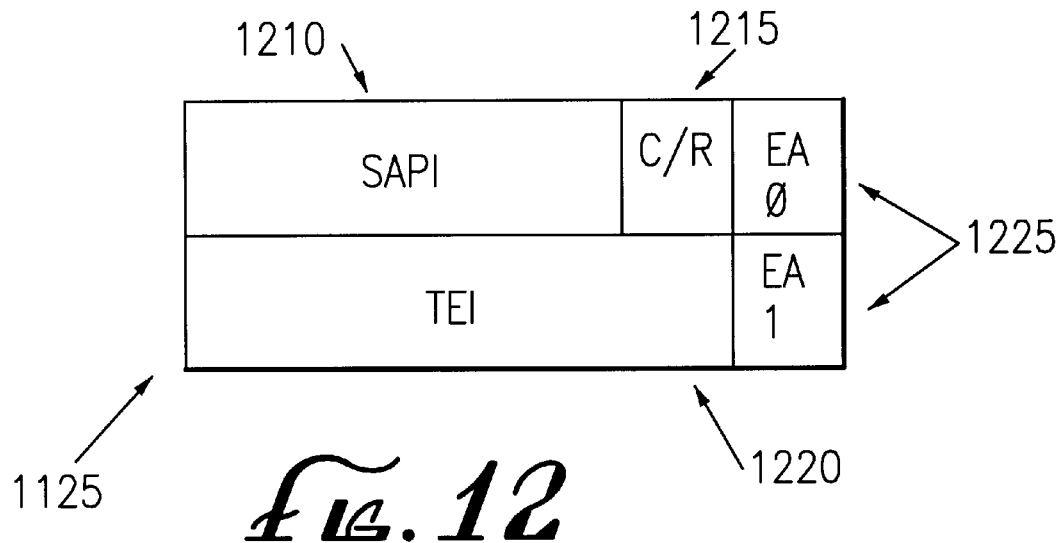
FIG. 12 is a diagram of an exemplary address field in the data packet of FIG. 11.

The opening flag 1115 is immediately followed by an address field 1125 comprising, e.g., 16 bits. FIG. 12 is a diagram of a preferred address field 1125 format. In the FIG. 12 embodiment, the address field 1125 comprises a Service Access Point Identifier (SAPI) subfield 1210 comprising, e.g., 6 bits, a command/response (C/R) bit 1215, and a terminal endpoint identifier (TEI) subfield 1220 comprising, e.g., 7 bits. The address field 1125 also has two extension address (EA) bits 1225, one in the first address field octet having a value of 0, and the second in the second address field octet having a value of 1.

The SAPI subfield 1210 identifies a protocol under which the current data frame 1105 operates. In one aspect, the SAPI subfield 1210 specifies an upper layer software entity for which the data carried by the current data frame 1105 is formatted. In a preferred embodiment, the N-Interface protocol may be specified by a SAPI subfield 1210 having a predefined value.

The TEI subfield 1220 identifies a specific terminal endpoint which is the destination for the current data frame 1105. Since the Q.921 link across the N-Interface 620 is actually a simple point-to-point connection between a base station 104 and a base station controller 105, only one TEI needs to be assigned to each physical interface in the mobile communication system 101. In a preferred embodiment, a unique TEI value is stored in each base station 104 and used during system initialization.

The address field 1125 is followed by a control field 1130 which identifies the type of frame as a command or response frame. The control field may be either a numbered information transfer (I), an unnumbered information transfer (U), or a supervisory frame (S).

The control field 1130 is followed by an information field 1135 which contains an N-Note 1110. The information field 1135 is followed by a frame check sequence 1140 comprising two eight-bit bytes.

Table 3-1 through Table 3-38 describe exemplary N-Notes which may be communicated across the N-Interface 620 in a preferred embodiment of the communication system 101. In Table 3-1 through Table 2-38, a base station 104 is denoted "BS" and a base station controller 105 is denoted "BSC."

TABLE 3-1

Assist Information [BS <=> BSC]

| Information Element | Length in Octets |
| --- | --- |
| Protocol | 1 |
| System Type | 1 |
| Message Type | 1 |

TABLE 3-1-continued

Assist Information [BS <=> BSC]

| Information Element | Length in Octets |
|---|---|
| Assist Type | 1 |
| Assist Data | 18 |

This message is sent either from the base station 104 to the base station controller 105 or from the base station controller 105 to the base station 104. It provides a mechanism to impart various items of information to assist the recipient in making well informed decisions.

TABLE 3-2

Assist Request [BS <=> BSC]

| Information Element | Length in Octets |
|---|---|
| Protocol | 1 |
| System Type | 1 |
| Message Type | 1 |
| Assist Type | 1 |
| Assist Request Info | 18 |

This message is sent either from the base station 104 to the base station controller 105 or from the base station controller 105 to the base station 104 to request information. It provides a mechanism for the sender to request various items of information to assist in making well informed decisions.

TABLE 3-3

Authenticate [BS <= BSC]

| Information Element | Length in Octets |
|---|---|
| Protocol | 1 |
| System Type | 1 |
| Message Type | 1 |
| PID | 9 |
| TCID | 1 |
| Cipher Key Sequence # | 1 |
| Authentication Test Number | 16 |

The Authenticate N-Note is sent to the base station 104 from the network 126 to request that the base station 104 send to the mobile user station 102 in an Authenticate O-Note. The mobile user station 102 will then encrypt the "random" number using the authentication key provisioned into the mobile station 102 and send this encrypted number back to the base station 104 in an Authentication Response Message (CT-AUR) reply. The base station 104 then sends this result to the network 126 in an Authentication Reply N-Note.

TABLE 3-4

Authenticate Reply [BS => BSC]

| Information Element | Length in Octets |
|---|---|
| Protocol | 1 |
| System Type | 1 |
| Message Type | 1 |
| PID | 9 |

TABLE 3-4-continued

Authenticate Reply [BS => BSC]

| Information Element | Length in Octets |
|---|---|
| Authentication Test Response | 16 |

The Authenticate Reply N-Note from the base station 104 to the network 126 is triggered by an Authentication Response O-Note (CT-AUR) from the mobile user station 102. The Authenticate Reply N-Note communicates a sixteen octet encrypted response from the mobile user station 102 to the network 126 for confirmation. The network 126 will perform encryption on the original random number and compare the results for authentication. The Authenticate Reply should be the response to an earlier Authenticate N-Note issued for the given PID by the network 126. If the return value is incorrect, the proper response of the network 126 is to deny access by the mobile user station 102.

TABLE 3-5

Authentication Reject [BS <= BSC]

| Information Element | Length in Octets |
|---|---|
| Protocol | 1 |
| System Type | 1 |
| Message Type | 1 |
| PID | 9 |
| TCID | 1 |
| Cause | 1 |

The Authentication Reject N-Note is sent to the base station 104 from the network 126 to inform the mobile user station 102 that the network 126 has rejected its Authenticate Reply.

TABLE 3-6

Base Status Request [BS <= BSC]

| Information Element | Length in Octets |
|---|---|
| Protocol | 1 |
| System Type | 1 |
| Message Type | 1 |
| PID | 9 |
| Base ID | 4 |

The Base Status Request N-Note is sent to the base station 104 by the network 126 to initiate a Base Status Response N-Note from the base station 104.

TABLE 3-7

Base Status Response [BS => BSC]

| Information Element | Length in Octets |
|---|---|
| Protocol | 1 |
| System Type | 1 |
| Message Type | 1 |
| PID | 9 |
| Base ID | 32 |

The Base Status Response N-Note is sent to the network 126 by the base station 104 after receiving a Base Status Request N-Note from the network 126.

TABLE 3-8

Cipher Response [BS => BSC]

| Information Element | Length in Octets |
|---|---|
| Protocol | 1 |
| System Type | 1 |
| Message Type | 1 |
| PID | 9 |
| Cause | 2 |

The Cipher Response N-Note is sent to the network 126 to inform it that the base station 104 and mobile user station 102 have configured and keyed their encryption equipment and have enabled the equipment.

TABLE 3-9

Circuit Switch Complete [BS <= BSC]

| Information Element | Length in Octets |
|---|---|
| Protocol | 1 |
| System Type | 1 |
| Message Type | 1 |
| PID | 9 |
| (New) Zone | 5 |
| (New) Base ID | 4 |
| HRef | 6 |

The Circuit Switch Complete N-Note is sent to the originating base station 104 from the network 126 when a handover circuit switch operation has completed. This message informs the originating base station 104 that the bearer channel has been 20 switched from the originating base station 104 to the terminating base station 104 and that the originating base station 104 may release all the resources associated with the mobile user station 102.

TABLE 3-10

Circuit Switch Refused [BS => BSC]

| Information Element | Length in Octets |
|---|---|
| Protocol | 1 |
| System Type | 1 |
| Message Type | 1 |
| PID | 9 |
| (New) Zone | 5 |
| (New) Base ID | 4 |
| HRef | 6 |

The Circuit Switch Refused N-Note is sent to the network 126 from the originating base station 104 when the mobile user station 102 has rejected the circuit switch.

TABLE 3-11

Connect Link [BS => BSC]

| Information Element | Length in Octets |
|---|---|
| Protocol | 1 |
| System Type | 1 |
| Message Type | 1 |
| PID | 9 |
| TCID | 1 |

The Connect Link N-Note is sent from the base station 104 to the network 126 as the result of a CT-CNL message received from an mobile user station 102 while the base station 104 and mobile user station 102 are in a HOLD sequence initiated during an incoming call. The CT-ACK control traffic will be returned from the mobile user station 102. This message informs the network 126 that it may complete the connection with the calling station.

TABLE 3-12

Connect Link [BS <= BSC]

| Information Element | Length in Octets |
|---|---|
| Protocol | 1 |
| System Type | 1 |
| Message Type | 1 |
| PID | 9 |
| TCID | 1 |
| Connection Number | 3 |
| Cause | 1 |

The Connect Link N-Note is sent to the base station 104 from the network 126 when a connection has been made to another station via the network 126. This message associates the PID of an mobile user station 102 with a Connection Number.

TABLE 3-13

Connection Complete [BS <= BSC]

| Information Element | Length in Octets |
|---|---|
| Protocol | 1 |
| System Type | 1 |
| Message Type | 1 |
| PID | 9 |
| TCID | 1 |
| Cipher Algorithm ID | 1 |
| Cipher Key | 8 |
| Connection Number | 3 |

The Connection Complete N-Note is sent to the termination base station 104 from the network 126 when a handover circuit switch operation has completed. This message informs the terminating base station 104 that the bearer channel has been switched from the originating base station 104 to the terminating base station 104.

TABLE 3-14

Deregister [BS => BSC]

| Information Element | Length in Octets |
|---|---|
| Protocol | 1 |
| System Type | 1 |
| Message Type | 1 |
| PID | 9 |
| Class | 2 |
| Cause | 1 |

The Deregister N-Note is issued from the base station 104 to the network 126 as the result of either a DRG control traffic response message or a base station time-out, which indicates that the identified mobile user station 102 is no longer in the response range of the base station 104. The proper response of the network 126 is to release all resources which may have been preallocated to the mobile user station 102.

TABLE 3-15

Handover Failure [BS <= BSC]

| Information Element | Length in Octets |
|---|---|
| Protocol | 1 |
| System Type | 1 |
| Message Type | 1 |
| PID | 9 |
| Cause | 1 |

The Handover Failed N-Note is sent to both the source and target base stations 104 from the network 126 when the higher order network infrastructure has rejected the terminating or originating handover request from the mobile user station 102. Each base station must send a CT-HOF O-Note to the mobile user station 102 if/when it communicates with the mobile user station 102. The source base station 104 will maintain the existing connection to the mobile user station 102; the target base station 104 will release the connection with the mobile user station 102 after sending the CT-HOF.

TABLE 3-16

Handover Request [BS <= BSC]

| Information Element | Length in Octets |
|---|---|
| Protocol | 1 |
| System Type | 1 |
| Message Type | 1 |
| TCID | 1 |
| HRef | 6 |
| Connection Number | 3 |
| Cipher Algorithm ID | 1 |
| Cipher Key | 8 |
| Resource Request Data | 4 |
| Service Type | 1 |

The Handover Request N-Note is sent to the target base stations from the base station controller when the higher order network infrastructure is attempting to perform an originating handover request from the mobile user station 102. The target base station 104 will reserve the requisite resources for the circuit being handed over, if available, and will respond to the base station controller 105 with a Handover Request ACK message.

TABLE 3-17

Handover Request Reply [BS => BSC]

| Information Element | Length in Octets |
|---|---|
| Protocol | 1 |
| System Type | 1 |
| Message Type | 1 |
| HRef | 6 |
| Backhaul Map Type | 1 |
| Backhaul Map | 4 |
| Cause | 1 |

The Handover Request Reply N-Note is sent to the base station controller 105 in response to the Handover Request message.

TABLE 3-18

ID Updated [BS <=> BSC]

| Information Element | Length in Octets |
|---|---|
| Protocol | 1 |
| System Type | 1 |
| Message Type | 1 |
| PID | 9 |
| Cause | 1 |

The ID Updated N-Note is sent by the base station 104 to the network 126 to indicate the successful updating of an mobile user station PID.

TABLE 3-19

Identity Reply [BS => BSC]

| Information Element | Length in Octets |
|---|---|
| Protocol | 1 |
| System Type | 1 |
| Message Type | 1 |
| PID | 9 |
| Identity Type | 1 |
| Identity Data | 9 |

The Identity Reply N-Note is sent by the base station 104 to the network 126 to provide the mobile user station's requested identity.

TABLE 3-20

Identity Request [BS <= BSC]

| Information Element | Length in Octets |
|---|---|
| Protocol | 1 |
| System Type | 1 |
| Message Type | 1 |
| PID | 9 |
| Identity Type | 1 |

The ID Updated N-Note is sent by the network 126 to the base station 104 to request a mobile user station identifier that has not been provided as part of the mobile user station's normal communications with the network 126.

TABLE 3-21

Originating Handover [BS => BSC]

| Information Element | Length in Octets |
|---|---|
| Protocol | 1 |
| System Type | 1 |
| Message Type | 1 |
| PID | 9 |
| Count BasE | 1 |
| (New) Zone | 5 |
| (New) BSC ID | 2 |
| (New) Base ID | 4 |

The Originating Handover N-Note is sent from the base station 104 to the network 126 after an mobile user station 102 has returned to the originating base station 104 and has completed the originating handover control traffic sequence. This message contains the PID of the mobile user station 102, the base station ID and Zone of the terminating base station 104. This information is to be used by the network 126 to establish a bearer connection to the terminating base station 104. The network 126 should respond to the originating base station 104 with a Circuit Switch Complete N-Note signifying that the terminating base station 104 is now connected to the proper bearer channel.

Provision is made for this message to provide a list of base stations 104 the mobile user station 102 is willing to handover to. This allows the potential ability for the mobile user station 102 to signal the base station 104, as part of the CT-OTH message, that there are several acceptable alternatives and to send each of them to the originating base station 104 as sequential CT-OTH messages. The base station 104 may accumulate the acceptable base station list and send it to the base station controller 105 in a single message. The Count Base field lists the number of base stations 104 in the list.

TABLE 3-22

Originating Handover Complete [BS => BSC]

| Information Element | Length in Octets |
|---|---|
| Protocol | 1 |
| System Type | 1 |
| Message Type | 1 |
| PID | 9 |
| HRef | 6 |

The Originating Handover Complete N-Note is issued from the terminating base station 104 to the terminating application end user (e.g., network 126) connected to the base station controller 105 when a mobile user station 102 has completed its transfer of its bearer traffic from the originating base station 104 to the terminating base station 104. This happens when the mobile user station 102 issues a Originating Handover Complete control traffic message to the terminating base station 104.

TABLE 3-23

Page [BS <= BSC]

| Information Element | Length in Octets |
|---|---|
| Protocol | 1 |
| System Type | 1 |
| Message Type | 1 |
| PID | 9 |
| TCID | 1 |

The Page N-Note is sent to the base station 104 from the network 126 to notify the base station 104 of an incoming call. The base station 104 should initiate a Specific Poll sequence for the mobile user station 102 named by the PID. When the mobile user station 102 responds to the Specific Poll, the base station 104 should send an Altering N-Note back to the network 126.

TABLE 3-24

Page Response [BS => BSC]

| Information Element | Length in Octets |
|---|---|
| Protocol | 1 |
| System Type | 1 |
| Message Type | 1 |
| PID | 9 |
| TCID | 1 |
| Cipher Key Sequence # | 1 |
| Class | 2 |

The Page Response N-Note is sent from the base station 104 to the network 126 as soon as a specific poll response, which is the result of an Setup N-Note initiated specific poll, is received from the mobile user station 102 named by the PID. This notification can be used by the network 126 to indicate a successful attempt to find a specific mobile user station 102.

If the network 126 does not receive Page Response from the base station 104 sometime after the network 126 has sent a Setup N-Note to the base station 104, the network 126 may infer that the given mobile user station 102 is not currently reachable through this base station 104. Being unavailable should trigger a Deregistration sequence.

TABLE 3-25

Register [BS <= BSC]

| Information Element | Length in Octets |
|---|---|
| Protocol | 1 |
| System Type | 1 |
| Message Type | 1 |
| PID | 9 |
| Registration Type | 1 |
| Registration Info | 18 |
| Cipher Key Sequence # | 1 |
| Class | 2 |

The Register N-Note is sent to the network 126 from the base station 104 as a result of the completion of an acquire and registration poll and control traffic sequence between the mobile user station 102 and the base station 104. This message requests that resources needed to access application end user be allocated in the network 126 for this mobile user station 102. If these resources have already been allocated, then the network 126 should not allocate new resources. In any event, the network 126 should reply with a Registration Result N-Note.

TABLE 3-26

Registration Result [BS <= BSC]

| Information Element | Length in Octets |
|---|---|
| Protocol | 1 |
| System Type | 1 |
| Message Type | 1 |
| PID | 9 |
| Cause | 1 |

The Registration Result N-Note is sent to the base station 104 from the network 126 when the higher order network infrastructure responds to the mobile user station's Register request.

TABLE 3-27

Release Link [BS <= BSC]

| Information Element | Length in Octets |
|---|---|
| Protocol | 1 |
| System Type | 1 |
| Message Type | 1 |
| PID | 9 |
| TCID | 1 |
| Cause | 18 |

The N-Note Release Link is sent by either the base station 104 or the network 126 to indicate that the sender wishes to release the link. If the TCID is non-zero, the Release Link is for a virtual circuit and the request is ignored. If the TCID is zero, a Release Link Complete message is always sent (even if recipient does not recognize the PID).

TABLE 3-28

| Release Link Complete [BS <= BSC] | |
| --- | --- |
| Information Element | Length in Octets |
| Protocol | 1 |
| System Type | 1 |
| Message Type | 1 |
| PID | 9 |
| TCID | 1 |

The Release Link Complete N-Note is sent by either the base station 104 or the network 126 to indicate that the sender has released the channel and the TCID.

TABLE 3-29

| Service Information [BS <= BSC] | |
| --- | --- |
| Information Element | Length in Octets |
| Protocol | 1 |
| System Type | 1 |
| Message Type | 1 |
| PID | 9 |
| Backhaul Map Type | 1 |
| Backhaul Map | 4 |
| Cause | 1 |

The Service Information N-Note is sent from the base station 104 to the network 126. This message informs the network 126 of the bearer channels that have been assigned by the base station 104 for this call.

TABLE 3-30

| Cipher Mode [BS <= BSC] | |
| --- | --- |
| Information Element | Length in Octets |
| Protocol | 1 |
| System Type | 1 |
| Message Type | 1 |
| PID | 9 |
| Cipher Algorithm ID | 1 |
| Cipher Key | 8 |

The Set Cipher Mode N-Note is sent from the network 126 to the base station 104. It requests the base station 104 to set the mode key and key sequence of its encryption equipment. The base station 104 does not enable its encryption equipment at this time.

TABLE 3-31

| Service Request [BS => BSC] | |
| --- | --- |
| Information Element | Length in Octets |
| Protocol | 1 |
| System Type | 1 |
| Message Type | 1 |
| PID | 9 |
| TCID | 1 |
| Resource Request Data | 4 |
| Service Type | 1 |
| Key Sequence # | 1 |
| Class | 2 |

The Service Request N-Note is sent to the network 126 the base station 104 upon the completion of CT-SRQ control traffic exchange. Failure to respond will result in dropping the connection between the base station 104 and mobile user station 102.

TABLE 3-32

| Service Response [BS <= BSC] | |
| --- | --- |
| Information Element | Length in Octets |
| Protocol | 1 |
| System Type | 1 |
| Message Type | 1 |
| PID | 9 |
| TCID | 1 |
| Cause | 1 |

The Service Response N-Note is sent to the base station 104 by the network 126 to notify the base station 104 of the results of the base station's Service Request message.

TABLE 3-33

| Set Link [BS <= BSC] | |
| --- | --- |
| Information Element | Length in Octets |
| Protocol | 1 |
| System Type | 1 |
| Message Type | 1 |
| PID | 9 |
| TCID | 1 |
| Resource Request Data | 4 |
| Connection Number | 1 |

The Set Link N-Note is sent to the base station 104 from the network 126 to notify the base station 104 of a SETUP message from the network 126.

TABLE 3-34

| Terminating Handover [BS => BSC] | |
| --- | --- |
| Information Element | Length in Octets |
| Protocol | 1 |
| System Type | 1 |
| Message Type | 1 |
| PID | 9 |
| (Old) Zone | 5 |
| (Old) BSC ID | 2 |
| (Old) Base ID | 4 |
| Connection Number | 3 |
| (New) Backhaul Map Type | 1 |
| (New) Backhaul Map | 4 |

The Terminating Handover N-Note is sent from the base station 104 to the network 126 after an mobile user station 102 has acquired a base station channel (i.e., time slot) on the terminating base station 104 and has completed the Terminating Handover Request Control Traffic sequence. This message contains the PID and Universal Phone number of the mobile user station 102, as well as the Connection Number, Zone and base station controller ID of the base station controller which had been previously carrying the connection. This information is used by the network 126 to establish a bearer connection to the previous connection and to inform the old base station 104 to release its connection and the resources allocated to this mobile user station 102. Within a reasonable amount of time, the network 126 should respond to the base station 104 with a Circuit Switch Complete N-Note signifying that this base station 104 is now connected to the proper bearer channel.

TABLE 3-35

| Terminating Handover Complete [BS => BSC] | |
|---|---|
| Information Element | Length in Octets |
| Protocol | 1 |
| System Type | 1 |
| Message Type | 1 |
| PID | 9 |

The Terminating Handover Complete N-Note is issued from the terminating base station 104 to the terminating application end user connected to the base station controller 105 when a mobile user station 102 has completed its transfer of its bearer traffic from the originating base station 104 to the terminating base station 104. This happens when the mobile user station 102 issues a Terminating Handover Complete O-Note to the terminating base station 104.

TABLE 3-36

| Transfer Complete [BS => BSC] | |
|---|---|
| Information Element | Length in Octets |
| Protocol | 1 |
| System Type | 1 |
| Message Type | 1 |
| PID | 9 |

The Transfer Complete N-Note is issued from the base station 104 to the network 126 when a mobile user station 102 transfers its bearer traffic from the originating base station 104 to the terminating base station 104. This is assumed to occur when the originating base station 104 sends a Circuit Switch Complete (CSC) O-Note to the mobile user station 102.

TABLE 3-37

| Transport [BS <=> BSC] | |
|---|---|
| Information Element | Length in Octets |
| Protocol | 1 |
| System Type | 1 |
| Message Type | 1 |
| PID | 9 |
| TCID | 1 |
| Transport Data | 19 |

The Transport N-Note is sent from the base station 104 to the network 126 to send signaling or bearer data to the network 126.

TABLE 3-38

| Update ID [BS <= BSC] | |
|---|---|
| Information Element | Length in Octets |
| Protocol | 1 |
| System Type | 1 |
| Message Type | 1 |
| PID | 9 |
| New PID | 9 |

The Update ID N-Note is sent to the base station 104 from the application end user connected to the base station controller 105 to notify the base station 104 to update the identity of the mobile user station 102 described by the PID information element. The New PID information element may represent a temporary identification for the mobile user station 102 as provided for in the definition of the New PID.

Figure 8:
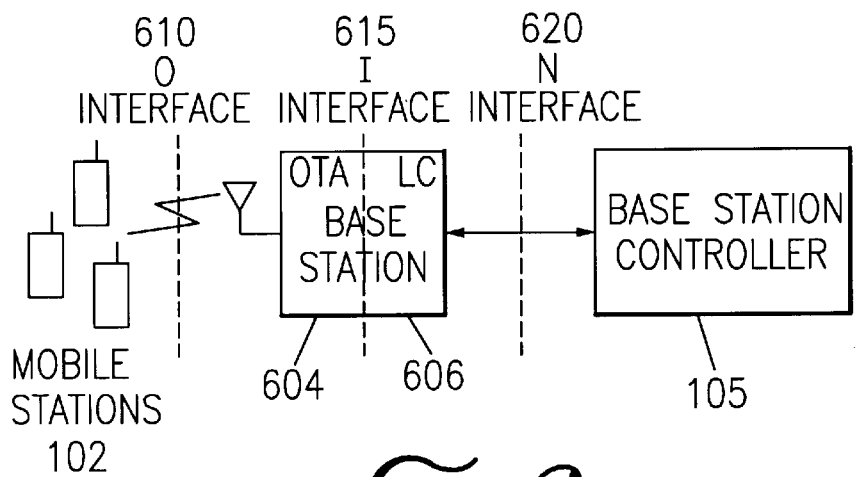
FIG. 8 is a diagram of an embodiment of the FIG. 6 system architecture focusing on the base station interfaces.

The mobile communication system 101 transfers information in the form of signaling data within the base station 104 between the base station transceiver 604 and the base station line card processor 606 across the I-Interface 615 in the form of I-Notes. FIG. 8 is a diagram of the FIG. 6 system architecture focusing on the base station interfaces, showing the separation between the base station transceiver 604 and the line card processor 606. The base station transceiver 604 and the line card processor 606 preferably each has its own local microprocessor or controller, and its own resident software.

Figure 9:
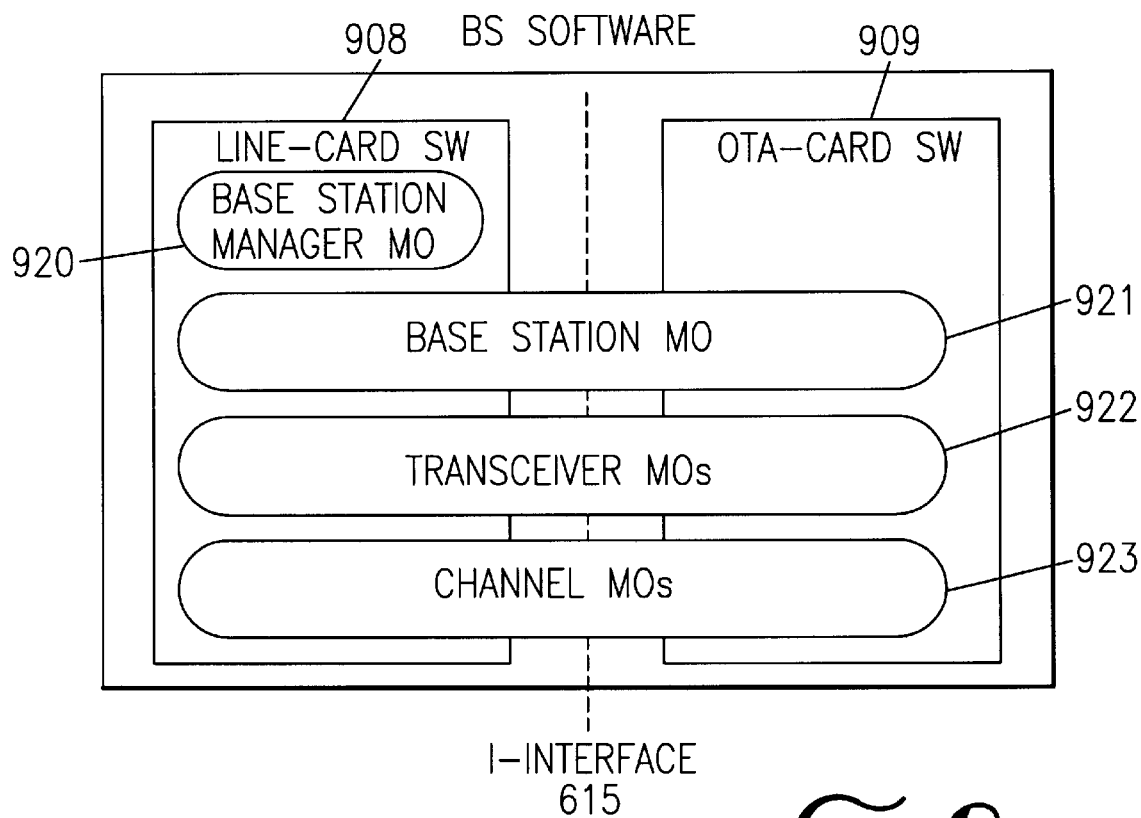
FIG. 9 is a diagram illustrating a breakdown of software functionality within a base station.

FIG. 9 is a diagram illustrating a breakdown of software functionality for operations, administration, maintenance and provisioning (OAM&P) within a base station 104. In FIG. 9 is shown a functional division between base station transceiver software 909 and the line card processor software 908. The base station transceiver software 909 and line card processor software 908 are directed to the control of managed objects. The line card processor software 908 is responsible by itself for the control of a base station manager managed object 920, and shares responsibility with the base station transceiver software 909 for control of a base station managed object 921, transceiver managed objects 922, and channel managed objects 923.

The base station manager managed object 920 is responsible for communication of high layer information between the base station 104 and the base station controller 105, and for the management of all functionality related to the line-card processor 606. The base station managed object 921 provides the OAM&P control functions common to one or more transceivers, and is responsible for all OAM&P base station functionality other than the line card processor 606. The transceiver managed objects 922 are reponsible for the management of the base station equipment that provides the time slot structure shown in FIG. 3, including modulation and transmission of information data as well as reception and demodulation. The channel managed objects 923 are responsible for the management of individual physical channels (i.e., separate time slots 302).

Control of the OAM&P functions are carried out across the OOMT interface between the base station controller 105 and the base station 104 shown in FIG. 6.

Figure 14:
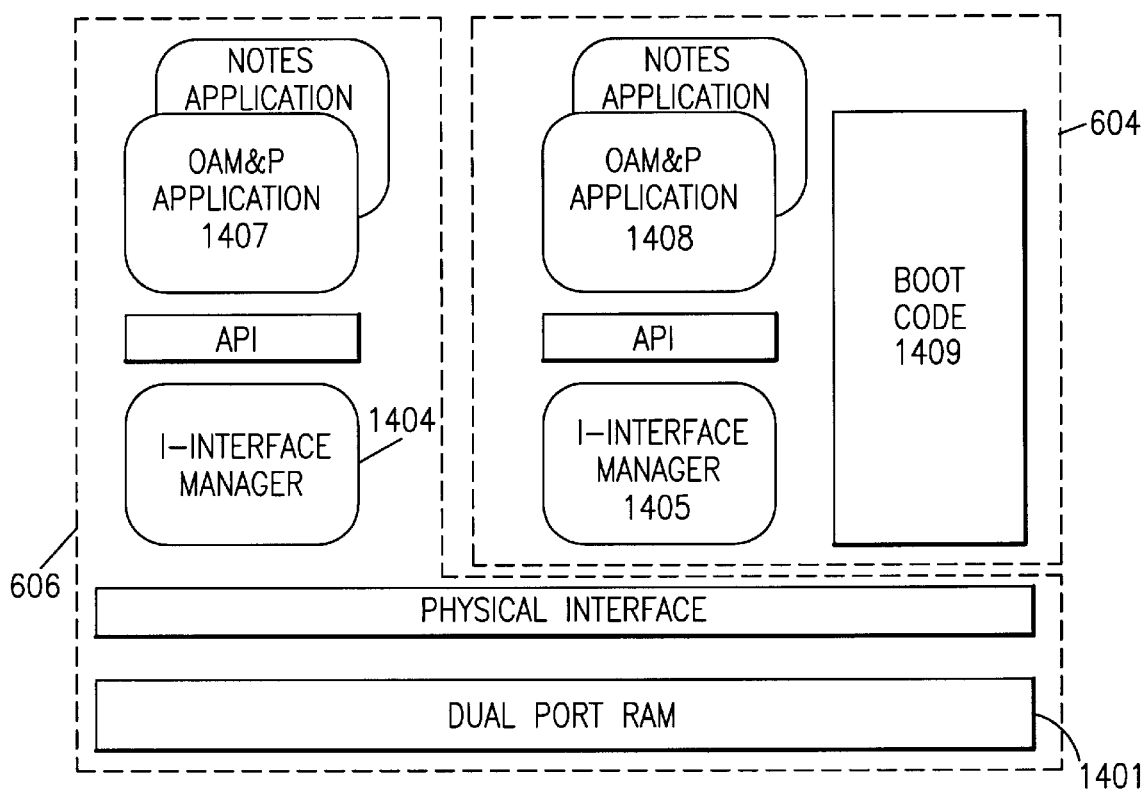
FIG. 14 is a diagram of a particular I-interface architecture utilizing a shared memory element (i.e., dual-port RAM)

In a preferred embodiment, the I-Interface 615 includes a dual port random access memory (RAM). FIG. 14 is a high-level diagram of a base station 104 including a dual-port RAM 1401 for implementing the I-interface 615. Application information 1407, 1408 is communicated across the I-interface using the dual-port RAM 1401. The base station transceiver 604 and line card processor 606 each comprise an I-interface manager 1405 and 1404, which may be implemented as software subroutines. The I-interface managers 1404, 1405 facilitate transfer of information across the I-interface 615.

The physical interface to the dual-port RAM 1401 is preferably identical for both the base station transceiver 604 and the line card processor 606. The base station transceiver 604 comprises boot code 1409 (in addition to operational code); thus, two modes of use are provided: (1) a non-operational mode, wherein the dual-port RAM 1401 may be used for initialization of the base station transceiver 604 (including software download from a base station controller 105, if desired), and (2) an operational mode, wherein the dual-port RAM 1401 is used for transfer of information to and from an application end user 602 using the I-interface 615.

The dual port RAM 1401 comprises a common memory which may be accessed by both the line card processor 606 and the base station transceiver 604 in the base station 104. The line card processor 606 and the base station transceiver 604 transfer information across the I-Interface 615 by reading and writing I-Notes to the common dual port RAM 1401. The dual port RAM 1401 is also used for transfer of bearer information for each of the time slot channels, and thus comprises adequate storage to transfer data blocks to and from mobile user stations 102. Alternatively, the bearer data could be provided in a direct link to the line card processor 606 from the base station transceiver 604.

System requirements may specify that certain events or messages have a greater priority over other events occurring in the system. For example, handoff events or emergency events may have a relatively high priority. Call control events may also have a relatively high priority, but less than that of handoff events or emergency events. Application messages may be given a lower priority than signaling messages.

The I-interface may be configured so as to facilitate prioritization of various events and system messages. A plurality of distinct priority groups may be defined. In a particular embodiment, three priority groups are defined, a high priority group including, e.g., handoff events and emergency events, a medium priority group including, e.g., communication management events and call control messages, and a low priority group including other types of less urgent messages.

A plurality of prioritized queues may be provided, each prioritized queue associated with one of the three priority groups. Each prioritized queue comprises a plurality of message buffers (preferably fixed length message buffers). Messages from the high priority group are placed in a first queue; messages from the medium priority group are placed in a second queue; and messages from the low priority group are placed in a third queue. The I-interface managers 1404, 1405 keep track of the prioritized queues and handle message transfers to and from the queues.

The queues may each operate on a "first-in first-out" (FIFO) basis. Where several messages are to be aggregated for delivery or reception over a particular channel (e.g., time slot), each channel may be provided with its own individual FIFO. Both "send" and "receive" queues are provided for bi-directional transfer of information.

The I-interface managers 1404, 1405 each implement at least three software functions with respect to the prioritized queues. A first sofware function returns a pointer to the next available send NOTE buffer in the designated queue. A NULL return pointer indicates that the queue is full. A second software function activates any semaphore and updates pointers for a queue acting on the current send NOTE buffer. A zero return value indicates success. A third software function returns a pointer to the next available NOTE buffer in the designated queue. A NULL return pointer indicates that the queue is full.

FIG. 15 is a table of an exemplary partial map for a dual-port RAM 1401. The dual port RAM map includes the total number of prioritized queues and, for each queue, the address of a read ("get") pointer, the address of a write ("put") pointer, the start address of the queue, and the queue length.

The dual-port RAM 1401 is used for both bearer data message transfer and prioritization of certain signaling messages. Bearer data messages are stored in predefined locations in the dual-port RAM 1401, and can be accessed by either the line card processor 606 or the base station transceiver 604. The dual-port RAM 1401 may preferably hold at least 2,304 bearer-bytes of information (for a base station 104 supporting up to 32 user stations 102), and has an additional 32 kilobytes for the prioritized queues.

Figure 16A:
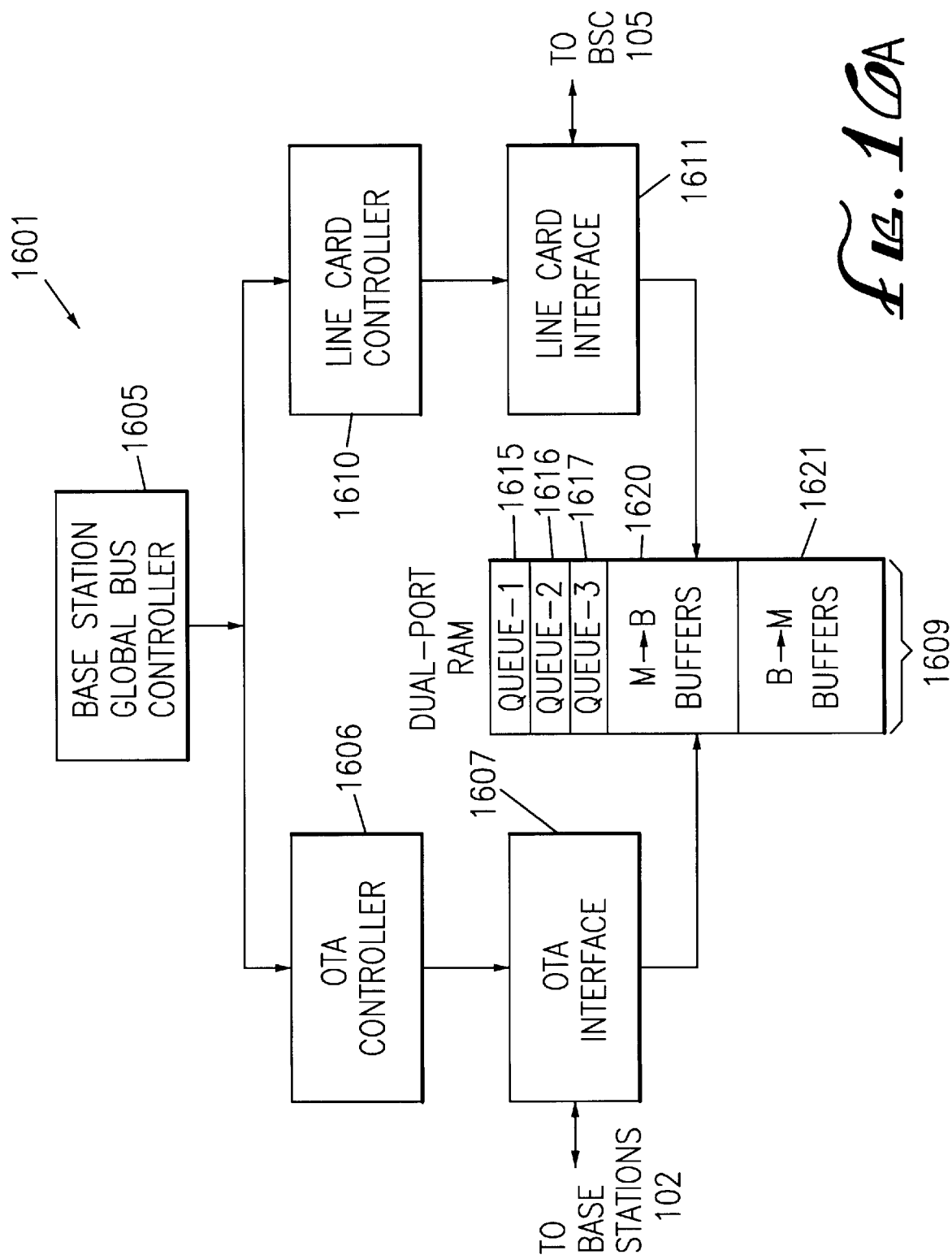
FIGS. 16A and 16B are a block diagrams of a base station showing separate controllers and interface components.

FIG. 16A is a block diagram of a base station 1601 in accordance with one embodiment of the present invention. In FIG. 16, a dual-port RAM 1609 (e.g., dual-port RAM 1401 of FIG. 14) comprises a plurality of queues 1615, 1616, and 1617, and buffers 1620, 1621 for storing messages originating from and destined for user stations 102. An over-the-air (OTA) interface 1607, under control of an OTA controller 1606, transmits and receives messages from user stations 102. A line card interface 1611, under control of a line card controller 1610, transmits and receives messages from a base station controller 105 (see FIG. 1B). A base station global bus controller 1605 controls mode selection of the OTA controller 1606 and line card controller 1610, handles interrupts, and responds to commands from the system regarding operation of the base station 1601 as a whole (e.g., whether the base station 104 should be on-line or off-line, etc.).

Figures 2, 16B:
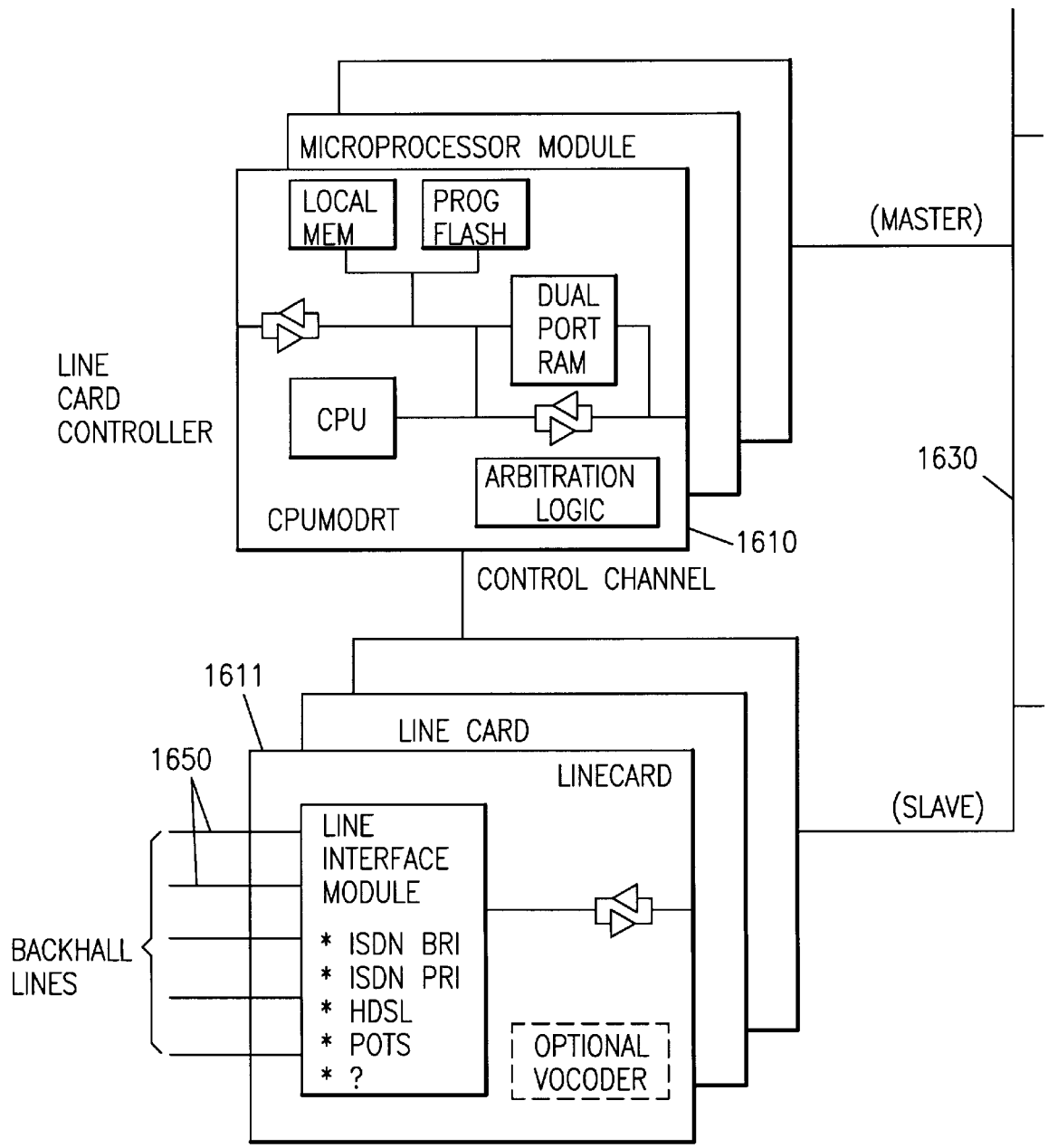
Figure 16B:
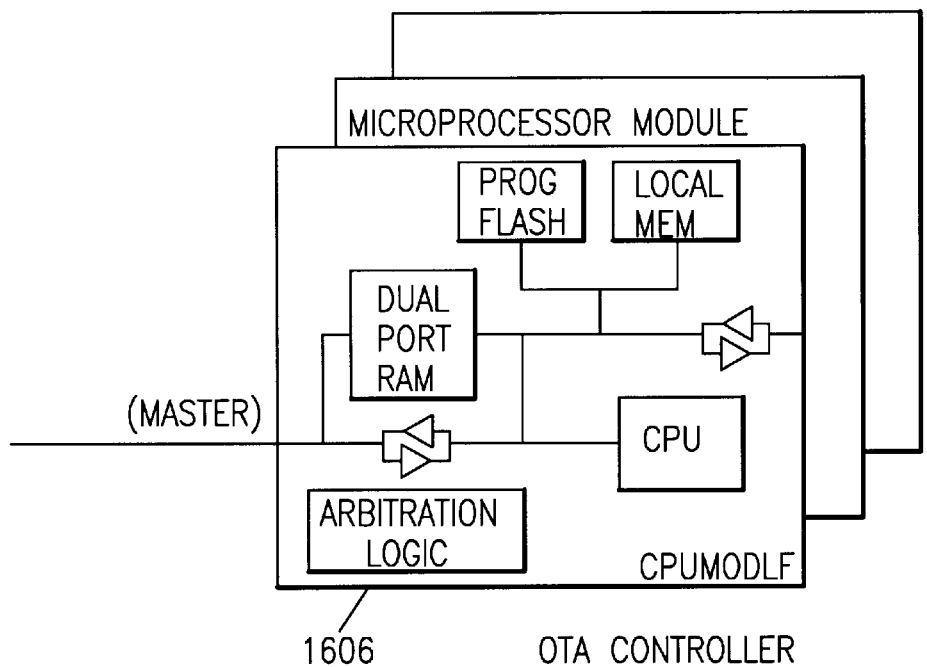

FIG. 16B is a more detailed diagram of internal components of the base station 1601, showing the internal components and connections of the components shown in FIG. 16A. The FIG. 16B diagram shows a global bus 1630 connected to several of the internal components, as well as backhaul lines 1650 from the line card interface 1611 which ultimately connect to the base station controller 105.

Figure 17A:
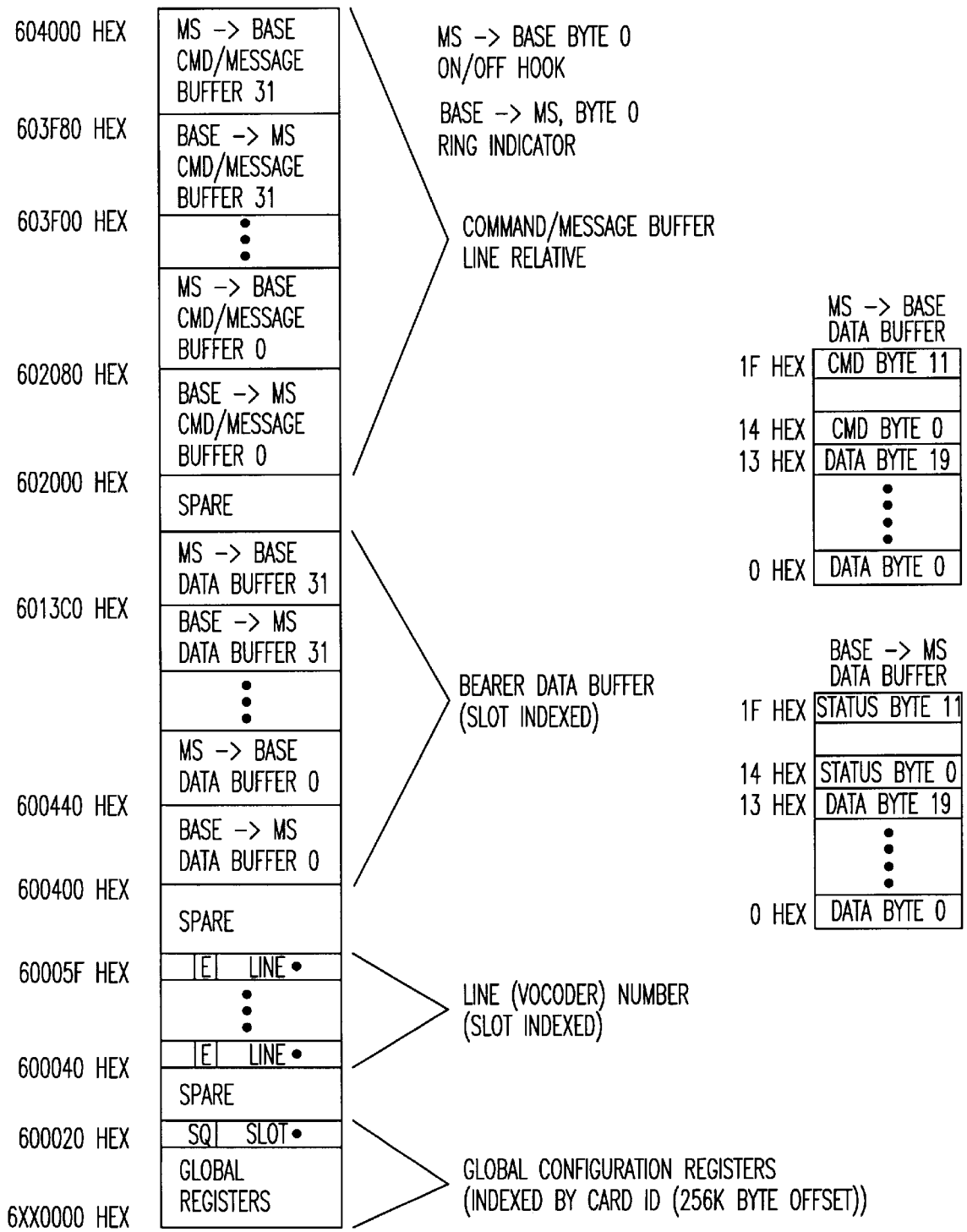
FIGS. 17A and 17B are exemplary dual-port RAM maps.
Figure 17B:
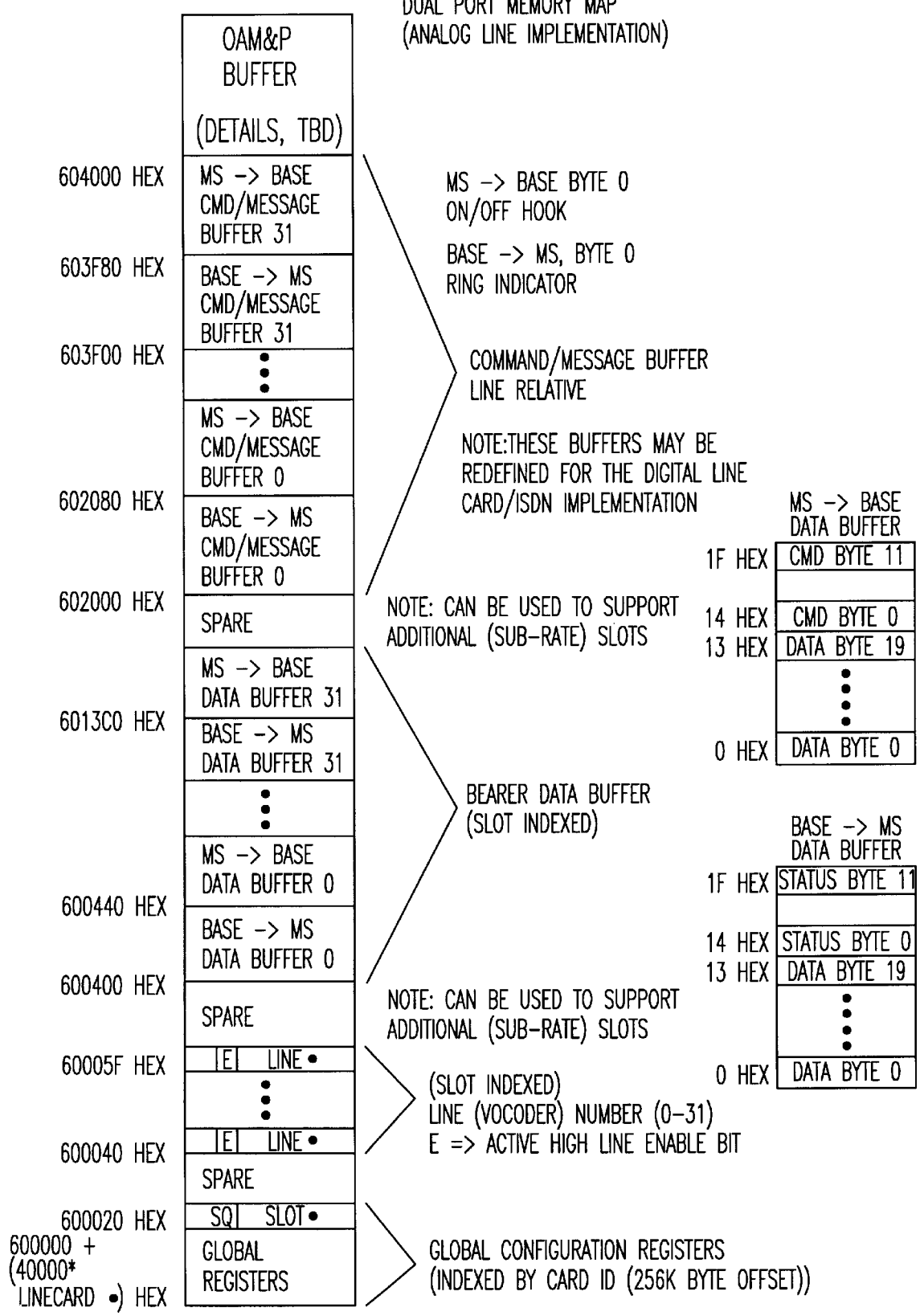

FIG. 17A is a diagram of an exemplary memory map for the dual-port RAM 1401, not considering the map portion for the prioritzed queues shown in FIG. 15. FIG. 17B is an alternative memory map for the dual-port RAM 1401, and is configured for analog backhaul lines from the base station 104 to the base station controller 105.

In a preferred embodiment, the communication system 101 uses I-Notes having the same format as the N-Notes as shown in FIG. 11. Examples of I-Notes which may be communicated across the I-Interface are given in Table 3-1 through Table 3-38.

Because messages to and from the user stations 102 are generally not in the form of I-Notes, the base station transceiver 604 translates relevant portions of the over-the-air messages into an I-Note format, and either uses or sends I-Notes received from the line card processor 606 across the I-interface 605. If an O-Note is contained in a B-field 529 of a user message (as indicated by a flag in the header 523), then the base station transceiver 604 extracts the O-Note and places it in one of the three queues 1615, 1616 or 1617. If an O-Note is contained in segments within D-fields 527 sent over several messages, then the base station transceiver 604 may store the O-Note in a buffer associated with the user station 102 on the particular channel until the entire O-Note is received, and then place the entire O-Note in the appropriate one of the three queues 1615, 1616 or 1617. In some cases, the base station transceiver 604 performs a translation (or removes or adds fields or other information) before storing the message (now an I-Note) in the appropriate queue 1615, 1616 or 1617.

Similarly, when the base station transceiver 604 reads an I-Note from the dual-port RAM 1609, it may perform a translation of the I-Note (or remove or add fields as necessary) and insert the message (now an O-Note) in the B-field 559 of a base message, and indicate the presence of an O-Note by setting the appropriate flag in the base message header 553. If the O-Note does not represent a relatively urgent signaling message, and voice data or other user data is being sent in the B-field 559, the base station transceiver 604 may send the O-Note in segments over a plurality of base messages, utilizing the D-field 557.

In a preferred embodiment, the communication system 101 operates with Notes which contain common Information Elements which may be passed across several system interfaces. Table 4-1 through Table 4-65 describe Information Elements which may be included in Notes which are communicated across system interfaces in a preferred embodiment of the communication system 101. Information Elements may comprise signaling data which is used by components within the communication system 101 to perform functions in support of one or more application end users. A specific Information Element, referred to as Transport Data, comprises application level data and is described in Table 4-62.

TABLE 4-1

ACK'ed Command [O, M]

The ACK'ed Command information element contains the Type of the specific command being acknolwed. The values are the same as the Message Type on the given interface.

| Bits | Octets |
|---|---|
| 8 7 6 5 4 3 2 1 | |
| ACK'ed Response | 1 |

TABLE 4-2

ACK Reponse [O, M]

The ACK Response information element contains the acknowledgement response.

| Bits | Octets |
|---|---|
| 8 7 6 5 4 3 2 1 | |
| ACK'ed Response | 1 |

ACK Response

| | |
|---|---|
| 0 | Successful acknowledge |
| 1 | Unsuccessful acknowledge (NAK) |
| 2–255 | Reserved |

TABLE 4-3

Assist Data [O, M, N, I]

The Assist Data element is a 144 bit field that is used by the sender to pass information to the receiver. This information may or may not have been solicited by an Assist Request. The format and meaning of the Assist Information is dependent upon the Assist Type.

| Bits | Octets |
|---|---|
| 8 7 6 5 4 3 2 1 | |
| 144 bit Assist Data | 1 |
| | 2 |
| | 3 |
| | 4 |
| | . |
| | . |
| | . |
| | 18 |

TABLE 4-4

Assist Request Info

The Assist Request Info element is a 144 bit field that is used by the sender of an Assist Request to provide additional information identifying the request. The most likely use of this element will be to provide a PID when requesting information about a specific user station 102. This information element also contains the identity of the requester so that the requester can be named as the recipient of the Assist Information message which results from this request. The format and meaning of the Assist Request Info is dependent upon the Assist Type.

| Bits | | Octets |
|---|---|---|
| 8 7 6 | 5 4 3 2 1 | |
| Assist Requester | 141 bits Assist Request Info | 1 |
| | | 2 |
| | | 3 |
| | | 4 |
| | | . |
| | | . |
| | | . |
| | | 18 |

TABLE 4-5

Assist Type [O, M, N, I]

The Assist Type is divided into two subfields,

| Bits | | Octets |
|---|---|---|
| 8 7 6 | 5 4 3 2 1 | |
| Assist Msg Recipient | Assist Item | 1 |

TABLE 4-5.1

Assist Item
Identifies the Information being Requested.

| Assist Type | Information Source | Item |
|---|---|---|
| 0 | — | Reserved |
| 1 | BS-OTA | Surrounding Base Table |
| 2 | BS-OTA | Surrounding Base Table (Continuation) |
| 3 | BS-OTA | Recommend Time Slot Interchange |
| 4 | BS-OTA | Recommend Handover |
| 5 | BS-OTA | Date & Time |
| 6 | BS-OTA | OTA Map |
| 7 | BS-OTA | Backhaul Map |
| 8 | BSC | Date & Time |
| 9 | BSC | Code-Frequency Redefinition |
| 10–31 | — | Reserved |

TABLE 4-5.2

Assist Msg Recipient
Identifies the recipient of the assist message. If the message is an Assist Request message, then the recipient is the Information Source (i.e., the process which provides the information). If the message is an Assist Information message, then the recipient is the Information Destination (i.e., the process which may use the information). If the Assist Information message was requested, the Assist Message Recipient will be the Assist Requester subfield of the Assist Request Info information element of the Assist Request message is unsolicited, the sender will be able to supply the Assist Message Recipient independently.

The following recipients are defined:

| | |
|---|---|
| 0 | MS-APP |
| 1 | MS-OTA |
| 2 | BS-OTA |
| 3 | BS-Line Card |
| 4 | BSC |
| 5–7 | Reserved |

TABLE 4-6

Authentication Test Number [O, M, N, I]

The Authentication Test Number information element contains a 16 byte (128 bit) value to be used in authenticating an user station 102.

TABLE 4-6.1

Key Type is DCS1900:

If the Protocol of an Authenticate message is DCS1900, then the authentication parameter is a 128 bit pseudo random number which is sent to the user station 102 for the authentication process.

| Bits | | | | | | | | Octets |
|---|---|---|---|---|---|---|---|---|
| 8 | 7 | 6 | 5 | 4 | 3 | 2 | 1 | |
| 128 bit Pseudo Random Number | | | | | | | | 1 |
| . | | | | | | | | 2 |
| . | | | | | | | | 3 |
| . | | | | | | | | 4 |
| | | | | | | | | 5 |
| | | | | | | | | 6 |
| | | | | | | | | 7 |
| | | | | | | | | 8 |
| | | | | | | | | 9 |
| | | | | | | | | 10 |
| | | | | | | | | 11 |
| | | | | | | | | 12 |
| | | | | | | | | 13 |
| | | | | | | | | 14 |
| | | | | | | | | 15 |
| | | | | | | | | 16 |

TABLE 4-6.2

Protocol is Bellcore "C"

If the Protocol is Bellcore "C", then the authentication parameter is RAND (a random number), 64 bits of which are to be used by the base station 104 in the authentication process.

TABLE 4-6.2-continued

Protocol is Bellcore "C"

| Bits | | | | | | | | Octets |
|---|---|---|---|---|---|---|---|---|
| 8 | 7 | 6 | 5 | 4 | 3 | 2 | 1 | |
| 64 bit RAND | | | | | | | | 1 |
| . | | | | | | | | 2 |
| . | | | | | | | | 3 |
| . | | | | | | | | 4 |
| . | | | | | | | | 5 |
| . | | | | | | | | 6 |
| . | | | | | | | | 7 |
| . | | | | | | | | 8 |
| Reserved | | | | | | | | 9 |
| . | | | | | | | | 10 |
| . | | | | | | | | 11 |
| . | | | | | | | | 12 |
| . | | | | | | | | 13 |
| . | | | | | | | | 14 |
| . | | | | | | | | 15 |
| Reserved | | | | | | | | 16 |

TABLE 4-7

Authentication Test Response [O, M, N, I]

The contents of the Authentication Test Response information element depends upon the infrasctructure of the system. If the Authenticate N_Notes RMT message that stimulated the response was of type DCS1900, then the contents is the 32 bit result of applying the authentication algorithm to the pseudo-random number supplied. If the Authentication N_Notes RMT message was of Bellcore "C" type, then a single bit of the result signifies either successful authentication or failure.

TABLE 4-7.1

DCS1900 Response

| Bits | | | | | | | | Octets |
|---|---|---|---|---|---|---|---|---|
| 8 | 7 | 6 | 5 | 4 | 3 | 2 | 1 | |
| Response Data | | | | | | | | 1 |
| Response Data | | | | | | | | 2 |
| Response Data | | | | | | | | 3 |
| Response Data | | | | | | | | 4 |
| Reserved | | | | | | | | 5 |
| . | | | | | | | | |
| . | | | | | | | | |
| . | | | | | | | | |
| Reserved | | | | | | | | 16 |

TABLE 4-7.2

IS-54 Response

| Bits 8 7 6 5 4 3 2 1 | Octets |
|---|---|
| Result | 1 |
| Reserved | 2 |
|  | 3 |
|  | 4 |
|  | 5 |
| . . . | |
| Reserved | 16 |

Result

| | |
|---|---|
| 0 | Authentication Success |
| 1 | Authentication Failure |
| 2–255 | Reserved |

TABLE 4-8

Auth Type [O]

The Authentication Type information element defines the type of infrastructure that is providing the authentication procedure.

| Bits 8 7 6 5 4 3 2 1 | Octets |
|---|---|
| Auth Type | 1 |

Auth Type

| | |
|---|---|
| 0 | DCS1900 Authentication |
| 1 | Bellcore Generic C Authentication |
| 2–255 | Reserved |

TABLE 4-9

High Bandwidth Bearer data

| Bits 8 7 6 5 4 3 2 1 | Octets |
|---|---|
| <TBD> bits of bearer data | 1 |
|  | 2 |
| . . . | |
|  | <TBD> |

TABLE 4-9.1

Low Bandwidth Bearer Data

The Low Bandwidth Bearer Data Element consists of fewer bits of user data than the High Bandwidth Bearer Data Element. Data transmitted via this mode may suffer temporal distortion but will be correctly delivered

TABLE 4-9.1-continued

Low Bandwidth Bearer Data with no undetected lost or duplicated packets to the limits of the FCW algorithm.

| Bits 8 7 6 5 4 3 2 1 | Octets |
|---|---|
| <TBD> bits of bearer data | 1 |
|  | 2 |
| . . . | |
|  | <TBD> |

TABLE 4-9.2

Symmetric Bandwidth Bearer Data

The Symmetric Bandwidth Bearer Data Element consists of 192 bits of user data. The low order bit of the 192 bit number resides in Bit 1 Octet 1 while the high order bit of the 192 bit number resides in Bit 8 of Octet 24.

Data transmitted via this mode may suffer temporal distortion but will be correctly delivered with no undetected lost or duplicated packets to the limits of the FCW algortihm.

| Bits 8 7 6 5 4 3 2 1 | Octets |
|---|---|
| 192 bits of bearer data | 1 |
|  | 2 |
| . . . | |
|  | 24 |

TABLE 4-10

Backhaul Map [N, I]

The Backhaul Map information element details the allocation of backhaul channels on the backhaul link between the base station 104 and the base station controller 105. There are two types of Backhaul Maps. The first is the Superframe Backhaul Map, which consists of a bit map shoing the specific backhaul channels assigned to the MS represented by the Personal ID associated with the N_Notes RMT message in which the Backhaul Map appears. The second type is the Subframe Backhaul Map, which identifies a single backhaul channel and the submultiplexing rate to be applied to the channel.

When the Backhaul Map Type is Superframe:

| Bits 8 7 6 5 4 3 2 1 | Octets |
|---|---|
| 32 bits of backhaul channel absolute position | 1 |
| . | 2 |
| . | 3 |
| . | 4 |

When the Backhaul Map Type is Subframe:

TABLE 4-10-continued

Backhaul Map [N, I]

| Bits | | | | | | | | Octets |
|---|---|---|---|---|---|---|---|---|
| 8 | 7 | 6 | 5 | 4 | 3 | 2 | 1 | |
| 8 bits Backhaul channel # | | | | | | | | 1 |
| Multiplex rate | | | | | | | | 2 |
| Multiplex rate offset | | | | | | | | 3 |
| Reserved | | | | | | | | 4 |

Reserved (transmitted) bits are always set to zero and received reserved bits are also ignored.

The multiplex rate defines the number of channels to be allocated. Multiplex Rates Offset specifies the relative frame position to the next channel to be used. One indicates transmission in the next channel.

TABLE 4-11

Backhaul Map Type [N, I]

The Map Type information element is used to define the type of Backhaul Map that follows. There are two types of Backhaul Maps: Superframe and Subframe. Superframe maps detail the assignment of one or more complete 9.6 kbps backhaul channels in the base station 104 to base station controller 105 backhaul link to a single call. Subframe maps describe the submultiplexing characteristics of a less than 9.6 kbps rate onto a single 9.6 kbps backhaul channel.

| Bits | | | | | | | | Octets |
|---|---|---|---|---|---|---|---|---|
| 8 | 7 | 6 | 5 | 4 | 3 | 2 | 1 | |
| 8 bit Map Type | | | | | | | | 1 |

Map Type

| | |
|---|---|
| 0 | No Map |
| 1 | Superframe |
| 2 | Subframe |
| 3–255 | Reserved |

If Backhaul Map Type indicates No Map, then the Backhaul Map should be zero.

TABLE 4-12

Bandwidth [M]

<TBD>

TABLE 4-13

Base ID [O, M, N, I]

The Base Identifier, in conjunction with the PLMN, uniquely identifies the specific base station 104. The low order bit of the 32 bit number is located in Bit 1 Octet 1. The high order bit of the 32 bit number is located in Bit 8 of Octet 4.

TABLE 4-13-continued

Base ID [O, M, N, I]

| Bits | | | | | | | | Octets |
|---|---|---|---|---|---|---|---|---|
| 8 | 7 | 6 | 5 | 4 | 3 | 2 | 1 | |
| 32 bits of unique Base Identification | | | | | | | | 1 |
| | | | | | | | | 2 |
| | | | | | | | | 3 |
| | | | | | | | | 4 |

TABLE 4-14

Base Status [N, I]

The Base Status information element is comprised of 32 octets.

| Bits | | | | | | | | Octets |
|---|---|---|---|---|---|---|---|---|
| 8 | 7 | 6 | 5 | 4 | 3 | 2 | 1 | |
| 32 Octets of Base Status | | | | | | | | 1 |
| | | | | | | | | 2 |
| | | | | | | | | . |
| | | | | | | | | . |
| | | | | | | | | . |
| | | | | | | | | 32 |

TABLE 4-15

Broadcast ID [O]

The Broadcast ID information element is used to identify specific broadcast data streams. The Broadcast ID is assigned to the specific broadcast stream on a connection basis. It is the responsibility of the broadcast Network Application to provide periodic application broadcast heading information. The Broadcast ID is assigned at the start of a connection and released to the Broadcast ID pool at the termination of the connection.

| Bits | | | | | | | | Octets |
|---|---|---|---|---|---|---|---|---|
| 8 | 7 | 6 | 5 | 4 | 3 | 2 | 1 | |
| 8 bits of Broadcast ID | | | | | | | | 1 |

TABLE 4-16

BSC ID [O, M]

The base station controller identifier, in conjunction with the PLMN, uniquely identifies the specific base station controller 105. The low order bit of the 16 bit number is located in Bit 1 Octet. The high order bit of the 16 bit number is located in Bit 8 of Octet 2.

| Bits | | | | | | | | Octets |
|---|---|---|---|---|---|---|---|---|
| 8 | 7 | 6 | 5 | 4 | 3 | 2 | 1 | |
| 16 bits of unique BSC identification | | | | | | | | 1 |
| | | | | | | | | 2 |

TABLE 4-17

Cause [O]

The Cause information element consists of 8 bits identifying the cause for, or the result of, a specific action. The particular meanings of Cause values

TABLE 4-17-continued

Cause [O]

are determined by the message in which the Cause information element appears.

```
        Bits                    Octets
 8  7  6  5  4  3  2  1
|  8 bits of Cause information  |    1
```

TABLE 4-17.1

Cause: Authentication Reject [N, J]
CT-RCP [O]
Registration Result [M, N, J]
Service Response [M, N, I]

| Value | Meaning |
|---|---|
| 0 | Success |
| 1 | IMSI Unknown in HLR |
| 2 | Illegal MS |
| 3 | Illegal ME |
| 4 | PLMN Not Allowed (i.e., don't try any cells with same MCC, MNC) |
| 5 | LAI Not Allowed (i.e., don't try any cells with the same LAI) |
| 6 | National Roaming Not Allowed in the LAI |
| 7 | Protocol Error |
| 8 | Network Failure |
| 9–255 | Reserved |

TABLE 4-17.2

Cause: Cipher Response [N, I]

| Value | Meaning |
|---|---|
| 0 | No Result |
| 1 | Success, Cipher |
| 2 | Success, Clear Mask |
| 3 | BS Reject |
| 4 | MS Reject |
| 5–255 | Reserved |

TABLE 4-17.3

Cause: Connect Link [N, I]
Setup Link [N, I]

| Value | Meaning |
|---|---|
| 0 | Link Successful |
| 1 | Link Failure |
| 2–255 | Reserved |

TABLE 4-17.4

Cause: CT-ACK [O]

Unless specified otherwise below, the Cause Information Element in CT-ACK messages always has a value of zero.

TABLE 4-17.4.1

Cause: CT-ACK in repsonse to CT-CSC

| Value | Meaning |
|---|---|
| 0 | Acknowledged |
| 1 | Circuit Switch Refused |
| 2–255 | Reserved |

TABLE 4-17.5

Cause: CT-CIP [O]

| Value | Meaning |
|---|---|
| 0 | Set or Change Cipher |
| 1 | Synchronize Cipher |
| 2–255 | Reserved |

TABLE 4-17.6

Cause: CT-CNC [O]

| Value | Meaning |
|---|---|
| 0 | The requested connection has been connected |
| 1 | Unable to complete the requested connection |
| 2–255 | Reserved |

TABLE 4-17.7

Cause: CT-DRG [O]
Deregister [M, N, I]

| Value | Meaning |
|---|---|
| 0 | Release by MS |
| 1–255 | Reserved |

TABLE 4-17.8

Cause: CT-HOF [O]
Handover Failed [N, I]

| Value | Meaning |
|---|---|
| 0 | Reserved |
| 1 | Refused by Originating BS |
| 2 | Refused by Terminating BS |
| 3 | Refused by Originating BSC |
| 4 | Refused by Terminating BSC |
| 5 | THR Failed, OHR Suggested |
| 6 | Invalid HRef |
| 7–255 | Reserved |

See Cause: Authentication Reject [N, I]

TABLE 4-17.9

Cause: CT-REL [O]
Release Link [M, N, I]

| Value | Meaning |
|---|---|
| 0 | Release by Network |
| 1 | Release by MS |
| 2 | Release by BS (Link Lost) |
| 3 | Release by BS During Handover (e.g., Circuit Switch Complete) |

TABLE 4-17.9-continued

Cause: CT-REL [O]
Release Link [M, N, I]

| Value | Meaning |
|---|---|
| 4–255 | Reserved |

TABLE 4-17.10

Cause: CT-SET [O]

| Value | Meaning |
|---|---|
| 0 | Link Successful |
| 1 | Link Failed |
| 2–255 | Reserved |

See Cause: CT-DRG [O]
See Cause: CT-HOF [O]

TABLE 4-17.11

Cause: Handover Request ACK [N, I]

| Value | Meaning |
|---|---|
| 0 | No Result |
| 1 | Success, Cipher |
| 2 | Success, Clear Mask |
| 3 | Fail, No Resources |
| 4 | Fail, Cipher Algorithm Not Supported |
| 5–255 | Reserved |

See Cause: CT-RCP [O]
See Cause: CT-REL [O]

TABLE 4-17.12

Cause: Service Info [O]

This Cause is unique in that it is divided into two subfield to carry results for both the MS and the BS.

```
        Bits                    Octets
 8  7  6  5   4  3  2  1
| MS Cause  |  BS Cause |        1
```

The meanings of each subfield are:

| Value | Meaning |
|---|---|
| 0 | Success |
| 1 | Failure |
| 2–15 | Reserved |

See Cause: CT-RCP [O]
See Cause: Connect Link [N, I]

TABLE 4-17.13

Cause: Specific Poll Result [O]

| Value | Meaning |
|---|---|
| 0 | No Result |
| 1 | Specific poll for PID |
| 2 | General poll repsonse from PID is rejected |
| 3 | Page to MS |
| 4–256 | Reserved |

TABLE 4-18

Cipher Algorithm ID [N, I]

The Cipher Algorith ID specifies that algorithm to be used for ciphering.

```
           Bits              Octets
 8  7  6  5  4  3  2  1
|    8 bits of Algorithm ID |    1
```

Algorithm ID

| 0 | Transparent (Clear) |
|---|---|
| 1 | A5/1 Algorithm |
| 2 | A5/2 Algorithm |
| 3 | A5/3 Algorithm |
| 4–255 | Reserved |

TABLE 4-19

Cipher Key [N, I]

The Cipher Key information element contains the clear text key to be used
to set the key of the BS's encryption equipment.

```
              Bits               Octets
 8  7  6  5  4  3  2  1
| 64 bit Clear Text Cipher Key |   1
|                              |   2
|              .               |
|              .               |
|              .               |
|                              |   8
```

TABLE 4-20

Cipher Key Sequence # [O, M, N, I]

The Key Sequence # information element is used to select a cipher key in both the BS and MS without having to explicitly pass the key over the air. The Key Sequence # will be generated as defined in <TBD>. Not all bits of the key sequence # may be significant.

```
           Bits              Octets
 8  7  6  5  4  3  2  1
|    8 bit Key Sequence #   |    1
```

Bits 5–8: Must be zero
Bits 1–4: Are Significant
Default is 'OFx' in there is no Cipher Key Sequence #.

TABLE 4-21

Class [O, N, I]

The Class information element specifies some of the operational parameters of the particular type of MS being used.

TABLE 4-21-continued

Class [O, N, I]

```
       Bits              Octets
8  7  6  5  4  3  2  1
| Class Type | Class Information |   1
|       Class Information        |   2
```

Class Type

| 0 | Reserved |
|---|---|
| 1 | DCS1900 Class Type |
| 2 | IS-41 Class Type |
| 3–7 | Reserved |

TABLE 4-21.1

Class Information for DCS1900 Class Type

```
       Bits                          Octets
8  7  6  5  4  3  2  1
| Not Available | Reserved | Revision Level | A5/1 | A5/2 |   1
| A5/3 | SM | SS Screen Ind. |      Reserved         |   2
```

Revision Level

| 0 | PCS2000 phase 1 Mobiles |
|---|---|
| 1–3 | Reserved |

A5/1

| 0 | A5/1 encryption algorithm not available |
|---|---|
| 1 | A5/1 encryption algorithm is available |

A5/[2|3]

| 0 | A5/[2|3] encryption algorithm is available |
|---|---|
| 1 | A5/[2|3] encryption algorithm is not available |

SM

| 0 | short message capability not present |
|---|---|
| 1 | short message capability present |

TABLE 4-21.1-continued

Class Information for DCS1900 Class Type

SS Screen Indicator

| 0 | GSM phase 1 |
|---|---|
| 1 | capable of handling ellipsis notation and phase 2 error handling |
| 2–3 | reserved |

TABLE 4-21.2

Class Information for IS-41 Class Type

```
         Bits                Octets
8  7  6  5  4  3  2  1
| Not Available |   Reserved            |  1
| H | G | F | E | D | C | B | A |         2
```

Power Class (PCP) (octet 1, bits A, B and E)

| Bits H | G | F | E | D | C | B | A | Value | Meaning |
|---|---|---|---|---|---|---|---|---|---|
| | | | 0 | | | 0 | 0 | — | Class I |
| | | | 0 | | | 0 | 1 | — | Class II |
| | | | 0 | | | 1 | 0 | — | Class III |
| | | | 0 | | | 1 | 1 | — | Class IV |
| | | | 1 | | | 0 | 0 | — | Class V |
| | | | 1 | | | 0 | 1 | — | Class VI |
| | | | 1 | | | 1 | 0 | — | Class VII |
| | | | 1 | | | 1 | 1 | — | Class VIII |

Transmission (TX) (octet 1, bit C)

| Bits H | G | F | E | D | C | B | A | Value | Meaning |
|---|---|---|---|---|---|---|---|---|---|
| | | | | | 0 | | | — | Continuous |
| | | | | | 1 | | | — | Discontinuous |

Bandwidth (BW) (octet 1, bit D)

| Bits H | G | F | E | D | C | B | A | Value | Meaning |
|---|---|---|---|---|---|---|---|---|---|
| | | | | 0 | | | | — | 20 MHz |
| | | | | 1 | | | | — | 25 MHz |

TABLE 4-21.2.1

Mobile Station Nominal Power Levels

| Mobile Station Power Level (PL) | Mobile Attenuation Code (MAC) | Nominal ERP (dBW) for Mobile Station Power Class | | | | | | | |
|---|---|---|---|---|---|---|---|---|---|
| | | I | II | III | IV | V | VI | VII | VIII |
| 0 | 0000 | 6 | 2 | −2 | −2 | * | * | * | * |
| 1 | 0001 | 2 | 2 | −2 | −2 | * | * | * | * |
| 2 | 0010 | −2 | −2 | −2 | −2 | * | * | * | * |
| 3 | 0011 | −6 | −6 | −6 | −6 | * | * | * | * |
| 4 | 0100 | −10 | −10 | −10 | −10 | * | * | * | * |
| 5 | 0101 | −14 | −14 | −14 | −14 | * | * | * | * |
| 6 | 0110 | −18 | −18 | −18 | −18 | * | * | * | * |
| 7 | 0111 | −22 | −22 | −22 | −22 | * | * | * | * |
| | | | Dual Mode Only | | | | | | |
| 8 | 1000 | −22 | −22 | −22 | −26 +/− 3 dB | * | * | * | * |
| 9 | 1001 | −22 | −22 | −22 | −30 +/− 6 dB | * | * | * | * |
| 10 | 1010 | −22 | −22 | −22 | −34 +/− 9 dB | * | * | * | * |

The three lease significant bits of MAC are used in the CMAC/VMAC field. All four bits of MAC are used in the DMAC field.

TABLE 4-22

Connection Number [O, M, N, I]

The Connection Number information element specifies the specific network connection which was allocated to carrying the bearer channel of this user station 102 from the base station 104 to the network. All octets of this information element may not be significant. Unused nibbles and octets must be filled with "F" hex.
The Connection Number in conjunction with the Zone and the base station controller ID uniquely identify every possible connection in the world.

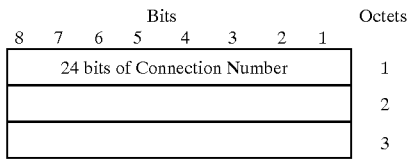

TABLE 4-23

Connection Result [M]

<TBD>

TABLE 4-24

Correlative ID [O]

The Correlative information element is used to temporarily identify a group of frames as being destined to a specific user station 102. The ID is assigned for the duration of the connection and is released for reuse by another user station 102 at the termination of a connection. The specific value of "OFFx" is reserved for broadcast use. The correlative ID for a specific user station 102 will not be changed during a connection.

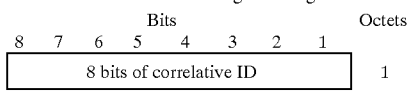

TABLE 4-25

Count Base [N, I]

The Count Base information element is used to specify the number of sets of base information which follow in the Notes_RMT Originating Handover message. Each set of base information consists of three information elements: Zone, base station controller (BSC) ID and Base ID.

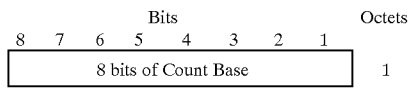

TABLE 4-26

D Channel [O]

The D Channel information element transmits the out of band application channel in a byte serial manner. The data is transmitted with the low order bit of the D channel information in Bit 1 of the Octet.

TABLE 4-27

ESN [O, M, N, I]

The equipment serial number uniquely identifies the user station 102.

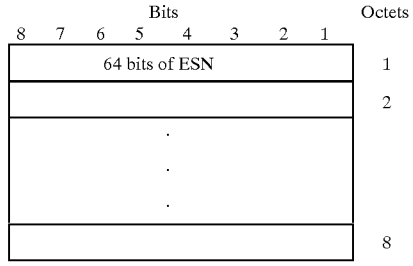

TABLE 4-28

Facility [O, M]

The Facility information element describes the services being offered by the base station 104. The internal format of this element is shown below.

TABLE 4-28-continued

Facility [O, M]

| Bits | | | | | | | | Octets |
|---|---|---|---|---|---|---|---|---|
| 8 | 7 | 6 | 5 | 4 | 3 | 2 | 1 | |
| Base Features | | | | | | | | 1 |
| Base Features | | | | | | | | 2 |
| Base Features | | | | Access Class | | | | 3 |
| Leveling Bits | | | | | | | | 4 |

The Base Features subfield is 20 bits in length. These bits are used to provide the user station 102 information about the base station 104 and correspond to various base station capabilities or features. Features such as ethernet access, aggregate data capability, enhanced voice, etc. are selected here. The particular features depend upon the networks which the base station 104 supports.

TABLE 4-28.1

Base Features for DCS1900 Systems

| Bits | | | | | | | | Octets |
|---|---|---|---|---|---|---|---|---|
| 8 | 7 | 6 | 5 | 4 | 3 | 2 | 1 | |
| Base Features | | | | | | | | 1 |
| Base Features | | | | | | | | 2 |
| Base Features | | | | | | | | 3 |

1 Bit: This bit, if set to 1, indicates that this base station 104 is capable of Inter-BSC Terminating Handovers.
All bits not explicitly defined are reserved.

TABLE 4-28.2

Facilities: Access Class
Integral value from 0 through 15 which designates the lowest class allowed access to the base station 104. That is, if the user station 1021 were provisioned with an access class of 3, it would be allowed to register with base stations 104 that broadcast an access class of 3 or lower. This subfield is active only if the CU field in the Header specifies that Class Control is in effect.

| Value | Access Allowed to |
|---|---|
| 15 | Test Mobiles only |
| 14 | 911 calls only |
| 13 | Reserved |
| 12 | Reserved |
| 11 | Reserved |
| 10 | Mobiles with Access Class 10 |
| 9 | Mobiles with Access Class 9 or 10 |
| . | |
| . | |
| . | |
| 1 | Mobiles with Access Class 1, 2, . . . 10 |
| 0 | All Mobiles |

8 bits, set by the base station to level out the number of user stations 102 registering or using a base station 104. A user station 102 would be allowed to access a base station 104 if the leveling bit of the user station 102 was set in this field. The leveling bit number will be selected by taking the modulo 15 of the user station PID. If the corresponding bit in the base station 104 leveling field were set then the user station 102 would be allowed access, otherwise, the user station 102 would have to access another base station 104. This subfield is active only if the CU field in the Header specifies that Class Control is in effect.

TABLE 4-29

FCW [O]

The Frame Check Word, which checks the content of a packet information element, is be a 16 bit sequence. It comprises the ones complement of the sum (modulo 2) of:

a) The remainder of
$_xk_{(x}15_{+x}14_{+x}13_{+x}12_{+x}11_{+x}10_{+x}9_{+x}8_{+x}7_{+x}6_{+x}5_{+x}4_{+x}3_{+x}2_{+x}1_{+1)}$
divided (modulo 2) by the generator polynomial
$x^{16}+x^{12}+x^5+1$, where k is the number of bits in the packet not including the FCW.

b) The remainder of the division (modulo 2) by the generator polynomial $x^{16}+x^{12}+x^5+1$ of the product of $x^{16}$ by the content of the packet existing from and including the first bit of the packet to but not including the first bit of the FCW.

| Bits | | | | | | | | Octets |
|---|---|---|---|---|---|---|---|---|
| 8 | 7 | 6 | 5 | 4 | 3 | 2 | 1 | |
| 16 bits of FCW | | | | | | | | 1 |
| | | | | | | | | 2 |

TABLE 4-30

Frame Number [O]

The Frame Number information element is used in ciphering algorithms. Each base station 104 keeps its frame number as a count of the number of frames it has traversed since power up.

| Bits | | | | | | | | Octets |
|---|---|---|---|---|---|---|---|---|
| 8 | 7 | 6 | 5 | 4 | 3 | 2 | 1 | |
| | 22 bits of Frame Number | | | | | | | 1 |
| | | | | | | | | 2 |
| | | | | | | | | 3 |

TABLE 4-31

HRef (Handover Reference)

The HRef (Handover Reference) information element is used to identify a specific handover process that has already been initiated by an Originating Handover Request sequence. Not all bits are significant.

| Bits | | | | | | | | Octets |
|---|---|---|---|---|---|---|---|---|
| 8 | 7 | 6 | 5 | 4 | 3 | 2 | 1 | |
| 48 bits of HRef (Handover Reference) | | | | | | | | 1 |
| . | | | | | | | | 2 |
| . | | | | | | | | 3 |
| . | | | | | | | | 4 |
| . | | | | | | | | 5 |
| . | | | | | | | | 6 |

TABLE 4-31.1

HRef for DCS1900 Systems

In a DCS1900 infrastucture system, the HRef is assigned by the terminating Base Station Controller. Only one octet is significant.

TABLE 4-31.1-continued

HRef for DCS1900 Systems

| Bits 8 7 6 5 4 3 2 1 | Octets |
|---|---|
| 8 bits of HRef (Handover Reference) | 1 |
| Reserved | 2 |
| . | 3 |
| . | 4 |
| . | 5 |
| . | 6 |

TABLE 4-32

Identity Data [O, N, I]

The Identity Data information element contains one of the identifiers of the MS as specified by the associated Identity Type. The precise length and format of the Identity Data information element will be determined by the Identity Type. If the length is less than the maximum 9 octets provided for the Identity Data information element, unused space will be at the end of the Identity Data information element (Octets 9, 8, . . .) and all unused bits will be set to zero.

| Bits 8 7 6 5 4 3 2 1 | Octets |
|---|---|
| 72 bits of Identity Element | 1 |
|  | 2 |
|  | 3 |
|  | 4 |
|  | 5 |
|  | 6 |
|  | 7 |
|  | 8 |
|  | 9 |

TABLE 4-33

Identity Type [O, N, I]

The Identity Type information element specifies which identity is being requested or supplied.

| Bits 8 7 6 5 4 3 2 1 | Octets |
|---|---|
| 8 bits of Identity Type | 1 |

| value | Identity Type |
|---|---|
| 0 | IMSI |
| 1 | TMSI |
| 2 | ESN |
| 3 | UPT# |
| 4–255 | Reserved |

TABLE 4-34

LAC (Location Area Code)

See Zone.

TABLE 4-35

LAI (Location Area Identifier)

See Zone.

TABLE 4-36

Location [N, I]

The Location information element provides the identification of a specific element in the given table. The actual element identifiers are table dependent.

| Bits 8 7 6 5 4 3 2 1 | Octets |
|---|---|
| 16 bits of Location Identifier | 1 |
|  | 2 |

TABLE 4-37

MCC (Mobile Country Code)

See Zone.

TABLE 4-38

Message Length [M, N, I]

The Message Length field is to be filled in with the size of the message including the size field itself. The length of the message is measured in octets.

| Bits 8 7 6 5 4 3 2 1 | Octets |
|---|---|
| 8 bits of Message Length | 1 |

TABLE 4-39

Message Type [O, M, N, I]

The Message Type information element defines the format of the rest of the message. The interpretation of the Message Type depends upon which particular Notes protocol is being discussed. Currently, the messages are sorted in alphabetical order by name. An effort is made, where possible, to maintain the same Message Type across all interfaces for common messages (e.g., Set Link).

| Bits 8 7 6 5 4 3 2 1 | Octets |
|---|---|
| 8 bits of Message Type | 1 |

TABLE 4-39.1

O Notes Message Type [O]

| Bits 1–8 (Hex) | Type |
|---|---|
| 00 | Reserved |
| 01 | ACK-Acknowledge |
| 02 | AUR-Authentication Response |
| 03 | AUT-Authentication Request |
| 04 | BAI-Base Assist Information |
| 05 | BAR-Base Assist Request |
| 06 | CIP-Set Cipher Mode |
| 07 | CNC-Call Connected |
| 08 | CNL-Connect Link |
| 09 | CSC-Circuit Switch Complete |
| 0A | DRG-De-registration Request |
| 0B | HLD-Hold |
| 0C | HOF-Handover Failed |
| 0D | MAI-MS Assist Information |
| 0E | MAR-MS Assist Request |
| 0F | OHC-Originating Handover Complete |
| 10 | OHR-Originating Handover Request |
| 11 | ORG-Originate Call |
| 12 | RCP-Registration Complete |
| 13 | REL-Release Link |
| 14 | RRQ-Registration Request |
| 15 | SPR-Specific Response |
| 16 | STL-Set Link |
| 17 | SYN-Synchronize |
| 18 | THC-Terminating Handover Complete |
| 19 | THR-Target Handover Request |
| 1A–7F | Reserved |
| 80–FF | TRA-Transport Message w. TCID |

If the most significant bit of the Message Type is set to 1, the message is a Transport Message. The seven least significant bits are used to specify the Transport Channel ID with which the data is associated.

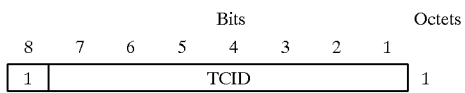

TABLE 4-39.2

M Notes Message Type [M]
The Message Type information element defines the format for the remainder of the M Notes message.

| Value (Hex) | Description |
|---|---|
| 01 | Diagnostic |
| 02 | Initialize OTA |
| 03 | Register |
| 04 | Deregister |
| 05 | Setup Link |
| 06 | Release Link |
| 07 | Connect Link |
| 08 | Acknowledge |
| 09 | Provision OTA |
| 0A | Radio Status |
| 0B | Link Status |
| 0C | Data Message |
| 0D | Power Off |
| 0E | Circuit Switch Complete |
| 0F | Begin Traffic |
| 10 | Acknowledge |
| 11 | Authenticate |
| 12 | Authenticate Reply |

TABLE 4-39.3

N Notes Message Type [N, I]
This Message Type information element defines the use of O-Notes and I-Notes. It defines the action of the message as well as the format of the message.

| Type (Hex) | Meaning |
|---|---|
| 00 | Reserved |
| 01 | Acknowledge |
| 02 | Authenticate |
| 03 | Authenticate Reply |
| 04 | Base Status Request |
| 05 | Base Status Response |
| 06 | Cipher ACK |
| 07 | Circuit Switch Complete |
| 08 | Connect Link |
| 09 | Deregister |
| 0A | DTMF Start |
| 0B | DTMF Stop |
| 0C | Originating Handover |
| 0D | Page |
| 0E | Page Response |
| 0F | Register |
| 10 | Registration Reject |
| 11 | Service Information |
| 12 | Set Cipher Mode |
| 13 | Set Link |
| 14 | Terminating Handover |
| 15 | Terminating Handover Complete |
| 16 | Transport |
| 17 | Update ID |
| 18–7F | Reserved for Notes RMT |
| 80 | Diagnostic |
| 81 | Diagnostic Result |
| 82 | Download |
| 83 | Provision Table |
| 84 | Read Table |
| 85 | Reject |
| 86 | Reset |
| 87 | Reset ACK |
| 88 | Table Data |
| 89–FF | Reserved for Notes_QAM |

TABLE 4-40

MNC (Mobile Network Code)

See Zone.

TABLE 4-41

MS Capabilities [O]

The MS Capabilities information element defines the capabilities (features) present in the user station 102 (e.g., whether the user station 102 can receive a FAX or a data connection, whether the user station 102 is capable of ciphering, etc.).

| Bits | Octets |
|---|---|
| 8 7 6 5 4 3 2 1 | |
| 16 bits of MS Capabilities | 1 |
|  | 2 |

TABLE 4-42

OTA Map [O]

The OTA Map information element describes the mapping of the OTA time slots to a particular user station 102. The format of this element is dependent upon the OTA Map Type TABLE 4-42-continued OTA Map [O]

information element in the same packet.

TABLE 4-42.1

Superframe Map:

| Bits | | | | | | | | Octets |
|---|---|---|---|---|---|---|---|---|
| 8 | 7 | 6 | 5 | 4 | 3 | 2 | 1 | |
| 16 bits of slot mapping description | | | | | | | | 1 |
| | | | | | | | | 2 |
| 16 bits reserved | | | | | | | | 3 |
| | | | | | | | | 4 |

Each bit in the superframe map indicates a time slot relative to the current time slot.

| Octet | Bit | Time slot |
|---|---|---|
| 1 | 1 | Same time slot, next frame |
| 1 | 2 | This frame, one time slot later |
| 1 | 3 | This frame, two time slots later |
| 2 | 8 | This frame, 15 time slots later |

TABLE 4-42.2

Subframe Map:

| Bits | | | | | | | | Octets |
|---|---|---|---|---|---|---|---|---|
| 8 | 7 | 6 | 5 | 4 | 3 | 2 | 1 | |
| Reserved | | | Submultiplex | | | | | 1 |
| Reserved | | | Frame Phase | | | | | 2 |
| Reserved | | | Time lot Phase | | | | | 3 |
| Reserved | | | | | | | | 4 |

Submultiplex Rate (Subrate)   The number of frames skipped between transmissions, plus one.
Frame Phase   The number of frames skipped before the first transmission.
Time slot Phase   The number of time slots skipped before the first transmission.

As an example, where the subrate is four, the frame phase is three, and the time slot phase is two, the user station 102 will wait three time frames 301 and two time slots 302 before the first transmission. Subsequent transmissions will occur in the same time slot 302 every fourth time frame 301.

TABLE 4-43

OTA Map Type [O]

The OTA Map Type information element identifies the type of OTA Map to follow.

TABLE 4-43-continued

OTA Map Type [O]

| Bits | | | | | | | | Octets |
|---|---|---|---|---|---|---|---|---|
| 8 | 7 | 6 | 5 | 4 | 3 | 2 | 1 | |
| 8 bits of OTA Map type | | | | | | | | 1 |

| OTA Map Type | Meaning |
|---|---|
| 0 | Unused |
| 1 | Superframe |
| 2 | Subframe |
| 3–256 | Reserved |

TABLE 4-44

PID [O, M, N, I]

This information element is the personal identification number assigned to this user station 102. The low order byte defines the PID Type. The identifier is represented by the following 64 bits. The low order bit of the 64 bit number resides in Bit 1 of Octet 2 while the high order bit of the 64 bit number resides in Bit 8 of Octet 9.

If the PID Type is absolute, the PID absolutely and uniquely identifies the user station 102. The number is 72 bits long.

| Bits | | | | | | | | Octets |
|---|---|---|---|---|---|---|---|---|
| 8 | 7 | 6 | 5 | 4 | 3 | 2 | 1 | |
| PID Type | | | | | | | | 1 |
| 64 bits of MS identification number | | | | | | | | 2 |
| . | | | | | | | | |
| . | | | | | | | | |
| . | | | | | | | | |
| | | | | | | | | 9 |

TABLE 4-44.1

PID Type

| PID Type | Meaning |
|---|---|
| 0 | Permanent PID |
| 1 | Temporary PID |
| 2 | ESN |
| 3 | UPT # |
| 4 | HRef |
| 5-255 | Reserved |

In DCS1900 Systems, the Permanent PID associated with a user station 102 is the IMSI.

In DCS1900 Systems, the Temporary PID associated with a user station 102 MS is its TMSI.

In DCS1900 Systems, the ESN associated with an user station 102 is its IMEI.

A PID of Type=HRef occurs in only limited cases:

1. In a Specific Poll for the user station 102 from the base station 104 during an Originating Handover.

2. In a Release Link (in either direction) during an Originating Handover (if the Originating Handover fails).

A number which uniquely—within the PID Type —identifies the user station 102.

TABLE 4-45

PLMN (Public Land Mobile Network)

See Zone.

TABLE 4-46

Protocol [N, I]

The protocol information element identifies the signaling protocol.

| Bits | Octets |
|---|---|
| 8 7 6 5 4 3 2 1 | |
| Protocol Identifier | 1 |

| Protocol Type | Protocol |
|---|---|
| 1 | Notes RMT signaling protocol |
| 2 | Notes OAM signaling protocol |
| 3–255 | Reserved |

TABLE 4-47

Registration Info [O]

Registration Info contains information that is required by the System for registration. The precise format of the Registration Info depends upon the value of System Type.

| Bits | Octets |
|---|---|
| 8 7 6 5 4 3 2 1 | |
| 128 bits of Registration Info | 1 |
| . | 2 |
| . | 3 |
| . | 4 |
| . | 5 |
| . | 6 |
| . | 7 |
| . | 8 |
| . | 9 |
| . | 10 |
| . | 11 |
| . | 12 |
| . | 13 |
| . | 14 |
| . | 15 |
| . | 16 |
| . | 17 |

TABLE 4-47.1

DCS1900 Systems

For DCS1900 Systems, the Zone of the base station 104 on which the user station 102 was previously registered must be provided so the network 126 can locate the appropriate VLR for TMSI validation.

TABLE 4-47.1-continued

DCS1900 Systems

| Bits | Octets |
|---|---|
| 8 7 6 5 4 3 2 1 | |
| 40 bits (Old) Zone | 1 |
| . | 2 |
| . | 3 |
| . | 4 |
| . | 5 |
| 88 bits Reserved | 6 |
| . | 7 |
| . | 8 |
| . | 9 |
| . | 10 |
| . | 11 |
| . | 12 |
| . | 13 |
| . | 14 |
| . | 15 |
| . | 16 |
| . | 17 |

TABLE 4-47.2

Bellcore Generic C Systems

For Bellcore Generic C Systems, the required registration information consists of the user station's UPT# and ESN.

| Bits | Octets |
|---|---|
| 8 7 6 5 4 3 2 1 | |
| 64 bits of ESN | 1 |
| . | 2 |
| . | 3 |
| . | 4 |
| . | 5 |
| . | 6 |
| . | 7 |
| . | 8 |
| 64 bits reserved | 9 |
| . | 10 |
| . | 11 |
| . | 12 |
| . | 13 |
| . | 14 |
| . | 15 |
| . | 16 |
| . | 17 |

TABLE 4-48

Registration Status [O, M]

The Registration Status identifies the user station's current registration status.

```
        Bits                              Octets
8   7   6   5   4   3   2   1
+------+--------------------------+
| Page |                          |
| Pend |   Registration Status    |    1
+------+--------------------------+
```

Page Pend:

| value | meaning |
|---|---|
| 0 | There is no page pending |
| 1 | There is a page pending (only valid in CT-RCP) |

Registration Status:

| value | status |
|---|---|
| 0 | Not Registered |
| 1 | Accepted |
| 2 | Pending |
| 3–127 | <TBD> |

TABLE 4-49

Registration Timer [O]

The Registration Timer information element sets the intervals between periodic re-registrations.

```
            Bits                          Octets
8   7   6   5   4   3   2   1
+----------------+----------------+
| Network Interval | Base Interval |   1
+----------------+----------------+
```

TABLE 4-49.1

Network Interval

| Value | Interval |
|---|---|
| 0 | <TBD> |
| 1 | |
| 2 | |
| 3 | |
| 4 | |
| 5 | |
| 6 | |
| 7 | |
| 8 | |
| 9 | |
| A | |
| B | |
| C | |
| D | |
| E | |
| F | |
| 0 | <TBD> |
| 1 | |
| 2 | |
| 3 | |
| 4 | |
| 5 | |
| 6 | |
| 7 | |
| 8 | |
| 9 | |
| A | |

TABLE 4-49.1-continued

Network Interval

| Value | Interval |
|---|---|
| B | |
| C | |
| D | |
| E | |
| F | |

TABLE 4-50

Registration Type [O, N, I]

The Registration Type indentifies the type of registration. Registration is the result of either a position change (geographic) or the expiration of the registration timer (periodic).

```
        Bits                              Octets
8   7   6   5   4   3   2   1
+----------------------------+
|     Registration Type      |    1
+----------------------------+
```

Registration Type:

| value | type |
|---|---|
| 0 | Base Geographic Registration |
| 1 | Network Geographic Registration |
| 2 | Base Periodic Reregistration |
| 3 | Network Periodic Reregistration |
| 4 | Power Up |
| 5–255 | Reserved |

TABLE 4-51

Remaining Base Count [O]

The Remaining Base Count specifies the number of base stations 104 in addition to the current one (the one specified in the CT-OHR message containing the Information Element) for which the user station 102 intends to request an Originating Handover at this time.

```
        Bits                              Octets
8   7   6   5   4   3   2   1
+----------------------------+
|    Remaining Base Count    |    1
+----------------------------+
```

TABLE 4-52

Reserved [O, M, N, I]

The Reserved information element represents unused space. All unused space is reserved for future use. All Reserved bits shall be set to zero by the transmitting station. All Reserved bits shall be ignored by the receiving station unless specifically defined otherwise.

Some Information Elements contain Reserved subfields. The same comments about reserved bits apply.

TABLE 4-53

Resource Request Data [O, M, N, I]

This 32 bit information element specifies the type of service being requested by the user station 102.

TABLE 4-53-continued

Resource Request Data [O, M, N, I]

| Bits | | | | | | | | Octets |
|---|---|---|---|---|---|---|---|---|
| 8 | 7 | 6 | 5 | 4 | 3 | 2 | 1 | |
| DVS | | CRC-ARQ | | Symmetry | | Reserved | | 1 |
| Bandwidth | | | | | | | | 2 |
| DVP | | Transport Protocol | | | | | | 3 |
| Reserved | | | | | | | | 4 |

DCS1900 ignores this information element in the N Notes RMT Service Request message.

TABLE 4-53.1

Bandwidth

| value | meaning |
|---|---|
| 0-255 | <TBD> |

TABLE 4-53.2

CRC-ARQ

| value | meaning |
|---|---|
| 00 | Neither CRC nor ARQ in effect |
| 01 | Reserved |
| 10 | CRC in effect |
| 11 | CRC and ARQ in effect |

TABLE 4-53.3

DVS

| value | meaning |
|---|---|
| 00 | Reserved |
| 01 | Voice service requested |
| 10 | Data service requested |
| 11 | Signaling service requested |

TABLE 4-53.4

Symmetry

| value | meaning |
|---|---|
| 00 | Symmetric Bandwidth |
| 01 | Maximum MS bandwidth minimum BS bandwidth |
| 10 | Maximum BS bandwidth minimum MS bandwidth |
| 11 | Variable symmetry |

TABLE 4-53.5

Transport Protocol

| value | meaning |
|---|---|
| 0 | 8 bit transparency mode. |
| 1–255 | Reserved for future use |

TABLE 4-54

Service Provider [O, M]

This 16 bit information element, when present in a base-to-user signaling message, identifies the PCS service provider that operates the base station 105. When present in a user-to-base signaling message, it specifies the identification of the PCS service provider that the user station 102 wishes to use. The low order bit of this 16 bit element resides in Bit 1 of Octet 1 while the high order bit of this 16 bit element resides in Bit 8 of Octet 2.

| Bits | | | | | | | | Octets |
|---|---|---|---|---|---|---|---|---|
| 8 | 7 | 6 | 5 | 4 | 3 | 2 | 1 | |
| 16 bits of unique Service Provider Identification number | | | | | | | | 1 |
| | | | | | | | | 2 |

TABLE 4-55

Service Type
The Service Type information element indicates the type of service being requested.

| value | meaning |
|---|---|
| 0000 | Null Service. Indicates that service resources are not yet being requested. |
| 0001 | Normal call |
| 0010 | Emergency (911) call |
| 0100 | Short Message Service |
| 1000 | Supplementary Service Activation |

When this information appears in a N Notes RMT Handover Request message, the only legal values are Normal Call and Emergency Call. Furthermore, DCS1900 may not be able to provide this element, in which case it will default to Normal Call.

TABLE 4-56

Set/Query [M]

The field will have a value of 0 to indicate that a query operation is to take place and a value of 1 to indicate that a set operation is to take place.

TABLE 4-57

Slot Quality [O]

The Slot Quality information element identifies the radio frequency quality of the channel (time slot) in which the information element was received. To allow for flexibility, the meaning of the values is implementation specific.

| Bits | | | | | | | | Octets |
|---|---|---|---|---|---|---|---|---|
| 8 | 7 | 6 | 5 | 4 | 3 | 2 | 1 | |
| 8 bits Slot Quality | | | | | | | | 1 |

| value | Slot Quality |
|---|---|
| 0 | <TBD> |
| 255 | |

TABLE 4-58

Surrounding Base Table (SBT) [O]

| Bits | | | | | | | | Octets |
|---|---|---|---|---|---|---|---|---|
| 8 | 7 | 6 | 5 | 4 | 3 | 2 | 1 | |
| SBT Sequence # | | | | SBT Length | | | | 1 |
| Base 1 Info | | | | Base 1 Code Index | | | | |
| Base 1 Frequency Index | | | | | | | | 2 |
| Base 2 Info | | | | Base 2 Code Index | | | | |
| Base 2 Frequency Index | | | | | | | | 3 |
| ... | | | | ... | | | | ... |
| Base <SBT Length> Info | | | | Base <SBT Length> Code Index | | | | |
| Base <SBT Length> Frequency Index | | | | | | | | |

Note that the table is of variable length. When it occurs in the CT-RCP message, it can store a maximum of 10 base index pairs, when it occurs in the CT-BAI message, it can store a maximum of 11 base index pairs.

Includes the frequency index and the code index for the <ith> surrounding base station 104.

TABLE 4-58.1

SBT: Base <i> Info
Information about Base <i> to help the user station 102 rank the base station 104.

| Bits | | | | Meaning if Bit is Set |
|---|---|---|---|---|
| 8 | 7 | 6 | 5 | |
| 0 | 0 | 0 | 1 | This base station represents a Micro Cell |
| 0 | 0 | 1 | 0 | This base station is concentric with current base station |
| 0 | 1 | 0 | 0 | Reserved |
| 1 | 0 | 0 | 0 | Reserved |

Defines the number of base stations 104 which are contained in this SBT segment.

If the number of surrounding base stations 104 exceeds the maximum that can be held in the message (10 in the case of the CT-RCP), this number will indicate the number of following messages (CT-ASIs) required to transmit the rest of the data. The number will thus serve as:

An indication of the existence of more surrounding bases than will fit in the table.

A unique identifier of which subset of base stations 104 are contained in this SBT. E.g., a value of zero means this is the only (or last) set of SBT entries. A value of 2 means that there will be two additional SBT segments following the current one.

TABLE 4-59

System Type [O]

The System Type information element identifies the code set of the supporting infrastructure.

TABLE 4-59-continued

System Type [O]

| Bits | | | | | | | | Octets |
|---|---|---|---|---|---|---|---|---|
| 8 | 7 | 6 | 5 | 4 | 3 | 2 | 1 | |
| System Type | | | | | | | | 1 |

| value | System Type |
|---|---|
| 0 | DCS1900 |
| 1 | Bellcore Generic C |
| 2–255 | Reserved |

TABLE 4-60

TCID [O, M, N, I]

The TCID (Transport Channel ID) information element specifies the Transport Channel to which data in the message belongs.

| Bits | | | | | | | | Octets |
|---|---|---|---|---|---|---|---|---|
| 8 | 7 | 6 | 5 | 4 | 3 | 2 | 1 | |
| Reserved | | | 6 bits of TCID | | | | | 1 |

When Transport Data is embedded in an O Notes_RMT_CT-TRA message, the TCID is embedded in the Message Type. In this case:

bit 8 of the Message Type is set to 1.

bit 7 is used for segmentation: it is set to 1 for the last segment of a Transport Message and to 0 for all other segments.

| TCID | Meaning |
|---|---|
| 0 | DCS1900 (SAPI 0) |
| 1 | Reserved |
| 2 | Reserved |
| 3 | DCS1900 (SAPI 3) |
| 4-63 | Reserved |

Defaults: When the Protocol in use is DCS1900, the TCID must be zero in all cases except when SMS traffic is being sent.

TABLE 4-61

Traffic Type [M]

The traffic type indicates voice or data traffic.

TABLE 4-62

Transport Data [O, M, N, I]

The Transport Data information element contains 19 bytes (152 bits) of application level data transferred between the user station 102 and the base
station controller 105. The low order bit of the data resides in bit 1 of octet 1 and the high order bit resides in bit 8 of octet 19. The Transport Data information element may be larger (e.g., up to 260 bytes using LAPD) for interfaces other than the O-interface, which is restricted in size due to the length of the over-the-air information packet.

TABLE 4-62-continued

Transport Data [O, M, N, I]

| Bits | | | | | | | | Octets |
|---|---|---|---|---|---|---|---|---|
| 8 | 7 | 6 | 5 | 4 | 3 | 2 | 1 | |
| 152 bits of Transport Data ||||||||  1 |
| ||||||||  2 |
| ||||||||  . |
| ||||||||  . |
| ||||||||  . |
| ||||||||  19 |

TABLE 4-63

UPT [O, M, N, I]

This 80 bit information element is the Universal Personal Telecommunications number that has been granted to the subscriber operating the user station 102, and consists of 20 four-bit characters.

| Bits | | | | | | | | Octets |
|---|---|---|---|---|---|---|---|---|
| 8 | 7 | 6 | 5 | 4 | 3 | 2 | 1 | |
| 80 bits of Universal Personal Telecommunications Number |||||||| 1 |
| ||||||||  2 |
| ||||||||  . |
| ||||||||  . |
| ||||||||  . |
| ||||||||  10 |

TABLE 4-64

Value [M]

The Value field contents are variable depending upon the item in the OTA which is being queried or modified.

TABLE 4-65

Zone [O, M, N, I]

The Zone and the Base ID combine to uniquely identify each base station 104 in the world. The precise format of the Zone depends upon the value of the System Type.

| Bits | | | | | | | | Octets |
|---|---|---|---|---|---|---|---|---|
| 8 | 7 | 6 | 5 | 4 | 3 | 2 | 1 | |
| 40 bits of unique Zone |||||||| 1 |
| ||||||||  2 |
| ||||||||  3 |
| ||||||||  4 |
| ||||||||  5 |

A subset of the Zone, uniquely identifies the operator of the network. This portion is called the PLMN (Public Land Mobile Network) and, in the case of DCS1900 Systems, consists of the MCC and MNC.

TABLE 4-65.1

Zone: DCS1900 Systems

For DCS1900 Systems, the Zone is the Location Area Identifier (LAI); it consists of a 16 bit Mobility Country Code (MCC), an 8 bit Mobility Network Code (MNC) and a 16 bit Location Area Code (LAC).

| Bits | | | | | | | | Octets |
|---|---|---|---|---|---|---|---|---|
| 8 | 7 | 6 | 5 | 4 | 3 | 2 | 1 | |
| 16 bits of unique MCC |||||||| 1 |
| ||||||||  2 |
| 8 bits of unique MNC |||||||| 3 |
| 16 bits of unique LAC |||||||| 4 |
| ||||||||  5 |

TABLE 4-65.1.1

LAC

The LAC is an Location Area Code. The combination of the Base ID, MCC, MNC and LAC uniquely identify a given base station 104.

| Bits | | | | | | | | Octets |
|---|---|---|---|---|---|---|---|---|
| 8 | 7 | 6 | 5 | 4 | 3 | 2 | 1 | |
| 16 bits of Location Area Code |||||||| 1 |
| ||||||||  2 |

TABLE 4-65.1.2

MCC

The MCC is a Mobility Country Code. The combination of the Base ID, MCC, MNC and LAC uniquely identify a given base station 104.

| Bits | | | | | | | | Octets |
|---|---|---|---|---|---|---|---|---|
| 8 | 7 | 6 | 5 | 4 | 3 | 2 | 1 | |
| 16 bits of Mobility Country Code |||||||| 1 |
| ||||||||  2 |

TABLE 4-65.1.3

MNC

The MNC is a Mobility Network Code. The combination of the Base ID, MCC, MNC and LAC uniquely identify a given base station 104.

| Bits | | | | | | | | Octets |
|---|---|---|---|---|---|---|---|---|
| 8 | 7 | 6 | 5 | 4 | 3 | 2 | 1 | |
| 8 bits of Mobility Network Code |||||||| 1 |

The operation of Notes to communicate Information Elements comprising user and signaling data within the communication system 101 can be explained by way of example with respect to the "Base ID" Information Element shown in Table 4-13. The Base ID is a 32-bit Information Element uniquely identifying within a particular message or Note a specific base station 104. The Base ID Information Element may be communicated within the communication system in O-Notes, M-Notes, N-Notes and I-Notes. For example, the Base ID Information Element is contained within the "Circuit Switch Complete" N-Note shown in Table 3-9, the "Circuit Switch Complete" M-Note shown in Table 1-7, and the "CT-CSC (Circuit Switch Complete)" O-Note shown in Table 2-10.

The operation of Notes to execute internal operations within the communication system 101 may be explained with respect to a process for switching communication paths for a mobile user station 102 within the communication system 101. Such a switch might occur, for example, when a user station 102 begins to leave a cell 106 for a first base station 104 with which it is communicating, and begins to enter a second cell 106 for a second base station 104. In that case, it may be desired to handoff communication with the user station 102 from the first base station 104 to the second base station 104.

Figure 13:
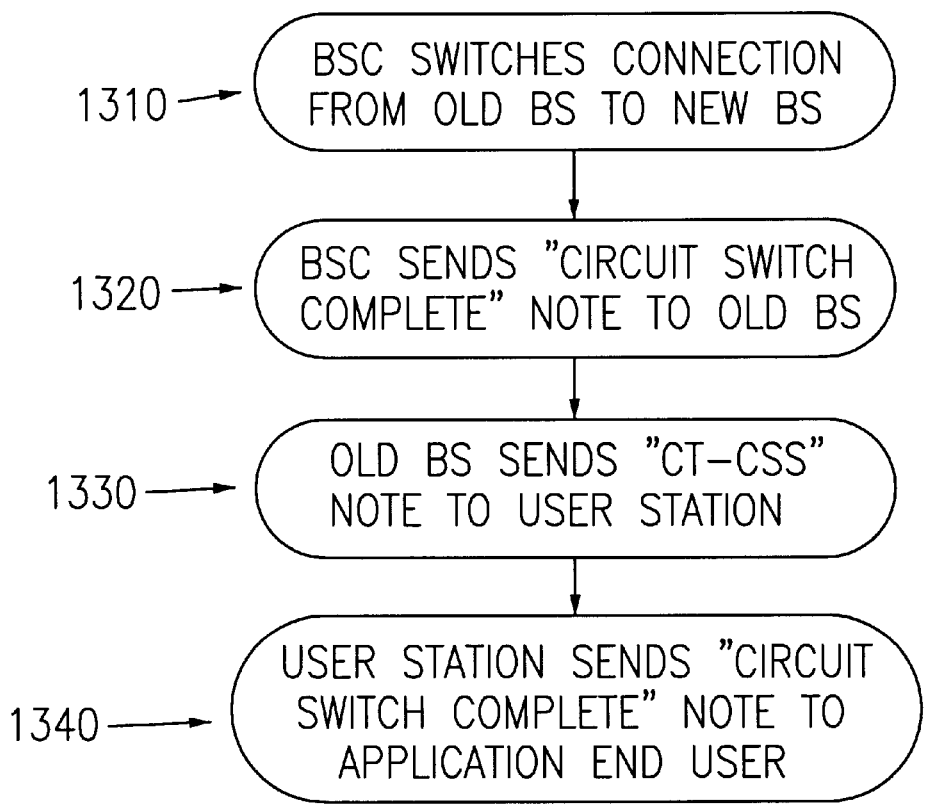
FIG. 13 is a diagram of a process for communicating signaling data among system components in a preferred mobile communication system.

FIG. 13 is a flowchart setting forth a procedure for communicating the completion of a handoff of a mobile user station 102 between a first base station 104 and a second base station 104 in the communication system 101, wherein the two base stations 104 are connected to the same base station controller 105.

In a first step 1310, the base station controller 105 initiates a process to switch the call connection from the first base station 104 to the second base station 104. In a next step 1320, the base station controller 105 communicates a Circuit Switch Complete N-Note across the N-Interface 620 between the base station controller 105 and the first base station 104. The format for the Circuit Switch Complete N-Note is given in Table 3-9 and includes an Information Element containing the Base ID of the second base station 104.

In a next step 1330, the base station 104 communicates a CT-CSC (Circuit Switch Complete) O-Note across an O-Interface 610 between the first base station 104 and the user station 102. The format for the CT-CSC (Circuit Switch Complete) O-Note is given in Table 2-10. As shown in Table 2-10, the CT-CSC (Circuit Switch Complete) O-Note passes along the Information Element for the Base ID of the second base station 104.

The CT-CSC (Circuit Switch Complete) O-Note passes some common Information Elements from the Circuit Switch Complete N-Note, such as the New Base ID and HRef (Handover Reference Number), to the mobile user station 102. By contrast, the base station 104 does not pass the PID (personal ID) Information Element to the mobile user station 102 in the O-Note, as the mobile user station 102 already knows its own PID. The PID which is contained in the N-Note is used by the base station 104 so that it can identify the particular user station 102 for which the base station controller 105 has completed a circuit switch. With the PID, the base station 104 can determine the proper slot within its polling loop for transmitting the O-Note containing a CT-CSC (Circuit Switch Complete) message.

Similarly, for each N-Note received from the base station controller 104 across the N-Interface, the base station 104 uses some Information Elements for its own internal operations, and passes other Information Elements along to the mobile user station 102.

In a next step 1340, the mobile user station 102 communicates a Circuit Switch Complete M-Note across an M-Interface 605 between the mobile communication transceiver in the user station 102 and an application end user hosted in the user station 102. The Circuit Switch Complete M-Note contains the Base ID Information Element. The Circuit Switch Complete M-Note also contains other Information Elements (e.g., BSC ID, Facility) added by the mobile communication transceiver 603 in the mobile user station 102. By contrast, the Circuit Switch Complete M-Note does not contain the HRef Information Element which is used by the mobile communication transceiver 603 to identify the particular handover request.

Layer Two Air Interface Description
Layer Two O-Interface Definition

Figure 4A:
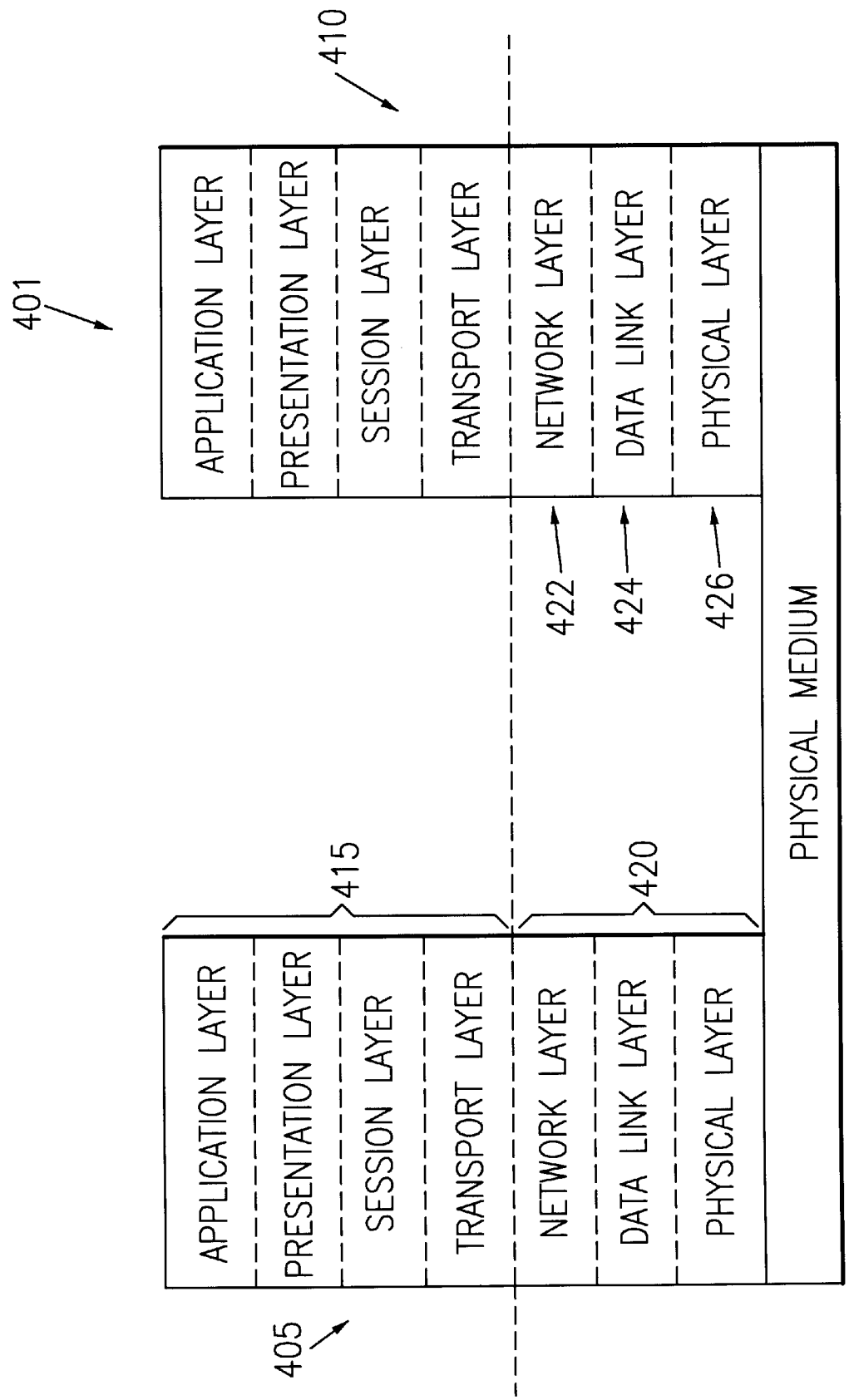
FIG. 4A is a diagram of a multi-layer communication system architecture according to the OSI Reference Model.
Figure 4B:
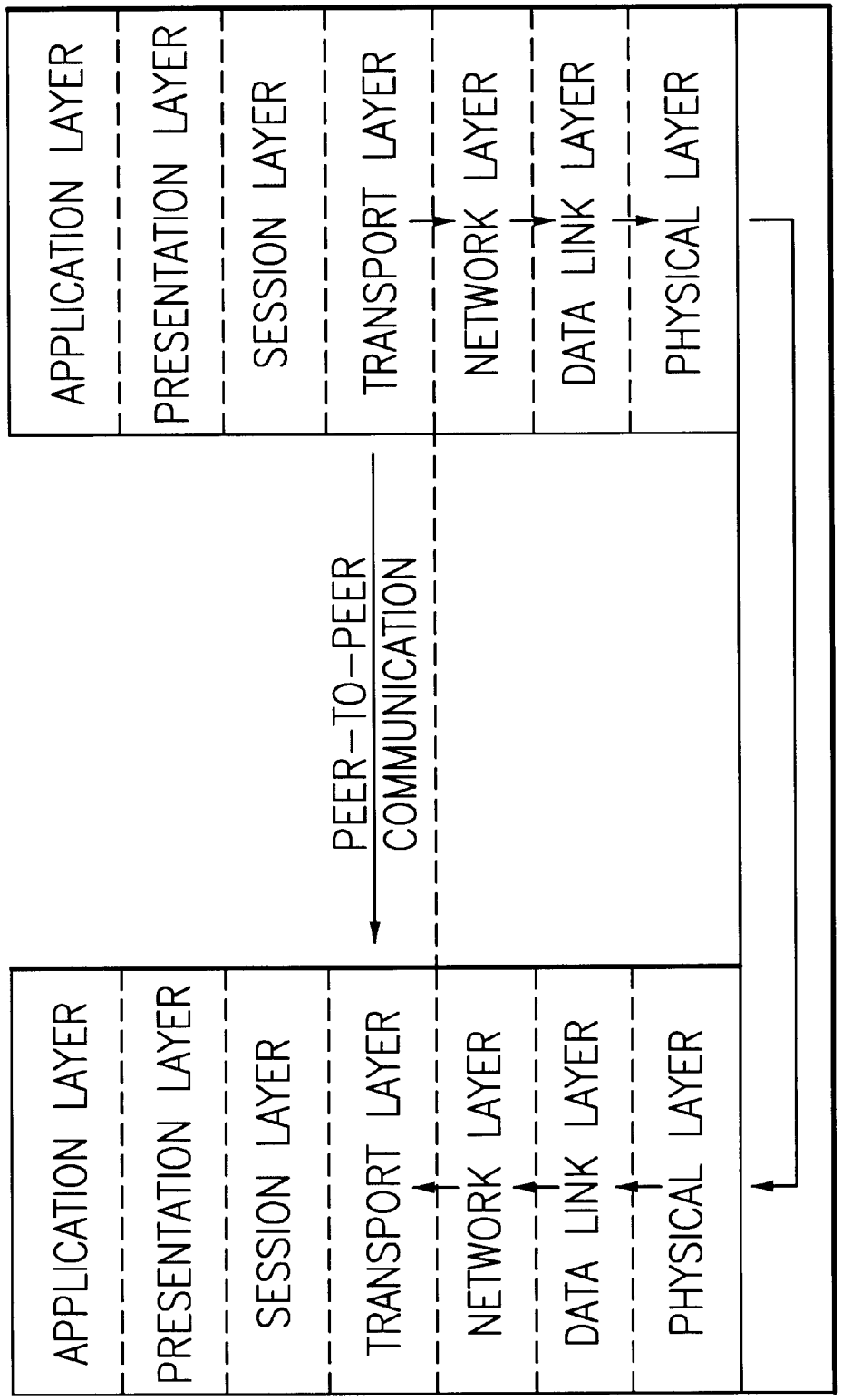
FIG. 4B is a diagram illustrating peer-to-peer communication in the layered communication system architecture of FIG. 4A.

This section presents data link layer 424, FIG. 4A, the RF link protocol architecture of the O-Interface 610, FIG. 6. TDMA frame structures are defined and the underlying slot structure for TDD connection is presented. For example, a transmission, either from the base station or from the mobile user station, includes frame types and headers that are required to identify the specific purpose of that transmission. Additional information is provided to the receiving device that allows it to determine information bandwidth symmetry, whether error correction is applied and if the received transmission is part of an aggregated bandwidth connection. These processes are described in the following text.

Frame Format
Frame Format Normal

Each normal frame is composed of sixteen TDMA time slots where duplexing is accomplished by providing TDD within each TDMA frame. A channel composed of one time slot per frame provides one 9.6 kbps full duplex radio path for raw data. The time slots are not numbered. The numbers are shown in Table 5.1 for reference only. There is no frame mark transmitted over the air. Proper slot synchronization shall be performed by timing.

Frame Format Extended Range

An extended range frame shall be composed of 8 TDMA time slots where duplexing is accomplished by providing TDD within each TDMA slot. The slots are not numbered. The use of this is deployment specific and is used in applications where range is extended (the excess time in each expanded time slot is used for Guard Time to allow larger propagation delays for extended range). The numbers are shown in table 5.1 for reference only. There is no index associated with the frame. Proper slot synchronization is performed solely by timing. Both frame format normal and frame format extended range have the identical frame time (20 ms).

TABLE 5.1

| Information Element | Information Element |
| --- | --- |
| Slot 1 | Slot 1 |
| Slot 2 | Slot 2 |
| Slot 3 | Slot 3 |
| Slot 4 | Slot 4 |
| Slot 5 | Slot 5 |
| Slot 6 | Slot 6 |
| Slot 7 | Slot 7 |
| Slot 8 | Slot 8 |
| Slot 9 | |
| Slot 10 | |
| Slot 11 | |
| Slot 12 | |
| Slot 13 | |
| Slot 14 | |
| Slot 15 | |
| Slot 16 | |

Normal and Extended Range Frame Formats
Channel Acquisition

A mobile user station attempting to communicate with a base station shall seize at least one channel on that base station. This is accomplished by responding to a Base General Poll with a mobile user station General Response. The General Response for this mobile user station, the base station shall respond with a Specific Poll which contains the PID of this mobile user station. On reception of such a Specific Poll, the mobile user station may transition into the Traffic mode.

Until the mobile user station receives a Specific Poll containing its PID, the mobile user station shall not seize the channel and must wait a pseudo random time based upon the PID and then try again in a manner similar to the backoff procedure of ANSI/IEEE 802.3. When the base station is ready to assign a channel to the mobile user station and initiate communications with the mobile user station, the base station shall issue a Specific Poll packet containing the PID of the mobile user station.

Multiple Associated Signaling Time Slots per Frame

Normal time slot synchronization shall be accomplished by timing. Both the base station and mobile user station shall know which time slots have been assigned for communication. The mobile user station shall send its signaling information to the mobile user station in the first half of the TDD time slot; the base station shall send its signaling information in the second half of the TDD time slot. The mobile user station shall synchronize and shall maintain timing synchronization on the base station transmissions. The mobile user station shall maintain timing synchronization with the base station for up to one second in the absence of received base station transmissions.

If available, multiple time slots per frame shall be used for polling and signaling traffic. To accommodate this, the base station shall assign a temporary address known as the Correlative ID C1, to the mobile user station on the first Specific Poll. This Correlative ID shall then be carried in further signaling traffic from the base station to the mobile user station. The mobile user station shall search for this ID in all traffic. The mobile user station can then respond to any signaling traffic time slot containing this Correlative ID. Unused Correlative IDs shall be maintained in a pool by the base station. When communication has ended between the base station and mobile user station, the Correlative ID shall be returned for reuse.

Any available time slot may be used by the base station to continue signaling communications with the mobile user station. The last time slot used by the base station for signaling traffic will become the first time slot for bearer traffic use unless otherwise specified by slot mapping information given to the mobile user station by the base station. If the base station returns to signaling traffic at a later time on the current channel, the Correlative ID will still be effective, and the base station may use any available time slot for further control traffic.

Asymmetric Channels

Traffic flow between the base station and mobile user station may be either symmetric or asymmetric. The total number of bits per TDD time slot shall remain constant in either case. The flow shall be controlled by the base station acting upon the Bandwidth Request bit in the mobile user station to base station traffic header. The normal flow is symmetric with an equal number of bits (except for the header bits) assigned in each direction. The Bandwidth Grant bits in the header of the base station to mobile user station traffic channel shall establish the actual number of bits to be used in the next time slot of the channel.

The base station shall assign TDD time slot bandwidth (number of bits) using the following algorithm:
1. If only the base station (BS) requires additional bandwidth, then the base station shall be granted the additional bandwidth for the next time slot assigned to that mobile user station.
2. If only the mobile user station (MS) requires additional bandwidth, then the mobile user station shall be granted the additional bandwidth for the next time slot assigned to that mobile user station.
3. In all other cases, symmetric bandwidth shall be granted for the next available time slot assigned to that mobile user station.

Broadcast Channels

The asymmetry of the channel may be taken to its logical extreme by granting the entire bandwidth of each time slot to the base station to produce a broadcast channel. The nature of this channel shall be indicated by the Bandwidth Grant bits in the base station time slot header (they apply to the next time slot in the channel). Multiple simultaneous Broadcast Channels shall be supported. During broadcast, the bits normally used for the D-Channel shall be used as a broadcast identifier. Since this occurs in the same position as the Correlative Identifier, the difference in usage is signaled by the Bandwidth Grant bits.

Super Channel

The ability to assign multiple time slots in the frame may be negotiated for and assigned to an individual mobile user station. The negotiation may take place at any time via signaling traffic. The assigned TDD time slot, if available, shall be communicated by the base station to the mobile user station via the OTA Map Type and OTA Map information elements. Channel synchronization shall be maintained by the mobile user station based on frame timing.

The handover procedure shall account for the multiplicity of time slots per channel assigned to the transferring mobile user station. A base station shall have the appropriate number of time slots available to become a candidate as a terminating base station for handover. The time slots need not be available in the same positions in the frame as those in the originating base station.

Logical Sub Channel

A mobile user station need not be granted a time slot in every frame. Time slots may be granted in frames separated by an integral number of intervening frames. The maximum limit on the separation of frames allocated to a single mobile user station is one time slot every 25 frames or every 0.5 seconds. This would yield a channel with a raw full duplex rate of 384 bps.

Multiple Mode Traffic

A single mobile user station may have multiple connections established through the Base Station to the network via multiple channels. One channel may, for example, be assigned to audio traffic while other channels are devoted to data traffic.

O_Notes_RMT Protocol: Packet Formats

There are two basic types of OTA Packets:
1. Signaling Packets, which are used to transfer control information between the base station and the mobile user station, and
2. Bearer Packets, which are used to transfer Voice and Data Traffic between the base station and the mobile user station.

Two packets are transmitted during each TDD time slot, one from the mobile user station to the base station and one from the base station to the mobile user station. Each packet is formatted to be entirely self-contained within its portion of the slot. Error correction and detection is achieved by use of the Frame Check Word (FCW) which appears in all packets. Error recovery of individual packets is left to the higher Protocol handlers of network layer 422, although the ARQ mechanism may be optionally employed.

The only difference between the Packets sent by the Base Station and those sent by the Mobile Station is the size (and format) of the Header: 23 bits in Packets originating from the base station and 17 bits in Packets originating from the mobile user station.

Data is not transmitted over-the-air in octets (multiples of 8 bits). The lengths of the information elements shown in the following formats and packets are the lengths seen by the controlling software.

Signaling Packet Format Signaling Packets are always symmetric, thus there are no High or Low Bandwidth Packet Formats. (It is possible that asymmetric signaling packets will be defined in the future.)

| Information Element | Length in Bits |
| --- | --- |
| Header (17 or 23 bits) | 24 |
| D Channel | 8 |
| B Channel | 160 |
| Reserved for FEC | 32 |
| FCW | 16 |
| <Total Bits in mobile user station> | 240 |

Bearer Packet Format

Bearer Packets are used to transmit Voice or Data traffic end-to-end through the CCT system. There are three varieties of Bearer Packets: high bandwidth, low bandwidth and symmetric bandwidth. (From the base station, there is also a broadcast variety of Bearer Packet.)

When the OTA link is symmetric, both the base station and the mobile user station will transmit a symmetric bandwidth packet. When the OTA link is asymmetric, one side will transmit a high bandwidth packet and the other side will transmit a low bandwidth packet. Which side transmits which size packet will be determined by the Symmetry Bits in the base station Header transmitted during the previous time slot in which the base station and mobile user station exchanged packets.

High Bandwidth Packets

High Bandwidth Packets are used to transport large amounts of bearer traffic or signaling traffic between the base station and the mobile user station.

| Information Element | Length in Bits |
| --- | --- |
| Header (17 or 23 bits) | 24 |
| D Channel | 8 |
| B Channel | |
| FCW | 16 |

Layer 3 Air Interface Description

O_Notes_RMT Protocol: Control Traffic Packets

This section supplies the message formats that are intrinsic to network layer 422, FIG. 4A, Layer 3 Air Interface protocol architecture of O-Interface 610, FIG. 6. These formats are described in detail to include the definition of the message, the required number of bits or field size and application of the message. This section describes the functions that are one level above the frame and slot structure but include the critical components that provide differentiation between types of traffic. Call flow diagrams are dependent on the message set described in this section.

Level 3, network layer 422 signaling information shall be contained in data packets. The details of these packets are given in the following section. Each signaling message shall be contained in one data packet.

Note that the data portion of all Control Traffic Packets is limited in length to 160 bits (20 octets). The remaining 32 bits (4 octets) are specifically reserved for future use by a FEC (Forward Error Correction) mechanism if such a mechanism proves necessary.

CT-ACK (Acknowledge) [MS <=> BS]

Acknowledge messages can be transmitted by either the base station (BS) or the mobile user station (MS). They are used:

As the last element of a larger signaling exchange to indicate a positive acknowledgment of the exchange.

To report an O_Note protocol error to the receiver.

In response to a CT-CSC to refuse the circuit switch (handover).

| Information Element | Length in Bits |
| --- | --- |
|  | 8 |
| ACK Response | 8 |
| ACK'ed Command | 8 |
| Cause | 8 |
| Reserved | 128 |
| <Total Bits In MSG> | 160 |

CT-ASI (Assist Information) [MS <=> BS]

This message is sent either from the BS to the MS or from the MS to the BS. It provides a mechanism to impart various items of information to assist the recipient in making well-informed decisions. It may be sent in response to a CT-ASR message or it may be unsolicited.

| Information Element | Length in Bits |
| --- | --- |
| Message Type | 8 |
| Assist Type | 8 |
| Assist Data | 144 |
| <Total Bits In MSG> | 160 |

CT-ASR (Assist Request) [MS <=> BS]

This message is sent either from the BS to the MS or from the MS to the BS to request information. It provides a mechanism for the sender to request various items of information to assist in making well-informed decisions.

| Information Element | Length in Bits |
| --- | --- |
| Message Type | 8 |
| Assist Type | 8 |
| Assist Request Info | 144 |
| <Total Bits In MSG> | 160 |

CT-CIP (Set Cipher Mode) [MS <=> BS]

This message is sent to the MS from the BS whenever the BS wishes the MS to switch to cipher mode. When the MS receives this message the MS uses the cipher mode parameters to set its ciphering equipment and then switches into or out of cipher mode. All traffic after this point will be ciphered.

| Information Element | Length in Bits |
|---|---|
| Message Type | 8 |
| Cipher Algorithm ID | 8 |
| Frame Number | 24 |
| Frame Offset | 8 |
| Cause | 8 |
| Request PID Type | 8 |
| Reserved | 88 |
| <Total Bits In MSG> | 152 |

CT-CNC (Connection Complete) [MS <=> BS]

The CT-CNC message is sent from the terminating BS to the MS when a handover is completed.

| Information Element | Length in Bits |
|---|---|
| Message Type | 8 |
| TCID | 8 |
| Connection Number | 24 |
| OTA Map Type | 8 |
| OTA Map | 32 |
| Cipher Algorithm ID | 8 |
| Frame Number | 24 |
| Frame Offset | 8 |
| Reserved | 40 |
| <Total Bits In MSG> | 160 |

CT-CRS (Cipher Response) [MS <=> BS]

This message is sent to the BS from the MS to acknowledge the BS's request to switch to cipher mode and to provide the PID requested by the Network. When the MS receives this message the MS uses the cipher mode parameters to set its ciphering equipment and then switches into or out of cipher mode. All traffic after this point will be ciphered.

| Information Element | Length in Bits |
|---|---|
| Message Type | 8 |
| Cause | 8 |
| (Requested) PID | 72 |
| Reserved | 72 |
| <Total Bits In MSG> | 160 |

CT-CSC (Circuit Switch Complete) [MS <==> BS]

This message is sent from the source Base Station to the MS to signal that the network connection is available at the target BS.

| Information Element | Length in Bits |
|---|---|
| Message Type | 8 |
| (New) Zone | 40 |
| (New) Base ID | 32 |
| HRef | 48 |
| Reserved | 32 |
| <Total Bits In MSG> | 160 |

CT-DRG (De-registration) [MS <==> BS]

The MS shall send a de-registration message to the BS when the MS de-registers itself from the BS. If the MS does not send this message, de-registration shall automatically occur a fixed time-out period (e.g., 30 seconds) from the last time the MS sent a registration request to the BS.

| Information Element | Length in Bits |
|---|---|
| Message Type | 8 |
| Cause | 8 |
| Reserved | 144 |
| <Total Bits In MSG> | 160 |

CT-GPO (General Poll) [MS <==> BS]

The BS broadcasts a CT-GPO when it has channels available. The CT-GPO is a general invitation to any MS to attempt to seize a TDD channel (time slot). This poll indicates a free channel (time slot).

| Information Element | Length in Bits |
|---|---|
| Message Type | 8 |
| Zone | 40 |
| BSC ID | 16 |
| Base ID | 32 |
| BS Capabilities | 32 |
| System Type | 8 |
| Service Provider | 16 |
| Slot Quality | 8 |
| <Total Bits In MSG> | 160 |

Special Interpretation of D Channel Information

Since the CT-GPO is to all listening Mobile Stations, the D Channel does not contain a Cl as it does for other signaling messages. Rather, it will be used for the Paging/Broadcast Countdown Information Element.

CT-GPR (General Poll Response) [MS <==> BS]

The MS shall send a CT-GPR message to the BS in response to a CT-GPO when the MS wishes to acquire a link to the BS.

| Information Element | Length in Bits |
|---|---|
| Message Type | 8 |
| Transaction Hint | 8 |
| Transaction Hint Qualifier | 8 |
| PID | 72 |
| Service Provider | 16 |
| Class | 16 |
| MS Capabilities | 16 |
| Reserved | 16 |
| <Total Bits In MSG> | 160 |

Special Interpretation of D Channel Information

As with all CT messages, the D Channel in the CT-GRP messages is used for the Cl (Correlative ID). For an MS acquiring a link for the first time (i.e., no currently active link), the value of this field will be zero. This includes both MSs without any active link plus those MSs (in the future) which are acquiring an additional active link. For an MS which currently has an active session, and which is acquiring a link as part of lost link recovery or to perform signaling without interrupting its bearer traffic, this field will contain the current Cl.

CT-HLD (Hold) [MS <=> BS]
Hold packets can be transmitted by either the BS or the MS. They are generally part of a larger signaling traffic exchange and are used to maintain the OTA link while waiting for an external event. They are also used to establish or change SCT [Slow Control Traffic]. They are treated as no-ops by the ARQ algorithm.

| Information Element | Length in Bits |
| --- | --- |
| Message Type | 8 |
| OTA Map Type | 8 |
| OTA Map | 32 |
| Reserved | 112 |
| <Total Bits In MSG> | 160 |

CT-HOF (Handover Failure) [MS <==> BS]
This message is sent to the MS by either the Originating BS or the Terminating BS to indicate to the MS that the requested handover (OHR or THR) has failed.

| Information Element | Length in Bits |
| --- | --- |
| Message Type | 8 |
| Cause | 8 |
| Reserved | 144 |
| <Total Bits In MSG> | 160 |

CT-IRP (Identity Reply) [MS <==> BS]
The MS sends a CT-IRP message to the BS in response to a CT-IRQ message.

| Information Element | Length in Bits |
| --- | --- |
| Message Type | 8 |
| Identity Type | 8 |
| Identity Data | 72 |
| Message Sequence Number | 8 |
| Reserved | 64 |
| <Total Bits In MSG> | 160 |

CT-IRQ (Identity Request) [MS <==> BS]The BS Sends a CT-IRQ message to the MS when it receives an Identity Request Note from the Network Application. This allows the Network Application to obtain one of the MS's Identifier that is not normally included in the protocol.

| Information Element | Length in Bits |
| --- | --- |
| Message Type | 8 |
| Identity Type | 8 |
| Reserved | 144 |
| <Total Bits In MSG> | 160 |

CT-OHC (Originating Handover Complete) [MS <==> BS]
The Originating Handover Complete message is sent from the MS to the Target BS to complete the Originating Handover procedure.

| Information Element | Length in Bits |
| --- | --- |
| Message Type | 8 |
| HRef | 8 |
| PID | 72 |
| Registration Type | 8 |
| Registration Status | 8 |
| Reserved | 16 |
| <Total Bits In MSG> | 160 |

CT-OHR (Originating Handover Request) [MS <==>Originating BS]
Originating Handovers will be attempted in cases when supporting a system such as DCS1900, where a terminating handover is not possible because there is no way the new BSC can notify the old BSC that the handover is required.
The Originating Handover Request message is sent from the MS to the source BS to initiate the originating handover procedure.

| Information Element | Length in Bits |
| --- | --- |
| Message Type | 8 |
| (New) Zone | 40 |
| (New) BSC ID | 16 |
| (New) Base ID | 8 |
| Remaining Base Count | 8 |
| Reserved | 56 |
| <Total Bits In MSG> | 160 |

CT-PPO (Paging Poll) [MS <==> BS]
The CT-PPO is an invitation for only the MS identified by the PID Information Element to seize the indicated TDD channel (time slot). It is generated by the BS when the BS wishes to establish a link to the specific MS (e.g., for Call Termination).

| Information Element | Length in Bits |
| --- | --- |
| Message Type | 8 |
| Poll Type | 8 |
| PID | 72 |
| OTA Map Type | 8 |
| OTA Map | 32 |
| Paging Group Activity | 8 |
| Reserved | 16 |
| Slot Quality | 8 |
| <Total Bits In MSG> | 160 |

CT-PPR (Paging Poll Response) [MS <==> BS]
The MS send the CT-PPR message to the BS in response to a CT-PPRO from the BS.

| Information Element | Length in Bits |
| --- | --- |
| Message Type | 8 |
| PID | 72 |
| Service provider | 16 |
| Class | 16 |
| MS Capabilities | 16 |
| Cipher Key | 8 |

-continued

| Information Element | Length in Bits |
|---|---|
| Sequence # | |
| Reserved | 24 |
| <Total Bits In MSG> | 160 |

CT-RCP (Registration Complete) [MS <==> BS]

Upon initial or periodic registration completion, the BS responds to the MS with a registration complete message.

| Information Element | Length in Bits |
|---|---|
| Message Type | 8 |
| Registration Status | 8 |
| Registration Timers | 8 |
| Cause | 8 |
| Registration Result Code | 8 |
| SBT | 120 |
| <Total Bits In MSG> | 160 |

CT-REL (Release Link) [MS <==> BS]

This message is sent by either the MS or the BS when the sending side releases the connection in progress or during link setup.

| Information Element | Length in Bits |
|---|---|
| Message Type | 8 |
| Cause | 8 |
| Reserved | 144 |
| <Total Bits in MSG> | 160 |

CT-RRQ (Registration Request) [MS <==> BS]

A registration request shall be sent from a MS to a BS on an initial and a periodic basis. Upon the initial request, the BS shall enter the registration process. If the BS does receive a periodic (30 seconds or as determined by the service provider) registration request from a MS which is currently registered with the BS, then the BS will initiate a de-registration procedure.

| Information Element | Length in Bits |
|---|---|
| Message Type | 8 |
| Cipher Key Sequence # | 8 |
| Registration Type | 24 |
| Registration Status | 8 |
| Registration Info | 128 |
| <Total Bits In MSG> | 160 |

CT-SPO (Specific Poll) [MS <==> BS]

The CT-SPO is an invitation for only the MS identified by the PID Information Element to seize the indicated TDD channel (time slot). It is generated by the BS in response to the Mobile Station's request to establish a link.

| Information Element | Length in Bits |
|---|---|
| Message Type | 8 |
| Poll Type | 8 |
| PID | 72 |
| OTA Map Type | 8 |
| OTA Map | 32 |
| Reserved | 24 |
| Slot Quality | 8 |
| <Total Bits In MSG> | 160 |

Special Interpretation of D Channel Information

The D Channel in the CT-SPO message is used for the Cl (Correlative ID). Normally, this is how the MS learns the Cl's value for the first time. There are cases where the BS has learned all it needs to know from the Transaction Hint given by the MS in its CT-GPR message. In these cases, the BS will respond to the MS with a CT-SPO message whose Cause information element (IE) provides the requisite information to the MS to complete the transaction. The Cl of this IE will be zero, which the MS interprets as meaning that the BS does not expect to hear from it again.

The BS will use the Correlative ID IE in the CT-SPO message to either assign a new Cl to the MS, or to tell it (with a value of zero) that it does not want the MS to respond again (except for a CT-ACK). The most likely reasons for a Cl of zero is that the BS has all the information it needs for a BS Periodic Registration or for 911 queuing, but there may be other reasons (which will be identified in the Cause information element).

CT-SRQ (Service Request) [MS <==> BS]

The MS sends the service message to the BS to request call management access to the network.

| Information Element | Length in Bits |
|---|---|
| Message Type | 8 |
| TCID | 8 |
| Resource Request Data | 16 |
| Network Service | 128 |
| Reserved Data | |
| <Total Bits In MSG> | 160 |

CT-SRS (Service Response) [MS <==> BS]

The BS sends the CT-SRS message to the MS to inform the MS of the network's response to a Service Request.

| Information Element | Length in Bits |
|---|---|
| Message Type | 8 |
| TCID | 8 |
| Network Service Response | 24 |
| Cause | 8 |
| Reserved | 112 |
| <Total Bits In MSG> | 160 |

CT-STL (Set Link) [MS <==> BS]

The BS sends the STL message to the MS when the BS wishes to change the characteristics of the over the air service.

| Information Element | Length in Bits |
|---|---|
| Message Type | 8 |
| Resource Request Data | 16 |
| OTA Map Type | 8 |
| OTA Map | 32 |
| Cause | 8 |
| TCID | 8 |
| Connection Number | 8 |
| Transport Method | 32 |
| Reserved | 24 |
| <Total Bits In MSG> | 160 |

CT-SYN (Synchronize) [MS <==> BS]

The Synchronize message is sent by the MS to the BS whenever the MS detects a loss of synchronization on ciphering. The message contains the MS's current understanding of the synchronization so the BS can determine if desired whether the two sides are out of sync. If the BS receives a CT-SYN from the MS, or if the BS detects a loss of ciphering synchronization, its appropriate response is to send the MS a CT-CIP message containing the correct parameters.

This message is never ciphered.

| Information Element | Length in Bits |
|---|---|
| Message Type | 8 |
| Cipher Algorithm ID | 8 |
| Cipher Key Sequence # | 8 |
| Frame Number | 24 |
| Frame Offset | 8 |
| Cause | 8 |
| Reserved | 96 |
| <Total Bits In MSG> | 160 |

CT-THC (Terminating Handover Complete) [MS <==> BS]

The Terminating Handover Complete message is sent from the MS to the Target BS to complete the Terminating Handover procedure.

| Information Element | Length in Bits |
|---|---|
| Message Type | 8 |
| Registration Type | 8 |
| Registration Status | 8 |
| Reserved | 136 |
| <Total Bits In MSG> | 160 |

CT-THR (Terminating Handover Request) [MS <==> BS]

Handovers can, with certain limitations, be initiated either from the old BS (an originating handover) or the new BS (a terminating handover). The MS will attempt a terminating handover whenever possible because they are faster and more robust.

The Terminating Handover Request message is sent from the MS to the target BS to initiate the terminating handover procedure.

| Information Element | Length in Bits |
|---|---|
| Message Type | 8 |
| Resource Request Data | 16 |
| (Old) Zone | 40 |
| (Old) BSC ID | 16 |
| (Old) BS ID | 32 |
| (Old) Connection Number | 24 |
| Reserved | 24 |
| <Total Bits In MSG> | 160 |

CT-TRA (Transport Message) [MS <==> BS]

The Transport message transports data between the BS and MS on the circuit specified by TCID (part of the Message Type for CT-TRA messages).

| Information Element | Length in Bits |
|---|---|
| Message Type | 8 |
| Transport Data | 152 |
| <Total Bits In MSG> | 160 |

The Transport Data includes the New Personal ID, Message Sequence number, and reserved bits, as below.

| Information Element | Length in Bits |
|---|---|
| Message Type | 8 |
| New Personal ID | 72 |
| Message Sequence Number | 8 |
| Reserved | 72 |
| <Total Bits In MSG> | 160 |

CT-UID (Update ID) [MS <==> BS]

Upon receipt of an N_Notes_RMT_Update ID message from the network, the BS sends the MS a CT_UID message.

| Information Element | Length in Bits |
|---|---|
| Message Type | 8 |
| New Personal ID | 72 |
| Zone | 40 |
| Reserved | 40 |
| <Total Bits In MSG> | 160 |

O_Notes_RMT Protocol: Using The D-Channel

The D-Channel is a one-byte element of the OTA Packets which is used as a Secondary Signaling Channel for slow (or very short) signaling.

D-Channel Data Rate

| Channel Rate in Slots/Frame | Equivalent Raw B-Channel Data Rate (bits/second) | D-Channel Data Rate (octets/second) | D-Channel Data Rate (bits/second) |
|---|---|---|---|
| 1/32 | 300 | 1.88 | 12.5 |
| 1/16 | 600 | 3.13 | 25 |
| 1/8 | 1200 | 6.25 | 50 |
| 1/4 | 2400 | 12.5 | 100 |
| 1/2 | 4800 | 25 | 200 |
| 1/1 | 9600 | 50 | 400 |
| 2/1 | 19,200 | 100 | 800 |
| 3/1 | 28,800 | 150 | 1,200 |
| 4/1 | 38,400 | 200 | 1,600 |
| 5/1 | 48,000 | 250 | 2,000 |
| 6/1 | 57,600 | 300 | 2,400 |
| 7/1 | 67,200 | 350 | 2,800 |
| 8/1 | 76,800 | 400 | 3,200 |
| 9/1 | 86,400 | 450 | 3,600 |
| 10/1 | 96,000 | 500 | 4,000 |
| 11/1 | 105,600 | 550 | 4,400 |
| 12/1 | 115,200 | 600 | 4,800 |
| 13/1 | 124,800 |  | 5,200 |
| 14/1 | 134,400 | 700 | 5,600 |
| 15/1 | 144,000 | 750 | 6,000 |
| 16/1 | 153,600 | 800 | 6,400 |

D-Channel Usage

When the main circuit is used for Signaling, the D-Channel is used for:

Correlative ID: In all Signaling Traffic (CT-messages) except for General Polling Messages. General Polling Messages—i.e., CT-GPO and future messages—do not contain a PID (or a Cl) because they are addressed to multiple MSs.

Reserved: The D-Channel in General Polling Messages is reserved for future use. Possible use includes a count down event timer to alert all mobiles to the beginning of an event such as a Paging loop or a broadcast message sequence, and b) a grouping message which identifies a group of MSs for which the General Polling Message is targeted.

When the main circuit is used for Bearer Traffic, the D-Channel is used for:

Transport Notes whose channel preference includes the D-Channel. These notes generally contain information which is not critical, e.g., SMS messages.

Very short OTA signaling transactions such as a MS's request for a TSI or a brief ASR/ASI type transaction: e.g., containing the MS's distance from the BS.

D-Channel Protocol

When the main circuit is being used for Bearer Traffic, all byte values in the D-Channel are legal as data. There are a few byte values which also have meaning as signaling information.

| Value (hex) | Meaning |
|---|---|
| FF | Filler |
| FE | Escape |
| FD | SOM (Start-of-Message) |
| FC | EOM (End-of-Message) |
| FB | Instant Request: TSI |
| FA | Instant Request: Separate Signaling Channel |

Filler

The Filler byte is send in the D-Channel whenever there is nothing else to send. The ARQ MSG# is never bumped for it and it is never re-sent in response to the ARQ NAK unless there is nothing else to send.

Escape

The Escape byte is sent in the D-Channel as an immediate prefix to any signaling byte—including the Escape byte—which appears in the data being sent.

SOM (Start-of-Message)

The SOM Byte is sent to signal the beginning of a new Transport Note. It is required because of the ability to switch between the D and B channels for the transmission of the Transport Note. The character immediately after the SOM will be any legal O_Note Message Type; if the Message Type is one of the special signaling bytes, it will be prefixed with the Escape byte.

EOM (End-of-Message)

There EOM byte signals the end of a message. It will be followed by one of the following:

a Filler byte, an SOM signaling the beginning of a new message, one of the Instant Request signaling bytes.

Instant Request: TSI

The IR (Instant Request): TSI byte is a "single-byte message" which is used to request a Time Slot Interchange. Since it is a single byte in length, it does not require either an SOM or an EOM.

The IR:TSI command is used by the MS to ask the BS to perform a TSI; the BS's reception of the IR:TSI command is confirmed by the ARQ bits of the BS's response message. The BS's acceptance of the TSI request is evidenced by the appearance of either a non-zero Next Slot Pointer in the header and an IR:TSI byte in the D-Channel (if the circuit is a single channel) or by the appearance of a CT-STL message and the MS's Cl in the D-Channel (if the circuit is either sub-rate or super-rate).

The BS can initiate a TSI by the same mechanism—a non-zero Next Slot Pointer in the header and an IR:TSI byte in the D-Channel of the same packet.

Instant Request: Separate Signaling Channel

This is a "single-byte message" which is used to request a Separate Signaling Channel. Since it is a single byte in length, it does not require either an SOM or an EOM.

The IR:Separate Signaling Channel command is used by the MS to ask to BS to establish a separate signaling channel so that the MS may perform some higher speed signaling without preempting the existing B-Channel. The BS will grant the request if it can, in which case it will send a non-zero Next Slot Pointer in the header and an IR:Separate Signaling Channel byte in the D-Channel of the next packet.

The BS can also initiate the Separate Signaling Channel by the same mechanism—a non-zero Next Slot Pointer in the header and an IR:Separate Signaling Channel byte in the D-Channel of the next packet.

Data

The O_Note Message Type byte will be followed by one or more bytes of data, comprising the information elements of an O_note. Whenever one of the signaling bytes appears as a data bye, the segmenter will prefix the byte with an Escape byte.

All zero bytes at the end of the note—the Reserved bytes[5]—will be omitted. It will be the responsibility of the D-Channel Segmenter to remove the bytes on transmission and to reinstate them on reception, if appropriate. Note that zero suppression will not occur for CT-TRA messages since there are no Reserved bytes.

Encryption

If encryption is enabled on the D-Channel, it will occur on the date (except the Message Type) before the note is presented on the D-Channel Segmenter. Byte stuffing (i.e., the process of prefixing Escape bytes to ambiguous data bytes) is performed on the encrypted data.

Delayed or No Response To An IR (Instant Request)

The MS must be prepared for the possibility that an IR will not be immediately responded to for two reasons:

1. The BS does not respond to the request because it does not have the resources to satisfy the request.
2. The BS doesn't have time to process the request before it must respond. It may still honor the request during the next slot. If it does so, it will have the same effect as if the BS had initiated the request; it will be effective when the MS honors the Next Slot Pointer by responding in that slot. If the MS does not respond, the BS must assume that the MS did not hear it and proceed accordingly.

It is, of course, possible that the last non-Reserved byte(s) in the O_Note will be zero. This will not matter, since they will be recovered during re-segmentation.

If the BS doesn't have time to respond immediately but prepares to do so next slot, and the MS decides to preempt the bearer during the next slot, the BS will interpret the second request as a duplicate request and will ignore it. It will appear to the MS that the BS had responded to its second request immediately.

3. The MS D-Channel Segmenter did not send the request because the D-Channel is in the process of sending an Escape sequence. Specifically, an Escape was sent in the D-Channel last slot and the IR request cannot be sent this time or else it would be treated as a data character and the true data character would be treated as a command or as data when it appeared, unescaped, in the next slot. If an Escape sequence is in progress, the D-Channel Segmenter will notify the MS OTA—it will not save the command to send next slot—and the MS OTA will either re-send the request next slot or will adopt another strategy (e.g., sending a control message in the B-Channel).
4. If a D-Channel command is required as part of the BS's response and if the BS D-Channel Segmenter is in the process of sending an SOM or escape sequence. If this is so, the D-Channel Segmenter will notify the BS OTA—it will not save the command to send next slot—and the BS OTA will either re-send the response next slot or will adopt another strategy (e.g., sending a control message in the B-Channel).

O-Interface: Segmentation

B-Channel Segmentation

D-Channel Segmentation

M-Interface

The M-interface is the interface between the Mobile Station's OTA and PAC (Protocol Adaptation Layer) processes.

M-Interface Layer One Description

Both M-Interface Layer One and Layer Two are implementation dependent. Assuming that the Mobile Station is an integrated device, e.g., a pocket phone, the interface will probably be a massaging system operating on top of an RTOS. The only requirements are that the M_Notes are delivered to the recipient (the OTA or the PAL, as appropriate) in the sequence presented by the sender and in the format described herein.

M-Interface Layer Two Description

See M-Interface Layer One Description above.

M_Notes_RMT Protocol

Assist_Information_Cnf [PAL <=> OTA]

The Assist Information Confirm message can be transferred in either direction; it implements a generic form of information exchange so that additional information can be disseminated without changing the protocol. The message is identical in format—and possibly content—to the Assist Information Indication message; the sole difference is that the Assist Information Confirm is sent in response to an Assist Information Request while the Assist Information Indication message is unsolicited.

| Information Element | Length in Octets |
| --- | --- |
| Message Type | 1 |
| Channel Preference | 1 |
| Assist Type | 1 |
| Assist Data | 18 |
| <Total Octets in Message> | 21 |

Assist_Information_Ind [PAL <=> OTA]

The Assist Information Indication message can be transferred in either direction; it implements a generic form of information exchange so that additional information can be disseminated without changing the protocol. The message is identical in format—and possibly content—to the Assist Information Confirm message; the sole difference is that the Assist Information Confirm is set in response to an Assist Information Request while the Assist Information Indication message is unsolicited.

| Information Element | Length in Octets |
| --- | --- |
| Message Type | 1 |
| Channel Preference | 1 |
| Assist Type | 1 |
| Assist Data | 18 |
| <Total Octets in Message> | 21 |

Assist_Information_Req [PAL <=> OTA]

The Assist Information Request message allows the sender to solicit Assist Information.

| Information Element | Length in Octets |
| --- | --- |
| Message Type | 1 |
| Channel Preference | 1 |

-continued

| Information Element | Length in Octets |
| --- | --- |
| Assist Type | 1 |
| Assist Request Info | 18 |
| <Total Octets in Message> | 21 |

Cipher_Mode_Ind [PAL <== OTA]

The Cipher Mode Indication message reports a cipher equipment mode change. It is generated when the OTA receives a CT-CIP or CT-CNC message from the BS.

| Information Element | Length in Octets |
| --- | --- |
| Message Type | 1 |
| Circuit ID | 1 |
| Cipher Algorithm ID | 1 |
| Cipher Key Sequence # | 1 |
| Frame Number | 3 |
| Cause | 1 |
| Request PID Type | 1 |
| <Total Octets in Message> | 9 |

Cipher_Mode-Rsp [PAL ==> OTA]

The Cipher Mode Response message indicates acceptance of a cipher equipment mode change.

| Information Element | Length in Octets |
| --- | --- |
| Message Type | 1 |
| Circuit ID | 1 |
| Cause | 1 |
| (Request) PID | 9 |
| <Total Octets in Message> | 12 |

Deregister_Cnf [PAL <== OTA]

The Deregister Confirmation message provides confirmation to the PAL that the OTA has deregistered the MS as requested.

| Information Element | Length in Octets |
| --- | --- |
| Message Type | 1 |
| Circuit ID | 1 |
| Cause | 1 |
| BS Information | 15 |
| <Total Octets in Message> | 18 |

Deregister_Req [PAL ==> OTA]

The Deregister Request message requests deregistration from a network.

| Information Element | Length in Octets |
| --- | --- |
| Message Type | 1 |
| Circuit ID | 1 |

-continued

| Information Element | Length in Octets |
| --- | --- |
| Cause | 1 |
| <Total Octets in Message> | 3 |

Error_Ind [PAL <==> OTA]

The Error Indication message reports an M-Note protocol error to the receiver.

| Information Element | Length in Octets |
| --- | --- |
| Message Type | 1 |
| Cause | 1 |
| The offending M-Note (in its entirety) | <Variable> |
| <Minimum Octets in Message> | 2 |

Identity_Request_Ind [PAL <== OTA]

The Identity Request Indication message provides indication of an identity request received from the Network.

| Information Element | Length in Octets |
| --- | --- |
| Message Type | 1 |
| Circuit ID | 1 |
| PID Type | 1 |
| <Total Octets in Message> | 3 |

Identity_Request_Rsp [OTA <== PAL]

The Identity Request Response message provides the identity request by the Network.

| Information Element | Length in Octets |
| --- | --- |
| Message Type | 1 |
| Circuit ID | 1 |
| Message Sequence Number | 1 |
| PID | 9 |
| <Total Octets in Message> | 12 |

Identity_Update_Ind [PAL <== OTA]

The Identity Update Indication message provides indication of an identity update.

| Information Element | Length in Octets |
| --- | --- |
| Message Type | 1 |
| Circuit ID | 1 |
| PID (new) | 9 |
| BS Information | 5 |
| <Total Octets in Message> | 16 |

Identity_Update_Rsp [PAL ==> OTA]

The Identity Update Response message provides indication of an identity update.

| Information Element | Length in Octets |
|---|---|
| Message Type | 1 |
| Circuit ID | 1 |
| Cause | 1 |
| <Total Octets in Message> | 3 |

Initialize_Cnf [PAL <== OTA]
The Initialize Confirmation message provides notification of MS OTA initialization. If any BS was found, the BS information will be reported to the PAL so that emergency (911) calls can be placed.

| Information Element | Length in Octets |
|---|---|
| Message Type | 1 |
| Cause | 1 |
| BS Information | 1 |
| <Total Octets in Message> | 3 |

Initialize_Req [PAL ==> OTA]
The Initialize Request message request initialization of the MS OTA.

| Information Element | Length in Octets |
|---|---|
| Message Type | 1 |
| Cause | 1 |
| <Total Octets in Message> | 2 |

Mode_Ind [PAL <== OTA]
The Mode Indication message provides notification that the bearer traffic characteristics of a requested Circuit have been assigned.

| Information Element | Length in Octets |
|---|---|
| Message Type | 1 |
| Circuit ID | 1 |
| Cause | 1 |
| Resource Request Data | 2 |
| <Total Octets in Message> | 5 |

Mode_Rsp [PAL ==> OTA]
The Mode Response message acknowledges receipt of a Mode Indication message.

| Information Element | Length in Octets |
|---|---|
| Message Type | 1 |
| Circuit ID | 1 |
| Traffic Type | 1 |
| <Total Octets in Message> | 3 |

New_Cell_Ind [PAL <== OTA]
The New Cell Indication message provides indication of detection of a new cell.

| Information Element | Length in Octets |
|---|---|
| Message Type | 1 |
| Cause | 1 |
| BS Information | 15 |
| <Total Octets in Message> | 17 |

OTA_Failure_Ind [PAL <== OTA]
The OTA Failure Indication message reports an OTA error.

| Information Element | Length in Octets |
|---|---|
| Message Type | 1 |
| Circuit ID | 1 |
| Cause | 1 |
| <Total Octets in Message> | 3 |

Register_Cnf [PAL <== OTA]
The Register Confirmation message provides registration notification.

| Information Element | Length in Octets |
|---|---|
| Message Type | 1 |
| Circuit ID | 1 |
| Registration Status | 1 |
| Reg Timers | 1 |
| Cause | 1 |
| Registration Result Code | 1 |
| Follow On Proceed | 1 |
| BS Information | 15 |
| <Minimum Octets in Message> | 22 |

Register_Req [PAL ==> OTA]
The Register Request message request registration on a specified network.

| Information Element | Length in Octets |
|---|---|
| Message Type | 1 |
| Circuit ID | 1 |
| Cipher Key Sequence # | 1 |
| Network Periodic Control | 1 |
| Registration Type | 1 |
| Registration Status | 1 |
| Registration Info | 16 |
| BS Information | 15 |
| <Total Octets in Message> | 37 |

Release_Cnf [PAL <== OTA]
The Release Confirmation message provides notification that one or more Link's resources have been released.

| Information Element | Length in Octets |
|---|---|
| Message Type | 1 |
| Cause | 1 |
| List Count | 1 |

| Information Element | Length in Octets |
|---|---|
| Circuit ID 1 | 1 |
| ... | ... |
| Circuit ID N | ... |
| <Minimum Octets in Message> | 4 |

Release_Ind [PAL <== OTA]

The Release Indication message provides notification that one or more Link's resources have been released on the network side.

| Information Element | Length in Octets |
|---|---|
| Message Type | 1 |
| Cause | 1 |
| List Count | 1 |
| Circuit ID 1 | 1 |
| ... | ... |
| Circuit ID N | ... |
| <Minimum Octets in Message> | 4 |

Release_Req [PAL ==> OTA]

The Release Request message requests release of one or more Link's resources.

| Information Element | Length in Octets |
|---|---|
| Message Type | 1 |
| Cause | 1 |
| List Count | 1 |
| Circuit ID 1 | 1 |
| ... | ... |
| Circuit ID N | ... |
| <Minimum Octets in Message> | 4 |

Search_Cnf [PAL <== OTA]

The Search Confirmation message provides search results for the requested search. There will be one BS Information element for each BS found. This may mean several BS Information elements returned for each requested Zone or PLMN.

| Information Element | Length in Octets |
|---|---|
| Message Type | 1 |
| Search Type | 1 |
| List Count | 1 |
| BS Information 1 | 15 |
| ... | ... |
| BS Information N | ... |
| <Minimum Octets in Message> | 18 |

Search_Req [PAL ==> OTA]

The Search Request message requests a search for PLMN(s) or Zones. If List Count =1, the (Specific) BS Information element will contain information pertaining to the PLMN or Zone which is desired.

| Information Element | Length in Octets |
|---|---|
| Message Type | 1 |
| Search Type | 1 |
| Search Time | 4 |
| List Count | 1 |
| (Specific) BS Information | 15 |
| <Total Octets in Message> | 22 |

Service_Cnf [PAL <== OTA]

The Service Confirmation message provides acknowledgment of a Service Request.

| Information Element | Length in Octets |
|---|---|
| Message Type | 1 |
| Circuit ID | 1 |
| TCID | 1 |
| ACK Response | 1 |
| <Total Octets in Message> | 4 |

Service_Ind [PAL <== OTA]

The Service Indication message provides notification of an MS page.

| Information Element | Length in Octets |
|---|---|
| Message Type | 1 |
| Circuit ID | 1 |
| Poll Type | 1 |
| <Total Octets in Message> | 4 |

Service_Req [PAL ==> OTA]

The Service Request message requests establishment of a Link.

| Information Element | Length in Octets |
|---|---|
| Message Type | 1 |
| Circuit ID | 1 |
| Resource Request Data | 2 |
| Cipher Key Sequence # | 1 |
| Network Service Request Data | 16 |
| <Total Octets in Total> | 21 |

Service_Response_Ind [PAL <== OTA]

The Service Response Indication message provides notification of Network's response to the MS's Service Request.

| Information Element | Length in Octets |
|---|---|
| Message Type | 1 |
| Circuit ID | 1 |
| Network Service Response | 3 |
| Cause | 1 |
| <Total Octets in Message> | 6 |

Shutdown_Cnf [PAL <== OTA]

The Shutdown Confirmation message provides notification of MS OTA shutdown.

| Information Element | Length in Octets |
|---|---|
| Message Type | 1 |
| Cause | 1 |
| <Total Octets in Message> | 2 |

Shutdown_Req [PAL ==> OTA]

The Shutdown Request message requests graceful shutdown.

| Information Element | Length in Octets |
|---|---|
| Message Type | 1 |
| Cause | 1 |
| <Total Octets in Message> | 2 |

Transport_Cnf [PAL <== OTA]

The Transport Confirmation message provides notification that the most recent Transport Request was completely serviced (i.e., delivered to the BS).

Note that while the PAL can not send another Transport_Req for a given TCID during the interval while it was waiting for the Transport_Cnf on the last Transport_Req to that TCID, it may send another M_Note or a Transport_Req to a different TCID.

| Information Element | Length in Octets |
|---|---|
| Message Type | 1 |
| Circuit ID | 1 |
| TCID | 1 |
| Cause | 1 |
| <Total Octets in Message> | 4 |

Transport_Ind [PAL <== OTA]

The Transport Indication message contains upper layer data received on a Transport Channel.

| Information Element | Length in Octets |
|---|---|
| Message Type | 1 |
| Circuit ID | 1 |
| TCID | 1 |
| TC Data Length | 2 |
| TC Data | Variable |
| <Minimum Octets in Message> | 5 |

Transport_Req [PAL ==> OTA]

The Transport Request message contains upper layer data to be transmitted on a Transport Channel.

| Information Element | Length in Octets |
|---|---|
| Message Type | 1 |
| Circuit ID | 1 |
| TCID | 1 |
| Channel Preference | 1 |
| Transport Retry Count | 1 |
| TC Data Length | 2 |
| TC Data | Variable |
| <Minimum Octets in Message> | 4 |

The only requirements are that the M-Notes are delivered to the recipient (the OTA or the PAL, as appropriate) in the sequence presented by the sender and in the format described herein.

N-Interface

The N-interface 620, FIG. 6, is the link between the BS (Base Station) and the BSC (Base Station Controller).

N-Interface Layer One Description

A 64 kbps DSO channel shall be provided between the Base Station (BS) and the Base Station Controller (BSC), for the exclusive use by the system to transport network signaling information. This DSO can be supported by a T1, Fractional T1, High Density Subscriber Lines (HDSL), Fractional HDSL, etc., circuit depending on the particular installation circumstance.

N-Interface Layer Two Description

The CCT architecture specifies that the signaling channel between the BS and the BSC shall be a nailed-up 64K bit/sec DSO link supporting the CCITT ISDN data link layer protocol. The DSO link may be shared by the two TRX Units which comprise the Base Station, but each TRX unit will see a separate logical link. The primary function of CCITT ISDN Recommendations Q.920 and Q.921 for the CCT data link layer is to provide an error-free communications link between the BS and the BSC. Its specific tasks include:

framing to signal the beginning and end of each transmission addressing to establish connectivity, sequencing to maintain the order of transmitted frames acknowledgment on receipt of frames, time-outs to indicate an expected but unreceived frame error control to detect bit errors and out of sequence frames, and flow control to provide a backoff mechanism for slow receivers The ISDN data link layer protocol described in Recommendation Q.920/Q.921 is a bit-oriented protocol called "Link Access Procedures on the D-Channel" (LAPD) and is a subset of the ISO standard protocol High-level Data Link Control (HDLC). LAPD defines the logical connection between the user (BS) and the network (BSC) on the D-channel. LAPD will support the CCT connection between the BS and the BSC using serial, synchronous, full-duplex communications across a point-to-point physical connection. CCT N_Notes_RMT messages will be carried in the User Information field of the LAPD frames.

Assist Information [BS <==> BSC]

This message is sent either from the BS to the BSC or from the BSC to the BS. It provides a mechanism to impart various items of information to assist the recipient in making well informed decisions.

| Information Element | Length in Octets |
| --- | --- |
| Protocol | 1 |
| System Type | 1 |
| Message Type | 1 |
| Channel Preference | 1 |
| Assist Type | 1 |
| Assist Data | 18 |
| <Total Octets In MSG> | 23 |

Assist Request [BS <==> BSC]

This message is sent either from the BS to the BSC or from the BSC to the BS to request information. It provides a mechanism for the sender to request various items of information to assist in making well informed decisions.

| Information Element | Length in Octets |
| --- | --- |
| Protocol | 1 |
| System Type | 1 |
| Message Type | 1 |
| Channel Preference | 1 |
| Assist Type | 1 |
| Assist Request Info | 18 |
| <Total Octets In MSG> | 23 |

Base Status Request [BS <== BSC]

The Base Status Request N_Notes_RMT message shall be sent to the BS by a Network Application to initiate a Base Status Response N_Notes_RMT message from the BS.

| Information Element | Length in Octets |
| --- | --- |
| Protocol | 1 |
| System Type | 1 |
| Message Type | 1 |
| PID | 9 |
| CI | 1 |
| Base ID | 4 |
| Base Status | 32 |
| <Total Octets In MSG> | 49 |

Base Status Response [BS <== BSC]

The Base Status Response N_Notes_RMT message shall be sent to the Network Application by the BS after receiving a Base Status Request N_Notes_RMT message from the Network Application.

| Information Element | Length in Octets |
| --- | --- |
| Protocol | 1 |
| System Type | 1 |
| Message Type | 1 |
| PID | 9 |
| CI | 1 |
| Base ID | 4 |
| Base Status | 32 |
| <Total Octets In MSG> | 49 |

Cipher Response [BS ==> BSC]

The Cipher Response N_Notes_RMT message shall be sent to the Network Application by the BS to inform the Network Application that the BS and MS have configured and keyed their encryption equipment and have enabled the equipment.

| Information Element | Length in Octets |
| --- | --- |
| Protocol | 1 |
| System Type | 1 |
| Message Type | 1 |
| PID | 9 |
| CI | 1 |
| Clause | 1 |
| (Requested) PID | 9 |
| <Total Octets In MSG> | 23 |

Circuit Switch Complete [BS <== BSC]

The Circuit Switch Complete N_Notes_RMT message shall be sent to the Originating BS from the Network Application when a handover circuit switch operation has completed. This message informs the Originating base that the bearer channel has been switched from the Originating BS to the Terminating BS and that the Originating BS may release all the resources associated with the MS.

| Information Element | Length in Octets |
| --- | --- |
| Protocol | 1 |
| System Type | 1 |
| Message Type | 1 |
| PID | 9 |
| CI | 1 |
| (New) Zone | 5 |
| (New) Base ID | 4 |
| HRef | 6 |
| <Total Octets In MSG> | 28 |

Circuit Switch Refused [BS ==> BSC]

The Circuit Switch Refused N_Notes_RMT message shall be sent to the Network Application from the Originating BS when the MS has rejected the circuit switch.

| Information Element | Length in Octets |
| --- | --- |
| Protocol | 1 |
| System Type | 1 |
| Message Type | 1 |
| PID | 9 |
| CI | 1 |
| (New) Zone | 5 |
| (New) Base ID | 4 |
| HRef | 6 |
| <Total Octets In MSG> | 28 |

Connection Complete [BS <== BSC]

The Connection Complete N_Notes_RMT message shall be sent to the Terminating BS from the Network Application when a handover circuit switch operation has completed. This message informs the Terminating BS that the bearer channel has been switched from the Originating BS to the Terminating BS.

| Information Element | Length in Octets |
| --- | --- |
| Protocol | 1 |
| System Type | 1 |
| Message Type | 1 |
| PID | 9 |
| CI | 1 |
| TCID | 1 |
| Cipher Algorithm ID | 1 |
| Cipher Key | 8 |
| Connection Number | 3 |
| Transport Method | 4 |
| <Total Octets In MSG> | 30 |

Deregister [BS ==> BSC]

The Deregister N_Notes_RMT message shall be issued from the BS to the Network Application as the result of either a DRG control traffic response message or a BS time-out, which indicates that the identified MS is no longer in the response range of the BS. The proper response of the Network Application is to release all resources which may have been preallocated to the MS.

| Information Element | Length in Octets |
| --- | --- |
| Protocol | 1 |
| System Type | 1 |
| Message Type | 1 |
| PID | 9 |
| CI | 1 |
| Class | 2 |
| Clause | 1 |
| <Total Octets In MSG> | 16 |

Error Indication [BS <=> BSC]

The Error Indication N_Notes_RMT message shall be issued by the sender when it needs to report an error to the other side. Generally, this error will be something like an unrecognized message type, unexpected message, information element in error, etc. See Clause Information Element for a complete list of errors.

| Information Element | Length in Octets |
| --- | --- |
| Protocol | 1 |
| System Type | 1 |
| Message Type | 1 |
| PID | 9 |
| CI | 1 |
| Clause | 1 |
| <Total Octets In MSG> | 14 |

Handover Failed [BS <== BSC]

The Handover Failed N_Notes_RMT message shall be sent to both the Source and Target Base Stations from the Network Application when the higher order network infrastructure has rejected the Terminating or Originating Handover Request from the MS. Each BS must send a CT-HOF O_Notes_RMT message to the MS if/when it communicates with the MS. The Source MS will maintain the existing connection to the MS; the Target BS will release the connection with the MS after sending the CT-HOF.

| Information Element | Length in Octets |
| --- | --- |
| Protocol | 1 |
| System Type | 1 |
| Message Type | 1 |
| PID | 9 |
| CI | 1 |
| Clause | 1 |
| <Total Octets In MSG> | 14 |

Handover Request [BS <== BSC]

The Handover Request N_Notes_RMT message is sent to the Target Base Station from the BSC when the higher order network infrastructure is attempting to perform an Originating Handover Request from the MS. The Target BS will reserve the requisite resources for the circuit being handed over, if available, and will respond to the BSC with a Handover Request ACK message.

| Information Element | Length in Octets |
| --- | --- |
| Protocol | 1 |
| System Type | 1 |
| Message Type | 1 |
| PID (HRef) | 9 |
| CI | 1 |
| TCID | 4 |
| Connection Number | 3 |
| Cipher Algorithm ID | 1 |
| Cipher Key | 8 |
| Resource Request Data | 2 |
| Transport Method | 4 |
| <Total Octets In MSG> | 32 |

For the Service Type field in the Resource Request Data information element in a Handover Request N_Note, the only legal values are Normal Call and Emergency Call. Furthermore, DCS1900 may not be able to provide this element, in which case it will default to Normal Call. For DCS1900 Systems, PID is an Href.

Handover Request Reply [BS <== BSC]

The Handover Request Reply N_Notes_RMT message shall be sent to the BSC in response to the Handover Request message.

| Information Element | Length in Octets |
| --- | --- |
| Protocol | 1 |
| System Type | 1 |
| Message Type | 1 |
| PID (HRef) | 9 |
| CI | 1 |
| Backhaul Map Type | 1 |
| Backhaul Map | 4 |
| Cause | 1 |
| <Total Octets In MSG> | 19 |

For DCS1900 Systems, PID is an HRef.

Updated [BS <== BSC]

The N_Notes_RMT_ID Updated message shall be sent by the BS to the Network Application to indicate the successful updating of an MS's PID.

| Information Element | Length in Octets |
|---|---|
| Protocol | 1 |
| System Type | 1 |
| Message Type | 1 |
| (Old) PID | 9 |
| CI | 1 |
| (New) PID | 9 |
| Message Sequence Number | 1 |
| <Total Octets In MSG> | 24 |

Identity Reply [BS <== BSC]

The N_Notes_RMT_Identity Reply message shall be sent by the BS to the Network Application to provide the MS's requested identity.

| Information Element | Length in Octets |
|---|---|
| Protocol | 1 |
| System Type | 1 |
| Message Type | 1 |
| PID | 9 |
| CI | 1 |
| Identity Type | 1 |
| Identity Data | 9 |
| Message Sequence Number | 21 |
| <Total Octets In MSG> | 24 |

Identity Request [BS <== BSC]

The N_Notes_RMT_ID Updated message shall be sent by the Network Application to the BS to request an MS identifier that has not been provided as part of the MS's normal communications with the Network Application.

| Information Element | Length in Octets |
|---|---|
| Protocol | 1 |
| System Type | 1 |
| Message Type | 1 |
| PID | 9 |
| CI | 1 |
| Identity Type | 1 |
| <Total Octets In MSG> | 14 |

Originating Handover [BS <== BSC]

The Originating Handover N_Notes_RMT message shall be sent from the BS to the Network Application after an MS has returned to the originating BS and has completed the originating handover control traffic sequence. This message contains the PID of the MS, the BS ID and Zone of the Terminating BS. This information is to be used by the Network Application to establish a bearer connection to the Terminating BS. The Network application should respond to the Originating BS with a Circuit Switch Complete N_Notes_RMT message signifying that the Terminating BS is now connected to the proper bearer channel.

| Information Element | Length in Octets |
|---|---|
| Protocol | 1 |
| System Type | 1 |
| Message Type | 1 |
| PID | 9 |
| CI | 1 |
| Remaining Base Count | 1 |
| (New) Zone | 5 |
| (New) BSC ID | 2 |
| (New) Base ID | 4 |
| <Total Octets In MSG> | 25 |

The MS can send more than one CT-OHR message without waiting for earlier ones to complete. The BS will send each one on to the BSC in the form of an Originating Handover message. The BSC will send a BSSMAP Handover Required message for the first request and will then batch the rest of the requests (if any) into a single additional BSSMAP Handover Required message, relying upon the Remaining Base Count field to determine when it has received all remaining messages from the BS (and MS). It is the MS's responsibility to manage the Remaining Base Count field correctly.

Originating Handover Complete [BS <== BSC]

The Originating Handover Complete N_Notes_RMT message shall be issued from the terminating BS to the terminating Network Application when a MS has completed its transfer of its bearer traffic from the originating BS to the terminating BS. This happens when the MS issues a Originating Handover Complete control traffic message to the terminating BS.

| Information Element | Length in Octets |
|---|---|
| Protocol | 1 |
| System Type | 1 |
| Message Type | 1 |
| PID (HRef) | 9 |
| CI | 1 |
| PID (Real) | 9 |
| <Total Octets In MSG> | 22 |

Page [BS <== BSC]

The Page N_Notes_RMT message shall be sent to the BS from the Network Application to notify the BS of an incoming call. The BS should initiate a Specific Poll sequence for the MS named by the PID. When the MS responds to the Specific Poll, the BS should send an Alerting N_Notes_RMT message back to the Network Application.

| Information Element | Length in Octets |
|---|---|
| Protocol | 1 |
| System Type | 1 |
| Message Type | 1 |
| PID | 9 |
| CI | 1 |
| TCID | 1 |
| <Total Octets In MSG> | 14 |

Page Response [BS <== BSC]

The Page Response N_Notes_RMT message shall be sent from the BS to the Network Application as soon as specific poll response, which is the result of a Setup N_Notes_RMT message initiated specific poll, is received from the MS named by the PID. This notification can be used by the Network Application to indicate a successful attempt to find a specific MS. If the Network Application has sent a Setup N_Notes_RMT message to the BS, the Network Application may infer that the given MS is not currently reachable through this BS. If desired, this information may be used by the Network Application to signal the caller that the MS is unavailable as opposed to busy or just not answering. Being unavailable should trigger a Deregistration sequence.

| Information Element | Length in Octets |
|---|---|
| Protocol | 1 |
| System Type | 1 |
| Message Type | 1 |
| PID | 9 |
| CI | 1 |
| TCID | 1 |
| Cipher Key Sequence # | 1 |
| Class | 2 |
| <Total Octets In MSG> | 17 |

Register [BS <== BSC]

The Register N_Notes_RMT message shall be sent to the Network Application from the BS as a result of the completion of an acquire and registration poll and control traffic sequence between the MS and the BS. This message requests that resources needed to access the network be allocated in the Network Application for this MS. If these resources have already been allocated, then the Network Application should not allocate new resources. In any event, the Network Application should reply with a Registration Result N_Notes_RMT message.

| Information Element | Length in Octets |
|---|---|
| Protocol | 1 |
| System Type | 1 |
| Message Type | 1 |
| PID | 9 |
| CI | 1 |
| Registration Type | 1 |
| Registration Info | 16 |
| Cipher Key Sequence # | 1 |
| Class | 2 |
| <Total Octets In MSG> | 33 |

Registration Result [BS <== BSC]

The Registration Result N_Notes_RMT message shall be sent to the BS from the Network Application when the higher order network infrastructure responds to the MS's Register request.

| Information Element | Length in Octets |
|---|---|
| Protocol | 1 |
| System Type | 1 |
| Message Type | 1 |
| PID | 9 |
| CI | 1 |
| Follow on Proceed | 1 |
| Registration Result Code | 1 |
| Cause | 1 |
| <Total Octets In MSG> | 16 |

Release Link [BS <== BSC]

The N_Notes_RMT_Release Link message shall be sent by either the BS or the Network Application to indicate that the sender wishes to release the link. If the TCID is non-zero, the Release Link is for a virtual circuit and the request is ignored. If the TCID is zero, a Release Link Complete message is always sent (even if recipient doesn't recognize the PID).

If the BS receives a Release Link message from the BSC while it is in the process of sending a Transport Note over the link, it will complete the transmission of the Transport Note to the MS before releasing the OTA portion of the link.

| Information Element | Length in Octets |
|---|---|
| Protocol | 1 |
| System Type | 1 |
| Message Type | 1 |
| PID | 9 |
| CI | 1 |
| TCID | 1 |
| Causes | 1 |
| <Total Octets In MSG> | 15 |

Release Link Complete [BS <== BSC]

The N_Notes_RMT_Release Link Complete message shall be sent by either the BS or the Network Application to indicate that the sender has released the channel and the TCID.

| Information Element | Length in Octets |
|---|---|
| Protocol | 1 |
| System Type | 1 |
| Message Type | 1 |
| PID | 9 |
| CI | 1 |
| TCID | 1 |
| <Total Octets In MSG> | 14 |

Service Information [BS <== BSC]

The Service Information N_Notes_RMT message shall be sent from the BS to the Network Application. This message informs the Network Application of the bearer channels that have been assigned by the BS for this call.

| Information Element | Length in Octets |
|---|---|
| Protocol | 1 |
| System Type | 1 |

-continued

| Information Element | Length in Octets |
|---|---|
| Message Type | 1 |
| PID | 9 |
| CI | 1 |
| Backhaul Map Type | 1 |
| Backhaul Map | 4 |
| (OTA) Channel Rate | 1 |
| Cause | 1 |
| <Total Octets In MSG> | 20 |

Service Request [BS <== BSC]

The Service Request N_Notes_RMT message shall be sent to the Network Application by the BS upon the completion of CT-SRQ control traffic exchange. Failure to respond will result in dropping the connection between the BS and MS. The Service Request is only used to establish the circuit initially. Subsequent Service Requests during the call will be carried in Transport Notes.

| Information Element | Length in Octets |
|---|---|
| Protocol | 1 |
| System Type | 1 |
| Message Type | 1 |
| PID | 9 |
| CI | 1 |
| TCID | 1 |
| Resource Request Data | 2 |
| Network Service Request Data | 16 |
| <Total Octets In MSG> | 32 |

Service Response [BS <== BSC]

The Service Response N_Notes_RMT message shall be sent to the BS by the Network Application to notify the BS of the results of the BS's Service Request message.

The Service Response is only used during initial request to establish the circuit. Subsequent Service Responses during the call will be carried in Transport Notes.

| Information Element | Length in Octets |
|---|---|
| Protocol | 1 |
| System Type | 1 |
| Message Type | 1 |
| PID | 9 |
| CI | 1 |
| TCID | 1 |
| Network Service Response | 3 |
| Cause | 1 |
| <Total Octets In MSG> | 18 |

Set Cipher Mode [BS <== BSC]

The Set Cipher Mode N_Notes_RMT message shall be sent from the Network Application to the BS. It requests the BS to set the mode key and key sequence of its encryption equipment. The BS does not enable its encryption equipment at this time.

| Information Element | Length in Octets |
|---|---|
| Protocol | 1 |
| System Type | 1 |
| Message Type | 1 |
| PID | 9 |
| CI | 1 |
| Cipher Algorithm ID | 1 |
| Cipher Key | 8 |
| Request PID Type | 1 |
| <Total Octets In MSG> | 23 |

Set Link [BS <== BSC]

The Set Link N_Notes_RMT message shall be sent to the BS from the Network Application to notify the BS of an Assignment Request message from the network. Note that the Set Link message may be used to change either the Resource Request Data or the Transport Method used by the TRAU independently. The BS needs to determine which of the information elements is being changed and only act upon the changed elements.

| Information Element | Length in Octets |
|---|---|
| Protocol | 1 |
| System Type | 1 |
| Message Type | 1 |
| PID | 9 |
| CI | 1 |
| TCID | 1 |
| Resource Request Data | 2 |
| Connection Number | 3 |
| Transport Method | 4 |
| <Total Octets In MSG> | 23 |

Terminating Handover [BS <== BSC]

The Terminating Handover N_Notes_RMT message shall be sent from the BS to the Network Application after an MS has acquired a BS channel (time slot) on the Terminating BS and has completed the Terminating Handover Request Control Traffic sequence. This message contains the PID of the MS, as well as the Zone. BSC ID, Base ID and Connection Number of the BS and BSC which had been previously carrying the connection. This information is used by the Network Application to establish a bearer connection to the previous connection and to inform the old BS to release its connection and the resources allocated to this MS. Within a reasonable amount of time, the Network Application should respond to the BS with a Connection Complete N_Notes_RMT message signifying that this BS is now connected to the previous connection and to inform the old BS to release its connection and the resources allocated to this MS. Within a reasonable amount of time, the Network Application should respond to the BS with a Connection Complete N_Notes_RMT message signifying that this BS is now connected to the prior bearer channel.

| Information Element | Length in Octets |
|---|---|
| Protocol | 1 |
| System Type | 1 |

-continued

| Information Element | Length in Octets |
|---|---|
| Message Type | 1 |
| PID | 9 |
| CI | 1 |
| (Old) Zone | 5 |
| (Old) BSC ID | 2 |
| Connection Number | 3 |
| (New) Backhaul Map Type | 1 |
| (New) Backhaul Map | 4 |
| <Total Octets In MSG> | 32 |

Terminating Handover Complete [BS <== BSC]

The Terminating Handover Complete N_Notes_RMT message shall be issued from the terminating BS to the terminating Network Application when a MS has completed its transfer of its bearer traffic from the originating BS to the terminating BS. This happens when the MS issues a Terminating Handover Complete control traffic message to the terminating BS.

| Information Element | Length in Octets |
|---|---|
| Protocol | 1 |
| System Type | 1 |
| Message Type | 1 |
| PID | 9 |
| CI | 1 |
| <Total Octets In MSG> | 13 |

Transport [BS <=> BSC]

Transport Notes are sent between the BS to the Network Application to move application specific signaling data between the MS Application and the Network Application. The contents of the TC Data field are determined by the end-point applications—in general they will be the complete Layer 3 messages including the headers.

| Information Element | Length in Octets |
|---|---|
| Protocol | 1 |
| System Type | 1 |
| Message Type | 1 |
| PID | 9 |
| CI | 1 |
| TCID | 1 |
| Channel Preference | 1 |
| TC Data Length | 2 |
| TC Data | <variable> |
| <Total Octets In MSG> | 17 |

Transport Delivered [BS <== BSC]

The Transport Delivered Note is sent from the BS to the Network Application to signal the Network Application that all segments of the Transport Note have been delivered send signaling data to the Network Application.

The Transport Delivered Note is triggered by an ACK (successful ARQ) of the final segment (CT-TRA) of the Transport Note over the O-Interface. It does not imply delivery of the Transport Note to the ultimate receiver, it simply confirms that the entire Transport Note has been delivered over the O-Interface.

The Transport Delivered Note provides the BSC with confirmation that the Transport Note has actually been delivered over the radio link. If it doesn't receive this confirmation (e.g., because of the handover) it will re-send the message. This mitigates the problem of only getting part of a Transport Note over the air before a handover occurs. Note that while the BSC can not send another Transport Note for a given TCID during the interval while it is waiting for the Transport Delivered on the last Transport Note to that TCID, it may send another N_Notes or a Transport Note to a different TCID.

| Information Element | Length in Octets |
|---|---|
| Protocol | 1 |
| System Type | 1 |
| Message Type | 1 |
| PID | 9 |
| CI | 1 |
| TCID | 1 |
| Cause | 1 |
| <Total Octets In MSG> | 15 |

Update ID [BS <== BSC]

The Update ID N_Notes_RMT message shall be sent to the BS from the Network Application to notify the BS to update the identity of the MS described by the PID Information element. The PID information element may represent a temporary identification for the MS as provided for in the definition of the New PID.

| Information Element | Length in Octets |
|---|---|
| Protocol | 1 |
| System Type | 1 |
| Message Type | 1 |
| PID | 9 |
| CI | 1 |
| (New) PID | 9 |
| Zone | 5 |
| <Total Octets In MSG> | 27 |

I-Interface

The I-Interface 615, FIG. 6, is the Internal link between the BS OTA Processor and the BS Line Card Processor. It utilizes Dual Port RAM as its physical line.

I-Interface Layer One

Both I-Interface Layer One, Physical Layer 426, Data Link Layer 424, and Layer Two are implementation dependent. The only requirements are that the I_Notes are delivered to the recipient (the OTA or the PAL, as appropriate) in the sequence presented by the sender and in the format described herein.

I-Interface Layer Two

See I-Interface Layer One Description above

I-Interface Layer Three: I_Notes_RMT Protocol

For Notes_RMT messaging, the I_Notes_RMT Protocol is identical to the N_Notes_RMT Information Elements Used In OMNI_Notes_RMT Protocols This section describes the Information Elements which are used by the Notes Protocol on the O, M, N and I Interfaces. After the name of each IE there appear one or more letters in brackets—these letters describe which Interfaces the IE is transported over.

Unless explicitly stated otherwise for a given Information Element, the low order bit of each Information Element value is located in Bit 1 Octet 1; the high order bit of the value is located in Bit 8 of the last Octet in the information element.

ACK'ed Command [O,M]

The ACK'ed Command information element contains the Type of the specific command being acknowledged. The values are the same as the Message Type on the given interface.

| 8 | 7 | 6 | 5 | 4 | 3 | 2 | 1 | Octets |
|---|---|---|---|---|---|---|---|---|
| ACK'ed Command ||||||||  1 |

ACK Response [O,M]

The ACK Response information element contains the acknowledgment response.

| 8 | 7 | 6 | 5 | 4 | 3 | 2 | 1 | Octets |
|---|---|---|---|---|---|---|---|---|
| ACK Response ||||||||  1 |

ACK Response

| | |
|---|---|
| 0 | Successful acknowledge |
| 1 | Unsuccessful acknowledge (NAK) |
| 2–255 | Reserved |

Assist Data [O,M,N,I]

The Assist Data element is a 144 bit field that is used by the sender to pass information to the receiver. This information may or may not have been solicited by an Assist Request. The format and meaning of the Assist Information is dependent upon the Assist Type and is:

| 8 | 7 | 6 | 5 | 4 | 3 | 2 | 1 | Octets |
|---|---|---|---|---|---|---|---|---|
| 144 bit Assist Data |||||||| 1 |
| |||||||| 2 |
| . |||||||| 3 |
| . |||||||| 4 |
| . |||||||| • |
| . |||||||| • |
| . |||||||| • |
| |||||||| 18 |

Assist Request Info [O,M,N,I]

The Assist Request Info element is a 144 bit field that is used by the sender of an Assist Request to provide additional information identifying the request. The most likely use of this element will be to provide a PID when requesting information about a specific MS. This information element also contains the identity of the requester so that the requester can be named as the recipient of the Assist Information message which results from this request. The format and meaning of the Assist Request Info is dependent upon the Assist Type.

| 8 | 7 | 6 | 5 | 4 | 3 | 2 | 1 | Octets |
|---|---|---|---|---|---|---|---|---|
| Assist Requester | 141 bits Assist Request Info ||||||| 1 |
| |||||||| 2 |
| . |||||||| 3 |
| . |||||||| 4 |
| |||||||| • |
| . |||||||| • |
| . |||||||| • |
| |||||||| 18 |

Assist Requester

Same values and meanings as the Assist Msg Recipient subfield of the Assist Type information element.

Assist Type [O,M,N,I]

The Assist Type is divided into two subfields,

| 8 | 7 | 6 | 5 | 4 | 3 | 2 | 1 | Octets |
|---|---|---|---|---|---|---|---|---|
| Assist Msg Recipient ||| Assist Item ||||| 1 |

Assist Item

Identifies the Information being Requested or Provided.

| Assist Type | Information Source | Item |
|---|---|---|
| 0 | — | Reserved |
| 1 | BS-OTA | Surrounding Base Table |
| 2 | BS-OTA | Surrounding Base Table (Continuation) |
| 3 | BS-OTA | Recommend Time Slot Interchange |
| 4 | BS-OTA | Recommend Handover |
| 5 | BS-OTA | Date & Time |
| 6 | BS-OTA | OTA Map |
| 7 | BS-OTA | Backhaul Map |
| 8 | BS-OTA | Distance form BS to BS |
| 9 | BSC | Date & Time |
| 10 | BSC | Code-Frequency Redefinition |
| 11–31 | — | Reserved |

Assist Msg Recipient

Identifies the recipient of the assist message.

If the message is an Assist Request message, then the Information Source (i.e., the process which provides the information).

If the message is an Assist Information message, then the recipient is the Information Destination (i.e., the process which may use the information). If the Assist Information message was requested, the Assist Message Recipient will be the Assist Requester subfield of the Assist Request Info Information element of the Assist Request message. It is presumed that if the Assist Information message is unsolicited, the sender will be able to supply the Assist Message Recipient independently.

The following recipients are defined:

| | |
|---|---|
| 0 | MS-PAL |
| 1 | MS-OTA |
| 2 | BS-OTA |

-continued

| | |
|---|---|
| 3 | BS-Line Card |
| 4 | BSC |
| 5–7 | Reserved |

B(Bearer) Channel [O]
Asymmetric Bandwidth
High Bandwidth Bearer Data
Data transmitted via this mode may suffer temporal distortion but will be correctly delivered with no undetected lost or duplicated packets to the limits of the FCW algorithm.

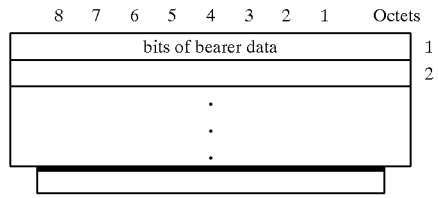

Low Bandwidth Bearer Data
Data transmitted via this mode may suffer temporal distortion but will be correctly delivered with no undetected lost or duplicated packets to the limits of the FCW algorithm.

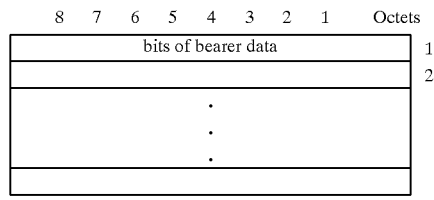

Symmetric Bandwidth Bearer Data
The Symmetric Bandwidth Bearer Data Element consists of 192 bits of user data. The low order bit of the 192 bit number resides in Bit 1 Octet 1 while the high order bit of the 192 bit number resides in Bit 8 of Octet 24. Data transmitted via this mode may suffer temporal distortion but will be correctly delivered with no undetected lost or duplicated packets to the limits of the FCW algorithm.

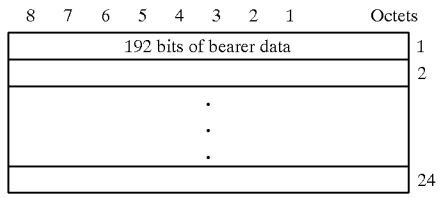

Backhaul Map [N,I]
The Backhaul Map information element details the allocation of backhaul channels on the backhaul link between the BS and the BSC. There are two types of Backhaul Maps. The first is the Superframe Backhaul Map, which consists of a bit map showing the specific backhaul channels assigned to the MS represented by the Personal ID associated with the N_Notes_RMT message in which the Backhaul Map appears. The second type is the Subframe Backhaul Map, which identifies a single backhaul channel and the submultiplexing rate to be applied to the channel.

Backhaul Map: Superframe
When the Backhaul Map Type is Superframe the interpretation of the Superframe Map requires clarification.

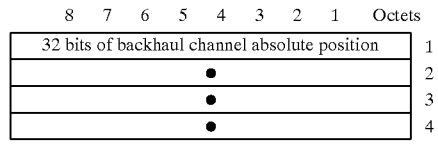

Backhaul Map: Subframe
When the Backhaul Map Type is Subframe

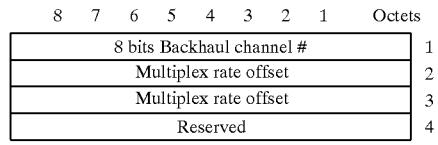

The Multiplex Rate defines the number of frames to be skipped between frames used in the given channel. Multiplex Rate Offset specifies the relative frame position to be skipped between the current frame and the first frame of channel to be used. Zero indicates transmission in the next frame. The interpretation of the Subframe Map requires clarification.

Backhaul Map [N,I]
The Map Type information element shall be used to define the type of Backhaul Map that follows. There are two types of Backhaul Maps: Superframe and Subframe. Superframe maps detail the assignment of one or more complete 9.6 kbps backhaul channels in the BS to BSC backhaul link to a single call. Subframe maps described the submultiplexing characteristics of a less than 9.6 kbps rate circuit onto a single 9.6 kbps backhaul channel.

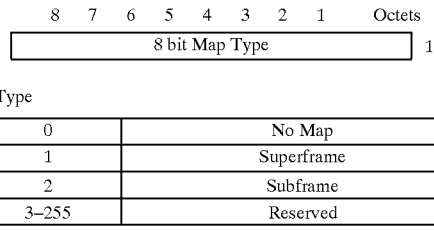

If Backhaul Type indicates No Map, then the Backhaul Map should be zero.
Bandwidth [M]
Base ID [O,M,N,I]
The Base Identifier, in conjunction with the PLMN, uniquely identifies the specific BS. The Base ID Information Element serves to identify the BS to both the MS and to the Network. Since each has different requirements for the BS ID, the BS ID is partitioned as shown below:

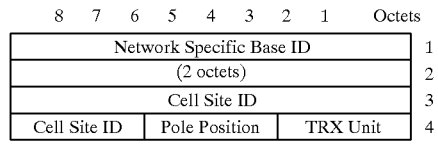

Base ID: Network Specific Base ID
The Network Specific Base ID Field consists of two bytes defined by the Network. For DCS1900, this Field is the GSM Cell Identifier; it uniquely identifies an individual TRX unit. The MS needs to be able to identify the two TRX units within a Base Station and to determine when two Base Stations are at the same physical location ("on the same pole").

Base ID: Cell Site ID

The Cell Site ID Field consists of 10 bits which are used to identify a particular physical cell site within the Zone. (e.g., a particular "light pole".)

| Value | Meaning |
|-------|---------|
| 0 | Cell Site ID |
| 1 | Cell Site ID |
| ... | ... |
| 1023 | Cell Site ID |

Base ID: Pole Position

The Pole Position Field consists of 4 bits which are used to identify a particular Base Station with the Cell. It is used to distinguish between different Base Stations at the same Cell Site (e.g., "on the pole").

| Value | Meaning |
|-------|---------|
| 0 | Pole Position ID |
| 1 | ... |
| ... | ... |
| 15 | ... |

Base ID: TRX Unit

The TRX Unit Field consists of 2 bits which are used to identify a particular TRX Unit within the Base Station.

| Value | Meaning |
|-------|---------|
| 0 | Reserved (for 'Either TRX Unit') |
| 1 | TRX Unit 1 |
| 1 | TRX Unit 2 |
| 3 | Reserved (for 'both TRX Units') |

For DCS1900, only values 2 and 2 are meaningful. Values 0 and 3 are unused.

Base Status [N,I]

The Base Status information element shall be comprised of 32 octets.

| 1 8 | 7 | 6 | 5 | 4 | 3 | 2 | 1 | Octets |
|---|---|---|---|---|---|---|---|---|
| 32 octets of Base Status |||||||| 1 |
|  |||||||| 2 |
| • |||||||||
| • |||||||||
| • |||||||||
|  |||||||| 32 |

Broadcast ID [O]

The Broadcast ID information element is used to identify specific broadcast data streams. The ID is assigned to the specific broadcast stream on a connection basis. It is the responsibility of the broadcast Network Application to provide periodic application broadcast heading information.

The Broadcast ID is assigned at the start of a connection and released to the Broadcast ID pool at the termination of the connection.

| 8 | 7 | 6 | 5 | 4 | 3 | 2 | 1 | Octets |
|---|---|---|---|---|---|---|---|---|
| 8 bits of Broadcast ID |||||||| 1 |

BS Capabilities [O,M]

The BS Capabilities information element describes the services being offered by the BS. The internal format of this element is shown below. (It was originally derived from [5].)

| 8 | 7 | 6 | 5 | 4 | 3 | 2 | 1 | Octets |
|---|---|---|---|---|---|---|---|---|
| Base Features |||||||| 1 |
| Base Features |||||||| 2 |
| Base Features |||| Access Class |||| 3 |
| Leveling Bits |||||||| 4 |

1BS Capabilities: Base Features

The Base Features subfield is 20 bits in length. These bits are used to provide the MS information about the base and correspond to various base capabilities or features. Features such as ethernet access, aggregate data capability, enhanced voice, etc. are selected here. The particular features depend upon the networks which the BS supports.

BS Capabilities: Base Features for DCS1900 Systems

| 8 | 7 | 6 | 5 | 4 | 3 | 2 | 1 | Octets |
|---|---|---|---|---|---|---|---|---|
| Base Features |||||||| 1 |
| Base Features |||||||| 2 |
| Base Features |||| |||| 3 |

1 Bit: This bit, if set to 1, indicates that the BSC which services this BS is capable of Inter-BSC Terminating Handovers.

1 Bit: More Slots (OTA) than Channels (Backhaul)

All bits not explicitly defined are reserved.

BS Capabilities: Access Class

Integral value from 0 through 15 which designates the lowest class allowed access to the base. That is, if the MS were provisioned with an access class of 3, it would be allowed to register with base stations that broadcast an access class of 3 or lower. This subfield is active only if the CU field in the Header specifies that Class Control is in effect.

| Value | Access Allowed to |
|-------|-------------------|
| 15 | Test Mobiles only |
| 14 | 911 calls only |
| 13 | Reserved |
| 12 | Reserved |
| 11 | Reserved |
| 10 | Mobiles with Access Class 10 |
| 9 | Mobiles with Access Class 9 or 10 |
| 1 | Mobiles with Access Class 1, 2, . . . 10 |
| 0 | All Mobiles |

BS Capabilities: Leveling Bits 8 bits, set by the base station to level out the number of mobile stations registering or using a base. A mobile station would be allowed to access a base station if the leveling bit of the mobile station was set in this field. The leveling bit number will be selected by taking the modulo 8 of the MS's Permanent PID. If the corresponding bit in the base station leveling field were set then the MS would be allowed access, otherwise, the MS would have to access another BS. This subfield is active only if the CU field in the Header specifies that Class Control is in effect.

BS Information [M]

The BS Information Element is a collection of Information Elements which give details associated with a BS. It exists for notational convenience because of its frequent occurrence in lists.

```
      Bits                        Octets
8  7  6  5  4  3  2  1  0
|       Zone [5 Octets]        |    1
|                              |    2
|                              |    3
|                              |    4
|                              |    5
|       BSC ID [2 Octets]      |    6
|                              |    7
|       Base ID [4 Octets]     |    8
|                              |    9
|                              |   10
|                              |   11
|    BS Capabilities [4 Octets]|   12
|                              |   13
|                              |   14
|                              |   15
```

BSC ID [O,M]

The BSC identifier, in conjunction with the PLMN, uniquely identifies the specific BSC. The low order bit of the 16 bit number is located in Bit 1 Octet 1. The high order bit of the 16 bit number is located in Bit 8 of Octet 2.

```
8  7  6  5  4  3  2  1   Octets
| 16 bits of unique BSC identification |  1
|                                      |  2
```

Cause [O,M,N,I]

The Cause information element consists of 8 bits identifying the cause for, or the result of, a specific action. The particular meanings of Cause's values are determined by the message in which the Cause information element appears.

```
8  7  6  5  4  3  2  1   Octets
|     8 bits of Cause information      |  1
```

Cause: Service Info

This Cause information element in the Service Info message is unique in that it is divided into two subfields to carry results for both the MS and the BS.

```
8  7  6  5  4  3  2  1   Octets
|    MS Cause    |    BS Cause    |  1
```

The meanings of each subfield are:

| Value | Meaning |
|---|---|
| 0 | Success |
| 1 | Failure |
| 2–15 | Reserved |

Cause: Handover Indication

The Cause information element in the Handover Indication message is unique in that it is a logically-ored bit mask of one or more of the values shown in the table below.

| Value (hex) | Description |
|---|---|
| 01 | ARQ Retries Exhausted |
| 01 | Bit Error Rate (BER) Exceeded |
| 04 | RSSI Below Threshold |
| 08 | Initiated by BS |

Cause: General Values

The following table shows the cause values that are used in all messages except those identified above as being unique.

| Value | Cause | Valid Messages for This Cause |
|---|---|---|
| 0 | Success/True/Pass/Good | CT-ACK, CT-CNC, CT-RCP, CT-SRS, CT-STL, ID Updated, Initialize_Conf, Mode_Ind, Register_Cnf, Registration Result, Service Information, Service Response, Service_Response_Ind, Setup Link, Transport_Cnf, Transport Delivered |
| 1 | Failure/False/Fall/Bad | CT-CNC, CT-STL, ID Updated, Initialize_Cnf, Mode_Ind, Setup Link, Transport_Cnf, Transport Delivered |
| 2 | MS Rejected | CT-RCP, CT-SRS, Register_Cnf, Registration Result, Service Response, Service_Response_Ind |
| 3 | PLMN Not Allowed (i.e., don't try any cells with same MCC, MNC) | CT-RCP, CT-SRS, Register_Cnf, Registration Result, Service Response, Service_Response_Ind |
| 4 | LAI Not Allowed (i.e., don't try any cells with the same LAI) | CT-RCP, CT-SRS, Register_Cnf, Registration Result, Service Response, Service_Reasonse_Ind |
| 5 | Network Failure | CT-RCP, CT-SRS, Register_Cnf, Registration Result, Service Response, Service_Response_Ind |
| 6 | Other Error | CT-ACK, CT-RCP, CT-SRS, Error_Ind, Error Indication, Register_Cnf, Registration Result, Service Response, Service_Response_Ind |
| 7–9 | Reserved | |

-continued

| Value | Cause | Valid Messages for This Cause |
|---|---|---|
| 10 | Success, Cipher | Cipher Response, Handover Request ACK |
| 11 | Success, Clear Mask | Cipher Response, Handover Request ACK |
| 12 | BS Reject Cipher | Cipher Response |
| 13 | MS Reject Cipher | Cipher Response |
| 14 | Cipher Failure: No Resources | Handover Request ACK |
| 15 | Cipher Failure: Algorithm Not Supported | Handover Request ACK |
| 16 | Set or Change Cipher | CT-CIP, Cipher_Mode_Ind |
| 17 | Synchronize Cipher | CT-CIP, Cipher_Mode_Ind |
| 18 | Circuit Switch Refused | CT-ACK (only if CT-ACK is in response to a CT-CSC) |
| 19 | Insufficient Resources | CT-ACK (only if CT-ACK is in response to a CT-CNC, CT-STL or CT-THR), Service Information |
| 20 | SRQ Being Queried | CT-ACK (only if CT-ACK is in response to a CT-SRQ) |
| 21 | Release by MS | CT-DRG, Deregister, Deregister_Cnf, Deregister_Req |
| 22 | SIM Removed | CT-DRG, Deregister, Deregister_Cnf, Deregister_Req |
| 23 | PLMN Change | CT-DRG, Deregister, Deregister_Cnf, Deregister_Req |
| 24 | Handover Refused by Originating BS | CT-HOF, Handover Failed |
| 25 | Handover Refused by Terminating BS | CT-HOF, Handover Failed |
| 26 | Handover Refused by Originating BSC | CT-HOF, Handover Failed |
| 27 | Handover Refused by Terminating BSC | CT-HOF, Handover Failed |
| 28 | THR Failed, OHR Suggested | CT-HOF, Handover Failed |
| 29 | Handover Failed: Invalid HRef | CT-HOF, Handover Failed |
| 30 | Link Released by BS (Link Lost) | CT-REL, Release_Cnf, Release_Ind, Release Link, Release Request |
| 31 | Link Released by MS | CT-REL, Release_Cnf, Release_Ind, Release Link, Release Request |
| 32 | Link Released by BS (Link Lost) | CT-REL, Release_Cnf, Release_Ind, Release Link, Release Request, OTA_Failure_Ind |
| 33 | Link Released by BS During Handover (e.g., Circuit Switch Complete) | CT-REL, Release Link, Release Request (This cause value is not legal in M_Notes Release_Cnf or Release_Ind) |
| 34 | Link Failure | OTA_Failure_Ind |
| 35–39 | Reserved | |
| 40 | Unknown Message Type | CT-ACK, Error_Ind, Error Indication |
| 41 | Unknown Link ID | CT-ACK, Error_Ind, Error Indication |
| 42 | Unknown TCID | CT-ACK, Error_Ind, Error Indication |
| 43 | Message Out of Sequence | CT-ACK, Error_Ind, Error Indication |
| 44 | Invalid Value For Information Element | CT-ACK, Error_Ind, Error Indication |
| 45 | Power On | Initialize_Req |
| 46 | Reset | Initialize_Req |
| 47 | Power Down | CT-DRG, Deregister, Deregister_Cnf, Deregister_Req, Shutdown_Cnf, Shutdown_Req |
| 48 | Power Failure | Shutdown_Cnf, Shutdown_Req |
| | New Cell Detected | New_Cell_Ind |
| 50 | Handover Indication | New_Cell_Ind |
| 51 | BS Registration | New_Cell_Ind |
| 52–255 | Reserved | |

Cause: DCS1900 Systems

For DCS1900, the mapping of GSM Causes to Omnipoint Causes is given in the following tables. This translation is for CT-RCP, CT-SRS, Register_Cnf, Registration Result, Service Response.

| Omnipoint Value | GSM Value | Meaning |
|---|---|---|
| 0 | 0 | Success |
| 2 | 2 | IMSI unknown in HLR |
| 2 | 3 | Illegal MS |
| | 8/27/1996 | |
| 2 | 4 | IMSI unknown in VLR |
| 2 | 5 | IMEI not accepted |
| 2 | 6 | Illegal ME |
| 3 | 11 | PLMN not allowed |

-continued

| Omnipoint Value | GSM Value | Meaning |
|---|---|---|
| 4 | | LAI not allowed |
| 4 | 13 | National Roaming not allowed In this LAI |
| 5 | 17 | Network Failure |
| 5 | 22 | Congestion |
| 6 | 32 | Service option not supported |
| 6 | 33 | Requested service option not subscribed |
| 6 | 34 | Service option temporarily out of order |
| 6 | 38 | Call cannot be identified |
| | 95 | Semantically incorrect message |
| 6 | 96 | Invalid mandatory information |
| 6 | 97 | Message type non-existent not implemented |
| 6 | 98 | Message not compatible with protocol state |
| 6 | 99 | Information element non-existent or not implemented |

-continued

| Omnipoint Value | GSM Value | Meaning |
|---|---|---|
| 6 | 100 | Conditional IE error |
| 6 | 101 | Message not compatible with protocol state |
| 6 | 111 | Protocol error, unspecified |

Channel Preference [M.N.I]

The Channel Preference information element indicates the sender's preference for which channel—B or D—is used over the O Interface to transport the data contained in the message.

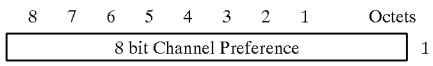

| Value | Meaning |
|---|---|
| 0 | B Channel Preempt: Use existing circuit; do not attempt to acquire Separate Signaling Slot. |
| 1 | B Channel Required: Importance relatively high: use Separate Signaling Slot if available, otherwise preempt B Channel. |
| 2 | B Channel Preferred: Moderate Importance: use Separate Signaling Slot if available, otherwise use D Channel |
| 3 | D Channel Preferred: Importance relatively low; use D Channel if B Channel is not available. |
| 4–255 | Reserved |

There is no purpose to having a D Channel Required value—it would be useful in the case where the B Channel was available and the application wanted the OTA to use the D Channel anyway. Such a request would be ignored byte OTA to conserve bandwidth (pushing a Transport Note through the D Channel at a rate of one byte per frame while wasting the 19 bytes available in the B channel—it could take up to 5 seconds to get the Transport Note through this way—is just too wasteful of resources).

Channel Preference: DCS1900 Systems

For DCS1900 Systems, the following mapping will suffice—a more sophisticated mapping would probably select some messages with TCID 0 which could be assigned a preference of D Channel Preferred. E.g., Start/Stop DTMF, Advice of Charge, etc.:

| TCID | Channel Preference | Comments |
|---|---|---|
| 0 | 1 | B Channel required for CC, MM and SS Transport |
| 3 | 3 | D Channel preferred for SMS Transport |

Channel Rate

The Channel Rate information element appears both as a 4-bit field in the Resource Request Data information element and as a 1-octet information element in other messages. Only values 0–15 are legal, all higher values are illegal since they will not fit in 4 bits. Only values 0–6 have been defined; the remaining 8 values will be defined when needed from the remaining 14 candidate Channel Rates.

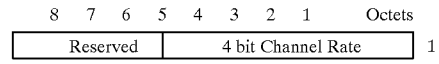

| Value | Channel Rate in Slots/Frame | Equivalent Raw Data Rate (bits/second) |
|---|---|---|
| 0 | 1/32 | 300 |
| 1 | 1/16 | 600 |
| 2 | 1/8 | 1,200 |
| 3 | 1/4 | 2,400 |
| 4 | 1/2 | 4,800 |
| 5 | 1/1 | 9,600 |
| 6 | 2/1 | 19,200 |
| 7–15 | Reserved | |
| Candidate | 3/1 | 28,800 |
| Candidate | 4/1 | 38,400 |
| Candidate | 5/1 | 48,000 |
| Candidate | 6/1 | 57,600 |
| Candidate | 7/1 | 67,200 |
| Candidate | 8/1 | 76,800 |
| Candidate | 9/1 | 86,400 |
| Candidate | 10/1 | 96,000 |
| Candidate | 11/1 | 105,600 |
| Candidate | 12/1 | 115,200 |
| Candidate | 13/1 | 124,800 |
| Candidate | 14/1 | 134,400 |
| Candidate | 15/1 | 144,000 |
| Candidate | 16/1 | 153,600 |
| Candidate | Illegal | Not Applicable |

The Cl occupies the D Channel on all O_Notes except CT-GPO (General Poll) and possibly CT-GPR (General Poll Response). It is used by the MS to identify O_Notes meant for it. This allows the MS to recover from an error during Fast Control Traffic. The management of Cls will be according to the following rules:

The BS will assign a unique Cl to each mobile during slot acquisition. The BS will use a FIFO queue to manage Cls to spread Cl usage over the entire legal range and insure a maximal delay between reuse of a given Cl. Legal Cl values are 1 to 255.

The BS will include the Cl in each Notes_RMT message to the BSC (in those messages which contain a PID).

The BSC will retain the Cl and return it to the BS in all messages containing the same PID (i.e., the PID received with the Cl from the BS). The BSC must always save and use the most recent value of the Cl received from the BS.

In future, there is a possibility that the Cl may change in middle of session (upon entry/exit from Slow Control Traffic). This will only occur if at some future date there is a requirement to simultaneously support a total of more than 255 active mobiles. In theory it is possible to have 15 slots all fully occupied with mobiles communicating once every 25 frames. This is the worst case and will probably never happen, but is provides a theoretical maximum of 15*25= 375 active Mobiles at any one time. Since this exceeds the 255 maximum Cl limit, we must make provision for separate numbering of mobiles in slow control traffic and would need to deassign/reassign Cls on the entry/exit of Slow Control Traffic mode. The implication that this has on the current design is imply that the Cl may not be guaranteed unique over the entire session for a given mobile. In addition to the requirement (above) that the BSC always save and use the most recent value of the Cl received from the BS, it imposes the following additional limitations on the use of Cls as handles to information concerning the MS:

- If the BSC uses the Cl as a handle—which it may as an implementation option—it must verify that the PID in the data record found matches the PID which accompanied the Cl in the Note. If the two PIDs do not match, the BSC must ignore the Cl and use the PID in the note to identify the appropriate data record. This insulates the BSC programming from having to change if Cls ever cease to be unique.
- If the BS ever manages Cls in a fashion that does not guarantee their uniqueness, the BS also must verify that the PID in the date record found matches the PID which accompanied the Cl in the Note. if the two PIDs do not match, the BS must ignore the Cl and use the PID in the Note to identify the appropriate data record.
- The MS must also use the most recent Cl it receives from the BS in a Specific Poll—CT-SPO—which contains its PID.

| 8 7 6 5 4 3 2 1 | Octets |
|---|---|
| 8 bits of Algorithm D | 1 |

Algorithm ID

| | |
|---|---|
| 0 | Transparent (Clear) |
| 1 | A5/1 Algorithm |
| 2 | A5/2 Algorithm |
| 3 | A5/3 Algorithm |
| 4–255 | Reserved |

Cipher Key [N,I]

The Cipher Key information element contains the clear text key to be used to set the key of the BS'S encryption equipment.

| 8 7 6 5 4 3 2 1 | Octets |
|---|---|
| 64 bit Clear Text Cipher Key | 1 |
| | 2 |
| • | |
| • | |
| • | |
| | 8 |

Cipher Key Sequence # [O,M,N,I]

The Key Sequence # information element is used to select a cipher key in both the BS and MS without having to explicitly pass th key over the air. Not all bits of the key sequence # may be significant.

| 8 7 6 5 4 3 2 1 | Octets |
|---|---|
| 8 bit Key Sequence # | 1 |

Cipher Key Sequence #: DCS1900 Protocol
Bits 5–8: Must be zero
Bits 1–4: Are Significant
Default is 'Ofx' in there is no Cipher Key Sequence #.

Circuit Identifier [M]

The Circuit Identifier information element specifies the Circuit associated with a message.

| 8 7 6 5 4 3 2 1 | Octets |
|---|---|
| 8 bits of Circuit Identifier | 1 |

| Value (hex) | Description |
|---|---|
| 00 | Temporary Circuit (OTA used/should use a temporary link) |
| 01–FF | Unique Dedicated Circuit ID |

Class [O,N,I]

The Class information element specifies some of the operational parameters of the particular type of MS being used.

| 8 7 | 6 5 4 3 2 1 | Octets |
|---|---|---|
| Class Type | Class Information | 1 |
| Class Information | | 2 |

| Class Type | |
|---|---|
| 0 | Reserved |
| 1 | DCS1900 Class Type |
| 2 | IS-41 Class Type |
| 3–7 | Reserved |

Revision Level

| | |
|---|---|
| 0 | CCT phase 1 Mobiles |
| 1-3 | Reserved |

A5/1

| | |
|---|---|
| 0 | A5/1 encryption algorithm not available |
| 1 | A5/1 encryption algorithm not available |

A5/[2/3]

| | |
|---|---|
| 0 | A5/[2/3] encryption algorithm not available |
| 1 | A5/[2/3] encryption algorithm not available |

SM

| | |
|---|---|
| 0 | short message capability not present |
| 1 | short message capability present |

SS Screen Indicator

| | |
|---|---|
| 0 | GSM phrase 1 |
| 1 | capable of handling ellipsis notation and phase 2 error handling |
| 2–3 | reserved |

Class Information for IS-41 Class Type

| Bits | | | | | | | | Octets |
|---|---|---|---|---|---|---|---|---|
| 8 | 7 | 6 | 5 | 4 | 3 | 2 | 1 | |
| Not Available | | | | Reserved | | | | 1 |
| H | G | F | E | D | C | B | A | |

-continued
Power Class (PC) octet 1, bits A, B, and E)

| Bits H | G | F | E | D | C | B | A | Value | Meaning |
|---|---|---|---|---|---|---|---|---|---|
| | | | | 0 | | 0 | 0 | - | Class I |
| | | | | 0 | | 0 | 1 | - | Class II |
| | | | | 0 | | 1 | 0 | - | Class III |
| | | | | 0 | | 1 | 1 | - | Class IV |
| | | | | 1 | | 0 | 0 | - | Class V |
| | | | | 1 | | 0 | 1 | - | Class VI |
| | | | | 1 | | 1 | 0 | - | Class VII |
| | | | | 1 | | 1 | 1 | - | Class VIII |

Transmission (TX) (octet 1, bit C)

| Bits H | G | F | E | D | C | B | A | Value | Meaning |
|---|---|---|---|---|---|---|---|---|---|
| | | | | | 0 | | | - | Continuous |
| | | | | | 1 | | | - | Discontinue |

Bandwidth (BW) (octet 1, bit D)

| Bits H | G | F | E | D | C | B | A | Value | Meaning |
|---|---|---|---|---|---|---|---|---|---|
| | | | | 0 | | | | - | 20 MHz |
| | | | | 1 | | | | - | 25 MHz |

Class: Mobile Station Nominal Power Levels

| Mobile Station Power Level (PL) | Mobile Attenuation Code (MAC) | Nominal ERP (dBW) for Mobile Station Power Class | | | | | | | |
|---|---|---|---|---|---|---|---|---|---|
| | | I | II | III | IV | V | VI | VII | VIII |
| 0 | 0000 | 6 | 2 | -2 | -2 | * | * | * | * |
| 1 | 0001 | 2 | 2 | -2 | -2 | * | * | * | * |
| 2 | 0010 | -2 | -2 | -2 | -2 | * | * | * | * |
| 3 | 0011 | -6 | -6 | -6 | -6 | * | * | * | * |
| 4 | 0100 | -10 | -10 | -10 | -10 | * | * | * | * |
| 5 | 0101 | -14 | -14 | -14 | -14 | * | * | * | * |
| 6 | 0110 | -18 | -18 | -18 | -18 | * | * | * | * |
| 7 | 0111 | -22 | -22 | -22 | -22 | * | * | * | * |
| | | Dual Mode Only | | | | | | | |
| 8 | 1000 | -22 | -22 | -22 | -26 +/- 3 dB | * | * | * | * |
| 9 | 1001 | -22 | -22 | -22 | -30 +/- 6 dB | * | * | * | * |
| 10 | 1010 | -22 | -22 | -22 | -34 +/- 9 db | * | * | * | * |

Note: The three lease significant bits of MAC are used in the CMAC/VMAC field. All four bits of MAC are used in the DMAC field.

Connection Number [O,M,N,I]

The Connection Number information element specifies the specific network connection which was allocated to carrying the bearer channel of this MS from the BS to the network. All octets of this information element may not be significant. Unused nibbles and octets must be filled with "F" hex.

The Connection Number in conjunction with the Zone and the BSC ID uniquely identify every possible connection in the world.

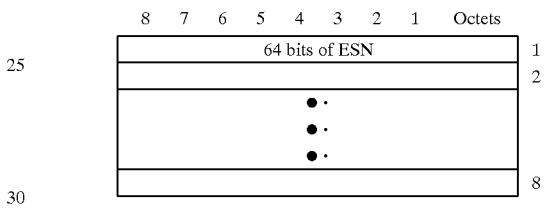

Connection Result [M]

D Channel [O]

The D Channel information element transmits the out of band application channel in a byte serial manner. It is available for this use only when bearer data is being transmitted (i.e., when the Packet Type field in the O_Note Header has a value of 0 (Normal Traffic). During signaling (all other Packet Types) it is used for the Cl (or other special purposes).

ESN [O,M,N,I]

The equipment serial number uniquely identifies the MS.

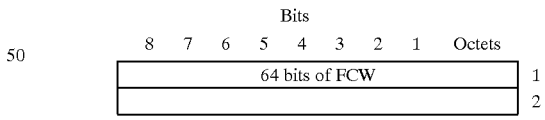

FCW [O]

The Frame Check Word, which checks the content of a packet information element, shall be a 16 bit sequence. It shall be the ones complement of the sum (modulo 2) of:

a) The remainder of $x^k(x^{15}+x^{14}+x^{13}+x^{12}+x^{11}+x^{10}+x^9+x^8+x^7+x^6+x^5+x^4+x^3+x^2+x^1+1)$ divided (modulo 2) by the generator polynomial $x^{16}+x^{12}+x^5+1$, where k is the number of bits in the packet not including the FCW.

b) The remainder of the division (modulo 2) by the generator polynomial $x^{16}+x^{12}+x^5+1$ of the product of $x^{16}$ by the content of the packet existing from and including the first bit of the packet to but not including the first bit of the FCW.

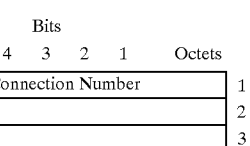

Follow On Proceed [O,M,N,I]

The Follow On Proceed information element contains a single bit of information: either another Network Level Service Request is allowed or it is not.

This information element also appears as a 1 bit field in the Registration Result information element.

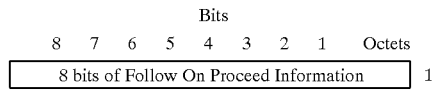

Follow On Proceed: DCS1900 Systems

For DCS1900, the values are:

| Value | Meaning |
|---|---|
| 0 | Follow On Proceed Not Allowed |
| 1 | Follow On Proceed |
| 2–255 | Illegal |

Frame Number [O]

The Frame Number information element is used in ciphering algorithms. Each BS keeps its frame number as a count of the number of frames it has traversed since it was powered up.

The Frame Number always reflects the correct value for the slot in which the CT message containing the Frame Number information element is transmitted and received without error. This means that the sender must recompute the Frame Number whenever it needs to re-send the CT message.

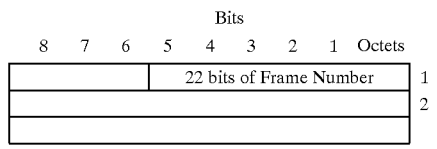

Frame Offset [O]

The Frame Offset information element is the number of slots between the current slot and the beginning of the next frame. This tells the MS when the next frame begins, so it may increment the Frame Number synchronously with the BS while encrypting. This is required to support aggregated data and timeslot interchange in cipher mode.

The Frame Offset always reflects the correct value for the slot in which the CT message containing the Frame Offset information element is transmitted and received without error. This means that the sender must recompute the Frame Offset whenever it needs to re-send the CT message.

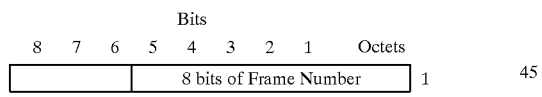

HRef (Handover Reference) [O,N,I]

The HRef (Handover Reference) information element is used to identify a specific handover process that has already been initiated by an Originating Handover Request sequence.

Not all bits are significant.

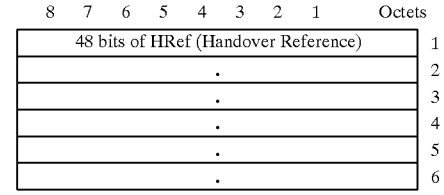

HRef for DCS1900 Systems

In a DCS1900 infrastructure system, the HRef is assigned by the terminating Base Station Controller. Only one octet is significant.

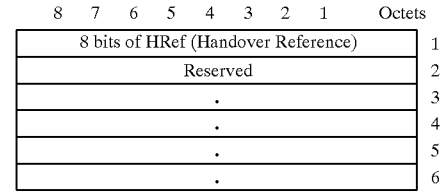

The Identity Data information element contains one of the identifiers of the MS as specified by the associated Identity Type. The precise length and format of the identity Data IE will be determined by the Identity Type. If the length is less than the maximum 9 octets provided for the Identity Data IE, unused space will be at the end of the Identity Data IE (octets 9, 8, . . . ) and all unused bits will be set to zero.

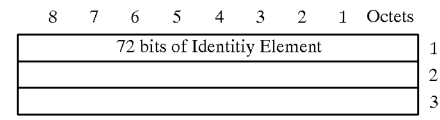

| Value (Hex) | O_Notes (CT-) | M_Notes | N, I_Notes |
|---|---|---|---|
| 00 | Reserved | Reserved | Reserved |
| 01 | ACK: Acknowledge | Error_Ind | Error Indication |
| 02 | ASI: Assist Information | Assist_Information_Cnf | Assist Information |
| 03 | | Assist_Information_Ind | |
| 04 | ASR: Assist Request | Assist_Information_Req | Assist Request |
| 05 | CIP: Set Cipher Mode | Cipher_Mode_Ind | Set Cipher Mode |
| 06 | CNC: Connection Complete | | Connection Complete |
| 07 | CSC: Circuit Switch Complete | | Circuit Switch Complete |
| 08 | | | Circuit Switch Refused |
| 09 | DRG: De-registration Response | Deregister_Req | Deregister |
| 0A | | Deregister_Cnf | |
| 0B | GPR: General Poll | | |

-continued

| Value (Hex) | O_Notes (CT-) | M_Notes | N, I_Notes |
|---|---|---|---|
| | Response | | |
| 0C | HLD: Hold | | |
| 0D | HOF: Handover Failed | | Handover Failed |
| 0E | IRP: Identity Reply | Identity_Request_Rsp | Identity Reply |
| 0F | IRQ: Identity Request | Identity_Request_Ind | Identity Request |
| 10 | OHC: Originating Handover Complete | | Originating Handover Complete |
| 11 | OHR: Originating Handover Request | | Originating Handover |
| 12 | RCP: Register Complete | Register_Cnf | Registration Result |
| 13 | REL: Release Link | Release_Req | Release Link |
| 14 | | Release_Ind | Release Link Complete |
| 15 | | Release_Cnf | |
| 16 | RRQ: Registration Request | Register_Req | Register |
| 17 | PPR: Specific Response | | Page Response |
| 18 | SRQ: Service Request | Service_Req | Service Request |
| 19 | SRS: Service Response | Service_Response_Ind | Service Response |
| 1A | | | Service Information |
| 1B | STL: Set Link | Mode_Ind | Set Link |
| 1C | | Mode_Rsp | |
| 1D | SYN: Synchronize | | |
| 1E | THC: Terminating Handover Complete | | Terminating Handover Complete |
| 1F | THR: Target Handover Request | | Terminating Handover |
| 20 | TSI: Time Slot Interchange | | |
| 21 | UID: Update ID | Identity_Update_Ind | Update ID |
| 22 | | Identity_Update_Resp | ID Updated |
| 23–2F | Reserved | Reserved | Reserved |
| 30 | | Initialize_Cnf | |
| 31 | | Initialize_Req | |
| 32 | | Initialize_Ind | |
| 33 | | Ota_Failure_Ind | |
| 34 | | Search_Cnf | |
| 35 | | Search_Ind | |
| 36 | | Shutdown_Cnf | |
| 37 | | Shutdown_Req | |
| 38 | | Transport_Cnf | Transport Delivered |
| 39 | | Transport_Cnf | |
| 3A–3F | | Reserved | Reserved |
| 40 | | | Base Status Request |
| 41 | | | Base Status Response |
| 42 | CRS: Cipher Response | Cipher_Mode_Rsp | Cipher Response |
| 43 | | | Handover Request |
| 44 | | | Handover Request Reply |
| 45–6F | Reserved | Reserved | Reserved |
| 70 | SPO: Specific Poll | | |
| 71 | PPO: Paging Poll | Service_Ind | Page |
| 72 | GPO: General Poll | | |
| 72–7F | Reserved for future Polling Types | | |
| 80 | TRA: Transport Msg. w. TCID = 0 | Transport_Ind | Transport |
| 81 | TRA: Transport Msg. w. TCID = 1 | Transport_Req | |
| 82–FF | TRA: Transport Msg. w. TCID = 2 – 127 | | |
| 1F | THR: Target Handover Request | | Terminating Handover |
| 20 | TSI: Time Slot Interchange | | |
| 21 | UID: Update ID | Identity_Update_Ind | Update ID |
| 22 | | Identity_Update_Resp | ID Updated |
| 23–2F | Reserved | Reserved | Reserved |
| 30 | | Initialize_Cnf | |
| 31 | | Initialize_Req | |
| 32 | | Initialize_Ind | |
| 33 | | Ota_Failure_Ind | |
| 34 | | Search_Cnf | |
| 35 | | Search_Ind | |
| 36 | | Shutdown_Cnf | |
| 37 | | Shutdown_Req | |
| 38 | | Transport_Cnf | Transport Delivered |
| 39 | | Transport_Cnf | |
| 3A–3F | | Reserved | Reserved |
| 40 | | | Base Status Request |

-continued

| Value (Hex) | O_Notes (CT-) | M_Notes | N, I_Notes |
|---|---|---|---|
| 41 | | | Base Status Response |
| 42 | CRS: Cipher Response | Cipher_Mode_Rsp | Cipher Response |
| 43 | | | Handover Request |
| 44 | | | Handover Request Reply |
| 45–6F | Reserved | Reserved | Reserved |
| 70 | SPO: Specific Poll | | |
| 71 | PPO: Paging Poll | Service_Ind | Page |
| 72 | GPO: General Poll | | |
| 72–7F | Reserved for future Polling Types | | |
| 80 | TRA: Transport Msg. w TCID = 0 | Transport_Ind | Transport |
| 81 | TRA: Transport Msg. w. TCID = 1 | Transport_Req | |
| 82–FF | TRA: Transport Msg. w. TCID = 2 – 127 | | |

Transport Message Types

If the most significant bit of the Message Type is set to 1, the message is a Transport Message. The 7 least significant bits are used to specify the Transport Channel ID with which the data is associated.

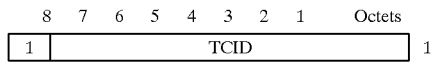

MNC (Mobile Network Code)

The MCC (Mobile Network Code) identifies the network within the country in which the network exists. In combination with the MCC if forms the PLMN and uniquely identifies a given network operator. It never appears as an independent information element in any Note. Test

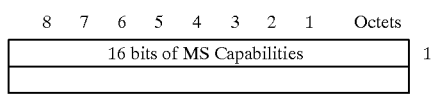

MS Capabilities [O]

The MS Capabilities information element defines the capabilities (features) present in the Mobile Station. For example, whether the MS can receive a FAX or a data connection, whether the MS is capable of ciphering, etc. Precise description of format is

```
8  7  6  5  4  3  2  1     Octets
|     16 bits of MS Capabilities     |  1
|                                    |
```

Network Periodic Control [M]

```
8  7  6  5  4  3  2  1     Octets
|     16 bits of MS Capabilities     |  1
|                                    |
```

Network Periodic Control [M]

The Network Periodic Control information element specifies whether the MS OTA should perform automatic periodic network registration.

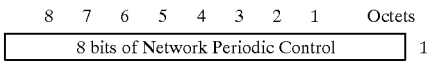

| Value (Hex) | Description |
|---|---|
| 00 | OTA should NOT perform network periodic registration |
| 01 | OTA should perform network periodic registration |
| 02–FF | Reserved |

Network Service Request Data [O,M,N,I]

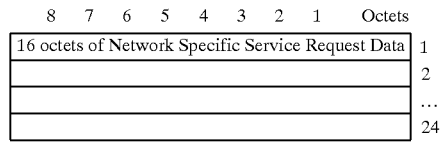

Network Service Request Data for DCS1900 Systems

For DCS1900, this is the CM Service Request.

Network Service Response [O,M,N,I]

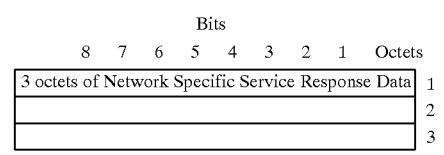

Network Service Response for DCS1900 Systems

For DCS1900, this is the CM Service Accept (octets in first two octets of the element) or the CM Service Reject (3 octets).

OTA Map [O]

The OTA Map information element describes the mapping of the OTA time slots to a particular MS. The format of this element is dependent upon the OTA Map Type information element in the same packet. The OTA Map always reflects the correct values relative to the slot in which the CT message containing the OTA Map information element is transmitted and received without error. This means that the sender must recompute the OTA Map whenever it needs to re-send the CT message.

OTA Map: Superframe Map:

| Bits | Octets |
|---|---|
| 8 7 6 5 4 3 2 1 | |
| 16 bits of slot mapping description | 1 |
|  | 2 |
| 8 bits of Slot Offset | 3 |
| 8 bits reserved | 4 |

Each bit in the superframe mapping description indicates a time slot relative to the current time slot as shown in the following table.

| Octet | Bit | Time Slot |
|---|---|---|
| 1 | 1 | Same time slot, next frame |
| 1 | 2 | This frame, one time slot later |
| 1 | 3 | This frame, two time slots later |
| 2 | 8 | This frame, 15 time slots later |

Slot Offset: The Slot Offset field contains the number of slots between the beginning of the current frame and the position of the slot in which the CT message containing the OTA Map information element is transmitted and received error free. The meanings of Slot Offset's values are shown in the following table:

| Value | Meaning |
|---|---|
| 0 | First Slot in Frame |
| 1 | Second Slot in Frame |
| 2 | Third Slot in Frame |
| ... | ... |
| 15 | Last Slot in Frame |

OTA Map: Subframe Map:

| Bits | Octets |
|---|---|
| 8 7 6 5 4 3 2 1 | |
| Frame Subrate | 1 |
| Frame Phrase | 2 |
| Slot Phrase | 3 |
| Reserved | 4 |

OTA Map: Frame Subrate

The Frame Subrate fields sets the pace of the SST. It consists of a single byte which specifies the number of frames to be skipped between transmissions, plus 1. The value must satisfy:

$1 \leq$ Frame Subrate $\leq 32$

Implementation Note: Note all values for Frame Subrate need be legal. Currently, only values which are powers of 2—i.e., 2,4,8,16 and 32—are required. Other values may be supported as an implementation option.

OTA Map: Frame Phase

The Frame Phase field allows the BS to merge the MS into a specific slot in a channel shared by other MSs which are already in SST Mode. It consists of a single byte which specifies the number of frames to be skipped before the first transmission occurs. The value must satisfy:

$0 \leq$ Frame Phase $\leq 31$

OTA Map: Slot Phase

The Slot Phase field allows the BS to shift the MS's assigned slot into a channel shared with other MSs which are also in SST Mode. It consists of a single byte which identifies the relative offset of the assigned slot from the current slot (i.e., the slot the CT-HLD message was transmitted in. The value must satisfy:

$0 \leq$ Slot Phase $\leq 15$ with the restriction that if Frame Phase=0, Slot Phase must be $\geq$ b where n=2+VS (the VS bit in the BS header).

| Example: | |
|---|---|
| Substrate | 3 |
| Frame Phase | 2 |
| Time slot Phase | 4 |

The MS will wait two frames and four time slots before the first transmission. Subsequent transmissions will occur in the same time slot every fourth frame.

OTA Map Type [O]

The OTA Map Type Information element identifies the type of OTA Map to follow.

| Bits | Octets |
|---|---|
| 8 7 6 5 4 3 2 1 | |
| 8 bits of OTA Map type 1 | |

| OTA Map Type | Meaning |
|---|---|
| 0 | No Map |
| 1 | Superframe |
| 2 | Subframe |
| 3–256 | Reserved |

A Map Type of 0 indicates that the circuit is a single Channel, i.e., one slot per frame.

Page Group Activity [O]

The Page Group Activity information element indicates, in each paging roll, which of the 8 Page Groups—one corresponding to each bit in the information element—are currently active, i.e., have an active page for at least one member MS of the page group. The BS and MS determine which Page Group a particular MS belongs to using the same algorithm used for the Leveling Bits field in the BS Capabilities Information element.

| Bits | Octets |
|---|---|
| 8 7 6 5 4 3 2 1 | |
| Page Group Activity Bits | 4 |

Paging/Broadcast Countdown [O]

The Paging/Broadcast Countdown information element will appear in the D Channel of all CT-GPO (General Poll) messages. It will indicate the time, in frames, until the next Frame in which a Paging Cycle or a Broadcast Cycle will start. The high order bit might be used to distinguish between a Paging Countdown and a Broadcast Countdown if such distinction proves desirable.

Since this feature has not yet been implemented, this field will always contain 0-which is basically the same as "now."

```
              Bits                    Octets
   8   7   6   5   4   3   2   1
   | Paging/Broadcast Countdown |      4
```

PID [O,M,N,I]

This information element is the personal identification number associated with this MS. The low order byte defines the PID Type. The identifier is represented by the following 64 bits. The low order bit of the 64 bit number resides in Bit 1 of Octet 2 while the high order bit of the 64 bit number resides in Bit 8 of Octet 9.

If the PID Type is absolute, the PID absolutely and uniquely identifies the MS. This number is 72 bits long.

```
              Bits                    Octets
   8   7   6   5   4   3   2   1
   |         PID Type            |      1
   |     64 bit of PID Number    |      2
   |             •               |      4
   |             •               |
   |             •               |
   |                             |      9
```

PID Type

| PID Type | Meaning |
|---|---|
| 0 | None |
| 1 | Permanent PID |
| 2 | Temporary PID |
| 3 | ESN |
| 4 | UPT# |
| 5 | HRef |
| 6–255 | Reserved |

In DCS1900 Systems, the Permanent PID associated with an MS is its IMSI.

In DCS1900 Systems, the Temporary PID associated with an MS is its TMSI. The Temporary PID will be the PID of choice—if is exists—to protect user confidentiality.

IN DCS1900 Systems, the ESN associated with an MS is its IMEI.

A PID of Type =HRef occurs in only limited cases:

1. In a Specific Poll for the MS from the BS during an Originating Handover.
2. In a Release Link (in either direction) during an Originating Handover (if the Originating Handover fails).
3. In Handover Request and Handover Request Reply messages.

PID Number

A number which uniquely—within the PID Type—identifies the MS. If the PID type is 0 (Permanent PID) or 2 (ESN), the format is:

```
              Bits                    Octets
   8   7   6   5   4   3   2   1
   |         PID Type            |      1
   |   number of digits | digit 1 |     2
   |   digit 3          | digit 2 |     3
   |   digit 5          | digit 4 |     4
   |   digit 7          | digit 6 |     5
   |   digit 9          | digit 8 |     6
   |   digit 11         | digit 10|     7
   |   digit 13         | digit 12|     8
   |   digit 15         | digit 14|     9
```

If the PID type is 1 (Temporary PID) or 4 (HRef), the format is:

```
              Bits                    Octets
   8   7   6   5   4   3   2   1
   |         PID Type            |      1
   |     identifier octet 1      |      2
   |     identifier octet 2      |      3
   |     identifier octet 3      |      4
   |     identifier octet 4      |      5
   |          reserved           |      6
   |          reserved           |      7
   |          reserved           |      8
   |          reserved           |      9
```

If the PID type is 3 (UPT#), the format is <TBD>.

PLMN (Public Land Mobile Network)

The PLMN (Public Land Mobile Network) uniquely identifies the operator of the network. It consists of the MCC and MNC. The PLMN occupies the first three Octets of the Zone Information Element; it never appears as a distinct information element in any Note.

```
              Bits                    Octets
   8   7   6   5   4   3   2   1
   |     16 bits of unique MCC   |      1
   |                             |      2
   |     8 bits of unique MNC    |      3
```

Poll Type [O, M]

The Poll Type information element identifies the reason that the Poll was issued.

| Value | Meaning |
|---|---|
| 0 | Specific poll during Link Establishment |
| 1 | Specific Poll during Handover |
| 2 | Specific Poll during Lost Link Recovery |
| 3 | Transaction Acknowledged |
| 4 | Page Pending |
| 5 | Cl Reassignment |
| 6–255 | Reserved |

Transaction Acknowledged is a special case of a Specific Poll during Link Establishment. It tells the MS that the transaction requested by the Transaction Hint in the CT-GPR is complete and that there is no need for further communication.

Page Pending is the only Poll Type allowed for a CT-PRO. It can also appear in a CT-SPO if there is a Page Pending when one of the other Poll Types would normally have been sent.

Protocol [N, I]

The protocol information element identifies the signaling protocol.

| Bits | | | | | | | | Octets |
|---|---|---|---|---|---|---|---|---|
| 8 | 7 | 6 | 5 | 4 | 3 | 2 | 1 | |
| Protocol Identifier | | | | | | | | 1 |

| Protocol Identifier | Protocol |
|---|---|
| 1 | Notes_RMT signaling protocol |
| 2 | Notes_OAM signaling protocol |
| 3–255 | Reserved |

Registration Info [O, M, N, I]

Registration Info contains information that is required by the System for registration. The precise format of the Registration Info depends upon the value of the System Type.

| Bits | | | | | | | | Octets |
|---|---|---|---|---|---|---|---|---|
| 8 | 7 | 6 | 5 | 4 | 3 | 2 | 1 | |
| 128 bits of Registration Info | | | | | | | | 1 |
| • | | | | | | | | 2 |
| • | | | | | | | | 3 |
| • | | | | | | | | 4 |
| • | | | | | | | | 5 |
| • | | | | | | | | 6 |
| • | | | | | | | | 7 |
| • | | | | | | | | 8 |
| • | | | | | | | | 9 |
| • | | | | | | | | 10 |
| • | | | | | | | | 11 |
| • | | | | | | | | 12 |
| • | | | | | | | | 13 |
| • | | | | | | | | 14 |
| • | | | | | | | | 15 |
| • | | | | | | | | 16 |

Registration Info for DCS1900 Systems

For DCS 1900 Systems, the Zone of the BS on which the MS was previously registered must be provided so the MSC can locate the appropriate VLR for TMSI validation.

The Message Type is included because the Send Sequence Number is embedded within it.

The Location Updating Type is a DCS1900 field; its format is defined in the DCS1900 Location Updating DTAP message. It is included because one sub-field is the Follow On Request bit. It also contains the LUT, which is useful to the BCS when it is formulating the Locating Updating DTAP message.

| Bits | | | | | | | | Octets |
|---|---|---|---|---|---|---|---|---|
| 8 | 7 | 6 | 5 | 4 | 3 | 2 | 1 | |
| 40 bits (Old) Zone | | | | | | | | 1 |
| • | | | | | | | | 2 |
| • | | | | | | | | 3 |
| • | | | | | | | | 4 |
| • | | | | | | | | 5 |
| 8 bits Message Type (including Send Sequence Number) | | | | | | | | 6 |
| 8 bits Location Updating Type | | | | | | | | 7 |
| 72 bits Reserved | | | | | | | | 8 |
| • | | | | | | | | 9 |
| • | | | | | | | | 10 |
| • | | | | | | | | 11 |
| • | | | | | | | | 12 |
| • | | | | | | | | 13 |
| • | | | | | | | | 14 |
| • | | | | | | | | 15 |
| • | | | | | | | | 16 |

Registration Info For Bellcore Generic C Systems

For Bellcore Generic C Systems, the required registration information consists of the MS's UPT# and ESN.

| Bits | | | | | | | | Octets |
|---|---|---|---|---|---|---|---|---|
| 8 | 7 | 6 | 5 | 4 | 3 | 2 | 1 | |
| 64 bits of ESN | | | | | | | | 1 |
| • | | | | | | | | 2 |
| • | | | | | | | | 3 |
| • | | | | | | | | 4 |
| • | | | | | | | | 5 |
| • | | | | | | | | 6 |
| • | | | | | | | | 7 |
| • | | | | | | | | 8 |
| 64 bits reserved | | | | | | | | 9 |
| • | | | | | | | | 10 |
| • | | | | | | | | 11 |
| • | | | | | | | | 12 |
| • | | | | | | | | 13 |
| • | | | | | | | | 14 |
| • | | | | | | | | 15 |
| • | | | | | | | | 16 |

Registration Result Code [O, M, N, I]

The Registration Result Code Information Element contains network specific information concerning the Registration Result.

| Bits | | | | | | | | Octets |
|---|---|---|---|---|---|---|---|---|
| 8 | 7 | 6 | 5 | 4 | 3 | 2 | 1 | |
| 8 bits of Registration Result Code | | | | | | | | 1 |

For DCS1900 Systems, the Registration Result Code has the same values as the 'GSM Values' column of the table mapping GSM to Omnipoint values under the Cause Information Element.

Registration Status [O, M, N, I]

The Registration Status Information Element contains two subfield of information in addition to the Registration Status (the Omnipoint value of the Registration Result).

Format in O_Notes

| Bits | | | | | | | | Octets |
|---|---|---|---|---|---|---|---|---|
| 8 | 7 | 6 | 5 | 4 | 3 | 2 | 1 | |
| Page Pend | FOP | 6 Bits of Registration Status | | | | | | 1 |

Format in M, N, I_Notes

| Bits | | | | | | | | Octets |
|---|---|---|---|---|---|---|---|---|
| 8 | 7 | 6 | 5 | 4 | 3 | 2 | 1 | |
| | | 6 Bits of Registration Status | | | | | | 1 |

Page Pend

This field is only valid in the CT-RCP O_Note.

| Value | Meaning |
|---|---|
| 0 | There is no page pending |
| 1 | There is a page pending |

Registration Status: FOP (Follow On Proceed)

This field is only valid in the CT-RCP O-Note.

| Value | Meaning |
|---|---|
| 0 | Follow On Proceed Not Allowed |
| 1 | Follow On Proceed |

Registration Status Values

For DCS1900, the value of the Registration Status field is dependent upon whether the BSC received a Location Update Accept for Reject message.

| Location Update | Value | Registration Status |
|---|---|---|
| Accept | 0 | Accepted |
| <na> | 1 | Reserved |
| Reject | 2 | MS Rejected |
| Reject | 3 | PLMN Not Allowed |
| Reject | 4 | LAI Not Allowed |
| Reject | 5 | Network Failure |
| Reject | 6 | Other Error |
| <na> | 60–63 | Reserved for TRU Usage |

Registration Status for DCS 1900 Systems

The values for the Registration Status are derived from the DCS1900 Reject Cause values using the mapping table defined for the Cause information element.

Registration Timers [O]

The Registration Timer information element sets the intervals between Periodic Registrations.

| Bits | | | | | | | | Octets |
|---|---|---|---|---|---|---|---|---|
| 8 | 7 | 6 | 5 | 4 | 3 | 2 | 1 | |
| Network Interval | | | | Base Interval | | | | 1 |

| Value | Interval |
|---|---|
| Registration Timer: Base Interval | |
| 0 | |
| 1 | |
| 2 | |
| 3 | |
| 4 | |
| 5 | |
| 6 | |
| 7 | |
| 8 | |
| 9 | |
| A | |
| B | |
| C | |
| D | |
| E | |
| F | |
| Registration Timer: Network Interval | |
| 0 | |
| 1 | |
| 2 | |
| 3 | |
| 4 | |
| 5 | |
| 6 | |
| 7 | |
| 8 | |
| 9 | |
| A | |
| B | |
| C | |
| D | |
| E | |
| F | |

Registration Type [O, N, I]

The Registration Type identifies the type of registration. Registration is the result of either a position change (geographic) or the expiration of the registration timer (periodic).

| Bits | | | | | | | | Octets |
|---|---|---|---|---|---|---|---|---|
| 8 | 7 | 6 | 5 | 4 | 3 | 2 | 1 | |
| Registration Type | | | | | | | | 1 |

Registration Type

| Value | Type |
|---|---|
| 0 | Base Geographic Registration |
| 1 | Network Geographic Registration |
| 2 | Base Periodic Registration |
| 3 | Network Periodic Registration |
| 4 | Power Up |
| 5 | Request SBT (no Registration) |
| 6–255 | Reserved |

Remaining Base Count [O]

The Remaining Base Count specifies the number of bases in addition to the current one (the one specified in the CT-OHR message containing the Information Element) for which the MS intends to request an Originating Handover at this time.

| Bits | | | | | | | | Octets |
|---|---|---|---|---|---|---|---|---|
| 8 | 7 | 6 | 5 | 4 | 3 | 2 | 1 | |
| Remaining Base Count | | | | | | | | 1 |

Request PID Type [O, M, N, I]

The Request PID Type information element identifies the type of PID (i.e., the type of the identity element) being requested. The one octet information element has exactly the same values as the PID Type information element.

Reserved [O, M, N, I]

The Reserved information element represents unused space. All unused space is reserved for future use. All Reserved bits shall be set to zero by the transmitting station. All Reserved bits shall be ignored by the receiving station unless specifically defined otherwise.

Some information Elements contain Reserved subfields. The same comments about reserved bits apply.

Resource Request Data [O, M, N, I]

This 16 bit information element specifies the type of service being requested by the MS.

| Bits | | | | | | | | Octets |
|---|---|---|---|---|---|---|---|---|
| 8 | 7 | 6 | 5 | 4 | 3 | 2 | 1 | |
| DVS | | CRC-ARQ | | Symmetry | | Service Type | | 1 |
| (Maximum) Channel Rate | | | | (Minimum) Channel Rate | | | | 2 |

Resource Request Data: CRS-ARQ

| value | meaning |
|---|---|
| 00 | Neither CRC nor ARQ is in effect |
| 01 | Reserved |
| 10 | CRS in effect |
| 11 | CRS and ARQ in effect |

For DCS1900, the following values should be used:

| If DVS Value is | CRS-ARQ should be: | Meaning |
|---|---|---|
| 01 (voice) | 10 | CRC in effect |
| 10 (data) | 10 | CRC in effect |
| 11 (signaling) | 11 | CRC and ARQ in effect |

Resource Request Data: DVS

| value | meaning |
|---|---|
| 0 0 | Reserved |
| 0 1 | Voice service requested |
| 1 0 | Data service requested |
| 1 1 | Signaling service requested |

Resource Request Data: Service Type:

| Value | Meaning |
|---|---|
| 0 | Reserved |
| 1 | Normal Call |

-continued

| Value | Meaning |
|---|---|
| 2 | Emergency (911) |
| 3 | Packet Service (SS, SMS or Packet Data) |

Resource Request Data: Symmetry

| value | meaning |
|---|---|
| 00 | Symmetric Bandwidth |
| 01 | Maximum MS bandwidth minimum BS bandwidth |
| 10 | Maximum MS bandwidth minimum BS bandwidth |
| 11 | Variable symmetry |

For DCS1900, always use '00' (Symmetric Bandwidth).

SBT (Surrounding Base Table) [O]

The SBT contains information concerning the neighboring bases to the BS transmitting the SBT.

Because of the way frequencies and spreading codes are mapped, one base information element can identify both TRX units on a base which has 2 TRX units. Both TRX units will have the same spreading code; the frequencies of the two TRX units will be separated by 80 Mhz. The SBT will contain the lower of the two frequencies; the MS will compute the upper frequency.

| Bits | | | | | | | | Octets |
|---|---|---|---|---|---|---|---|---|
| 8 | 7 | 6 | 5 | 4 | 3 | 2 | 1 | |
| SBT Sequence # | | | | SBT Length | | | | 1 |
| Base 1 Info | | | | Base 1 Code Index | | | | |
| Base 1 Frequency Index | | | | | | | | 2 |
| Base 2 Info | | | | Base 2 Code Index | | | | |
| Base 2 Frequency Index | | | | | | | | 3 |
| • • • | | | | | | | | • • • |
| Base <SBT Length> Info | | | | Base <SBT Length> Code Index | | | | |
| Base <SBT Length> Frequency Index | | | | | | | | |

Note that the SBT is of variable length. When it occurs in the CT-RCP message, it can store a maximum of 7 base index pairs; when it occurs in the CT-BAI message, it can store a maximum of 8 base index pairs.

SBT: Base <i> Code Index

The code index of the <ith> surrounding base.

SBT: Base <i> Frequency Index

The frequency index of the <ith> surrounding base.

SBT: Base <i> Info

Information about Base <i> to help the MS Rank the base.

| Bits | | | | Meaning if Bit is Set |
|---|---|---|---|---|
| 8 | 7 | 6 | 5 | |
| 0 | 0 | 0 | 1 | This BS represents a Micro Cell |
| 0 | 0 | 1 | 0 | This BS is concentric with Current BS |
| 0 | 1 | 0 | 0 | Reserved |
| 1 | 0 | 0 | 0 | Reserved |

SBT: SBT Length

Defines the number of bases which are contained in this SBT segment.

SBT: Sequence #

If the number of surrounding bases exceeds the maximum that can be held in the message (7 in the case of CT-RCP), this number will indicate the number of following messages (CT-ASIs) required to transmit the rest of the data. The number will thus serve as:

An indication of the existence of more surrounding bases than will fit in the table.

A unique identifier of which subset of bases are contained in this SBT. E.g., a value of zero means this is the only (or last) set of SBT entries. A value of 2 means that there will be two additional SBT segments following the current one.

Search Type [M]

The Search Type information element specifies the type of search being requested.

| Bits | Octets |
|---|---|
| 8  7  6  5  4  3  2  1 | |
| 8 bits of Search Type | 1 |

| Value | Description |
|---|---|
| 0 | Specific PLMN |
| 1 | Specific PLMN; if not found give PLMN List |
| 2 | PLMN List |
| 3 | Specific Zone |
| 4 | Specific Zone; if not found give Zone List |
| 5 | Zone List |
| 6–255 | Zone List |

Search Time [M]

The Search Time Information element specifies the amount of time in milliseconds associated with a search request.

| Bits | Octets |
|---|---|
| 8  7  6  5  4  3  2  1 | |
| 32 bits of Search Time | 1 |
| | 2 |
| | 3 |
| | 4 |

Search Time: Search Request

The Search Time information element specifies the maximum amount of time to perform the requested search.

Search Time: Search Confirmation

The Search Time information element specifies the actual amount of time spent performing the requested search.

Service Provider [O, M]

This 16 bit information element, when present in a BS to MS signaling message, identifies the PCS service provider that operates the BS. When present in a MS to BS signaling message, it specifies the identification of the PCS service provider that the MS wishes to use.

Precisely what a Service Provider is and how the Service Provider's identity affects operations such as Slot Acquisition is currently not defined.

| Bits | Octets |
|---|---|
| 8  7  6  5  4  3  2  1 | |
| 16 bits of unique Service Provider Identification number | 1 |
| | 2 |

Set/Query [M]

The field will have a value of 0 to indicate that a query operation is to take place and a value of 1 to indicate that a set operation is to take place.

Slot Quality [O]

The Slot quality information element identifies the ratio frequency quality of the channel (time slot) in which the information element was received. To allow for flexibility, the meaning of the values is implementation specific.

| Bits | Octets |
|---|---|
| 8  7  6  5  4  3  2  1 | |
| 8 bits of Slot Quality | 1 |

| Value | Slot Quality |
|---|---|
| 0 | |
| 255 | |

System Type [O]

The System Type information element identifies the code set of the supporting infrastructure.

| Bits | Octets |
|---|---|
| 8  7  6  5  4  3  2  1 | |
| System Type | 1 |

| value | System Type |
|---|---|
| 0 | DCS1900 |
| 1 | Bellcore Generic C |
| 2–255 | Reserved |

TC Data [M, N, I]

The Data Information element contains upper layer Transport Channel data. If there are more than 19 octets of TC Data, the TC Data information element will be segmented into 19 octet Transport Data [O] segments for transfer over the 0 interface.

| Bits | Octets |
|---|---|
| 8  7  6  5  4  3  2  1 | |
| <DC Data Length> octets of CTC Data | 1 |
| | 2 |
| ... | 3 |
| | 4 |
| | variable |

Data Length [M, N, I]

The TC Data Length information element specifies the number of octets of TC Data to follow.

| Bits | Octets |
|---|---|
| 8  7  6  5  4  3  2  1 | |
| 16 bits of TC Data Length | 1 |

TCID [O, M, N, I]

The TCID (Transport Channel ID) information element specifies the Transport Channel to which data in the message belongs.

| Bits | | | | | | | | Octets |
|---|---|---|---|---|---|---|---|---|
| 8 | 7 | 6 | 5 | 4 | 3 | 2 | 1 | |
| Network Type | | | Application Instance | | | | | 1 |

When Transport Data is embedded in an O-Notes_RMT_CT-TRA message, the TCID is embedded in the Message Type. In this case:

- bit 8 of the Message Type is set to 1 (in all other cases it is set to 0).
- bits 1–7 identify the Transport Channel for the message data.

TCID: Network Type

The Network Type Field consists of 3 bits which are used to identify a particular external network to which the CCT system is connected.

| Value | Meaning |
|---|---|
| 0 | DCS1900 |
| 1 | Reserved |
| ... | ... |
| 6 | Reserved |
| 7 | OAM |

TCID: Application Instance

The Application Instance Field consists of 4 bits which are used to identify a particular Application Instance within the specified Network. For DCIS1900, the values are:

| Value | Meaning |
|---|---|
| 0 | CC/SS/MM |
| 1 | Reserved |
| 2 | Reserved |
| 3 | SMS |
| 4–15 | Reserved |

For OAM, the values are:

| Value | Meaning |
|---|---|
| 0–15 | |

Traffic Type [M]

The Traffic Type [M]

The Traffic Type information element specifies a type of B Channel traffic. (The values for Traffic Type are the same as those for the DVS field in the Resource Request Data Information Element.)

| Bits | | | | | | | | Octets |
|---|---|---|---|---|---|---|---|---|
| 8 | 7 | 6 | 5 | 4 | 3 | 2 | 1 | |
| 8 bits of Traffic Type | | | | | | | | 1 |

| Value(hex) | Description |
|---|---|
| 00 | Reserved |
| 01 | Voice |
| 02 | Data |
| 03 | Signaling |

Transport Data [O]

The Transport Data information element contains 17 bytes (152 bit) of application level data transferred between the MS and BS. It will either contain the same data as the TC Data [M, N, I] information element or will contain a 19 byte segment of that data. Segmentation is performed in the MS-OTA and BS-OTA

| Bits | | | | | | | | Octets |
|---|---|---|---|---|---|---|---|---|
| 8 | 7 | 6 | 5 | 4 | 3 | 2 | 1 | |
| 152 bits of Transport Data | | | | | | | | 1 |
| | | | | | | | | 2 |
| | | | • | | | | | |
| | | | • | | | | | |
| | | | • | | | | | |
| | | | | | | | | 10 |

Transport Retry Count [M]

The Transport Retry Count information element specifies the number of times to retry transmitting the data contained in the Transport_Req.

| Bits | | | | | | | | Octets |
|---|---|---|---|---|---|---|---|---|
| 8 | 7 | 6 | 5 | 4 | 3 | 2 | 1 | |
| 8 bits of Transport Retry Count | | | | | | | | 1 |

Transaction Hint [O]

The MS provides the Message Type of the first CT message it plans to send after it has acquired the link.

Transaction Hint Qualifier [O]

The MS provides additional information (not implicit in the Message Type) concerning the transaction it plans to perform.

Transaction Hint: RRQ (Registration Request) Qualifier

The MS will provide the Registration Type to allow the BS to know what kind of registration the MS will be requesting.

If the MS is requesting a Network Level Registration, the BS can use the MAP Information Elements in the CT-SPO message to put the MS directly into Slow Control Traffic.

If the MS is requesting a BS Level Periodic Registration, the BS can use the Cl and Cause Elements in the CT-SPO message to tell the MS that it is registered (the Cause IE) and that the BS does not expect to hear from it again for this transaction (C1 I1 set to zero).

Transaction Hint: SRWQ (Service Request) Qualifier

The MS will provide the Resource Request Data Information Element to allow the BS to know whether this is a 911 call or a normal call and the minimum and maximum acceptable Channel Rates for the call.

If the MS is requesting a 911 call and there is no channel available to put the call through, the BS can either:

1. use the Map Information Elements in the CT-SPO to put the MS directly into Slow Control Traffic—to wait for a channel to become available—or 2. Use the Cl and Cause Elements in the specific poll to tell the MS that it is queued and will be paged as soon as there is a channel available (the Cause IE) and that the BS does not expect to hear from it again until it is paged (Cl IE set to zero).

Transaction Hint: THR (Terminating Handover Request) Qualifier

The MS will provide the Resource Request Data Information Element to allow the BS to know whether this is a 911 call or a normal call and the minimum and maximum acceptable Channel Rates for the call.

Transport Method [O, M, N, I]

The Transport Method information element contains data to specify bandwidth, protocol and other control information for TRAUs. Its format differs based on the value of the DVS field in the Resource Request Data information element. If the DVS field indicates voice, then the format of Transport Method is:

| Bits | | | | | | | | Octets |
|---|---|---|---|---|---|---|---|---|
| 8 | 7 | 6 | 5 | 4 | 3 | 2 | 1 | |
| Speech Algorithm | | | | Reserved | | | | 1 |
| Reserved | | | | | | | | 2 |
| Reserved | | | | | | | | 3 |
| Reserved | | | | | | | | 4 |

If the DVS field indicates data, then the format of Transport method is:

| Bits | | | | | | | | Octets |
|---|---|---|---|---|---|---|---|---|
| 8 | 7 | 6 | 5 | 4 | 3 | 2 | 1 | |
| Network Rate Adaptation | | | | | | | | 1 |
| Reserved | | | | | | | | 2 |
| Reserved | | | | | | | | 3 |
| Reserved | | | | | | | | 4 |

Transport Method: Speech Algorithm

| Value | Meaning |
|---|---|
| 0 | |
| 1 | |
| 2 | |
| 3 | |

Transport Method: Network Rate Adaptation

| Value | Meaning |
|---|---|
| 0 | GSM Transparent 9.6 kbps |
| 1 | GSM Transparent 4.8 kbps |
| 2 | GSM Transparent 2.4 kbps |
| 3 | GSM Transparent 1.2 kbps |
| 4 | GSM Transparent 600 bps |
| 5 | GSM Transparent 1200/75 bps |
| 6 | GSM Non-Transparent 12 kbps |
| 7 | GSM Non-Transparent 6 kbps |

UPT [O, M, N, I]

This 80 bit information element is the Universal Personal Telecommunications number that has been granted to the subscriber operating the MS. This 80 bit number consists of 20 four-bit characters.

| Bits | | | | | | | | Octets |
|---|---|---|---|---|---|---|---|---|
| 8 | 7 | 6 | 5 | 4 | 3 | 2 | 1 | |
| 80 bits of Universal Personal Telecommunications Number | | | | | | | | 1 |
| | | | | | | | | 2 |
| • | | | | | | | | |
| • | | | | | | | | |
| • | | | | | | | | |
| | | | | | | | | 10 |

Zone [O, M, N, I]

The Zone and the Base ID combine to uniquely identify each Base Station in the world. The precise format of the Zone depends upon the value of System Type.

| Bits | | | | | | | | Octets |
|---|---|---|---|---|---|---|---|---|
| 8 | 7 | 6 | 5 | 4 | 3 | 2 | 1 | |
| 16 bits of unique MCC (octets 1 and 2 of PLMN) | | | | | | | | 1 |
| • | | | | | | | | 2 |
| 8 bits of unique MNC (octet 3 of PLMN) | | | | | | | | 3 |
| 16 bits of Network Specific Zone ID | | | | | | | | 4 |
| | | | | | | | | 5 |

Zone: PLMN

A first three octets of the Zone, uniquely identifies the operator of the network. This portion is called the PLMN (Public Land Mobile Network) and consists of the MCC and MNC.

Zone: DCS1900 Systems

For DCS1900 Systems, the zone is the Location Area Identifier (LA1); it consists of a 16 bit Mobility Country Code (MCC), an 8 bit Mobility Network Code (MNC) and a 16 bit Location Area Code (LAC).

| Bits | | | | | | | | Octets |
|---|---|---|---|---|---|---|---|---|
| 8 | 7 | 6 | 5 | 4 | 3 | 2 | 1 | |
| 16 bits of unique MCC (octets 1 and 2 of PLMN) | | | | | | | | 1 |
| • | | | | | | | | 2 |
| 8 bits of unique MNC (octet 3 of PLMN) | | | | | | | | 3 |
| 16 bits of unique LAC | | | | | | | | 4 |
| | | | | | | | | 5 |

Zone: LAC

The combination of the Base ID, MCC, MNC and LAC uniquely identify a given base station.

| Bits | | | | | | | | Octets |
|---|---|---|---|---|---|---|---|---|
| 8 | 7 | 6 | 5 | 4 | 3 | 2 | 1 | |
| 16 bits of Location Area Code | | | | | | | | 1 |
| | | | | | | | | 2 |

Zone: Bellcore Generic C Systems

| Bits | | | | | | | | Octets |
|---|---|---|---|---|---|---|---|---|
| 8 | 7 | 6 | 5 | 4 | 3 | 2 | 1 | |
| 40 bits | | | | | | | | 1 |
| | | | | | | | | 2 |
| | | | | | | | | 3 |
| | | | | | | | | 4 |
| | | | | | | | | 5 |

Procedures & Algorithms

This section describes procedures and algorithms which are integral to the OMNI_Notes protocols (common to O,M,N,I,). ARQ The ARQ, Automatic Repeat Request, mechanism provides a first level of protection against over-the-air errors. It relies on three one-bit fields in -the header of each O_Note packet:

1. B-Channel Enable,
2. ACK and
3. MSG#.

The D-Channel is always protected by ARQ. If the B-Channel Enable bit is set, then the B-Channel is also protected by ARQ. Other than determining the Channels protected, the bit has no impact on the ARQ mechanism. The term message designates—for this discussion of the ARQ mechanism—either the D-Channel or both the D- and B-Channels as determined by the B-Channel Enable bit.

If the incoming packet-the entire packet, not just the message-is error free, the receiver will set the ACK bit in its outgoing packet. If the incoming packet contains errors, of if there is no packet received when one is expected, the receiver clears the ACK bit-sets the NAK value-in its outgoing packet.

If the incoming packet is error free, the receiver compares the MSG# of the incoming message with the MSG# of the previously received message; if they are the same, the receiver ignores the new message (with the exception that if the new message is a CT-HLD, its SCT parameters will be checked for OTA mapping information).

If the incoming packet is error free and the ACK bit is set-indicating that the sender received the last message from the receiver without error, the receiver will complement—i.e., increment modulo 2—the MSG# bit and send the new message (i.e., the next message it has to send) in its outgoing packet.

If the incoming packet is error free and the ACK bit is cleared—indicating that the sender encountered some sort of error in the last message from the receiver—or if the incoming packet is not error free, or if no packet is received, the receiver will resend the same message and MSG# that it sent last time in its outgoing packet.

In the context of ARQ processing, the CT-HLD O_Note requires special handling. It is basically a filler and is transparent to ARQ; aside from being used to enter or change SCT it does not contain significant information and so it never needs to be re-transmitted. The MSG# bit is not complemented when CT-HLD messages are sent. (A CT-HLD message will never be sent when there is another message outstanding; this includes the case where the message is outstanding because it was not successfully ACKed in the ARQ response from the receiver. Thus, the receiver can ignore the CTHLD—after checking if for SCT information.) When the receiver would normally resend the old message and the last message it sent was a CT-HLD, it will transmit a new message if one has arrived. It will complement the MSG# bit for the new message; the receiver will see the message as a new message to the last message received before the CT-HLDs were sent.

In general:
 the setting of the ACK bit in the outgoing packet is determined by the error status of the incoming packet;
 the setting of the MSG# and the content of the message in the outgoing packet are determined by the state of the ACK bit in the incoming message;
 whether the incoming message—assuming it was error free-is accepted or ignored is determined by the value of the MSG# bit in the incoming packet (and how it compares with the MSG# bit of the previously received packet).

Channels and Data Rates

In a time division multiplexing system, a normal channel is composed of one slot per frame—i.e., the same slot each frame concatenated together over time. A channel supports a 9.6 KBPS circuit; the rate used for normal voice calls. The OMNI_Notes protocols support different circuit rates—both faster and slower—as well.

For certain applications it is desirable to transmit signalling information at faster or slower speeds than those available with one channel per time slot for each mobile station. Faster rates are achieved by combining 2 or more slots—the same slots each frame—into a circuit. This mechanism is called Aggregated Slot Traffic (AST).

Slower rates are achieved by skipping frames within a channel. These unused slots can be assigned to another MS, allowing the BS to interleave multiple MSs, each broadcasting at a slow rate, into the same channel. This mechanism is referred to as Slow Slot Traffic (SST).

Both AST and SST are controlled by the BS. Circuit rates for Bearer Traffic are negotiated between the MS and Network Applications and then requested of the OMNI pipe; circuit rates for Signaling Traffic are determined solely by the BS, although they may be requested by the MS. Once the rate has been determined, the BS assigns the appropriate OTA and backhaul resources and communicates these assignments to the appropriate entities within the OMNI pipe.

Note that the circuit rates and slot assignments for the Bearer and Signaling portions of a call are independent. For example, even though a call may be assigned a specific set of slots for AST Bearer Traffic, Signaling Traffic for the call may be either carried as SST or it may be carried as AST using a different set of slots.

Bearer Traffic

Once the BS has assigned the resources for the Bearer portion of a call, it will communicate the Backhaul Map to the BSC via the Service Information message and the OTA Map to the MS via the CT-STL message.

Since circuit rates other than 9.6 KBPS are normally used for data the descriptions of super- and sub-rate circuits are presented using data call terminology. This is not a protocol requirement, AST or SST circuits may be used for voice at the implementers option, although new vocoder algorithms will be needed on both the MS and the Network side.

Aggregated Data
SubRate Data
Signaling Traffic

Two types of Signaling Traffic are supported: Fast Control Traffic (FCT) and Slow Control Traffic (SCT); there is no normal rate as there is for Bearer Traffic. The "normal" Control Traffic rate is basically FCT with a Next Slot Pointer of zero (same slot, next frame).

There are no special backhaul resources assigned for Signaling Traffic-Signaling Traffic is transported through the single signaling channel which was set up when the BS and BSC initially established communications, so there is no backhaul assignment to communicate to the BSC.

The OTA resources assigned for Signaling Traffic are communicated to the MS via a mechanism dependent upon the type of signaling. FCT is dynamic. That is, there is no constant signaling rate, and the slot assignment for the next exchange is communicated to the MS via the Next Slot Pointer in the BS packet header. For SCT, the slot assignment is static (relatively) and is communicated to the MS via the CTSPO message when the circuit is established, or via a CT-HLD message if SCT is established or changed after the circuit is established. The Next Slot Pointer in each message does point to the next slot assigned for SCT, but the SCT rate may not be changed via this mechanism.

Both types of Control Traffic depend upon two features of the OMNI_Protocol: The Cl information element (which is essential for recovering from a missed packet) and the Next Slot Pointer (which tells the MS when the BS is expecting it to transmit). ARQ functions normally for both FCT and SCT.

Fast Control Traffic

Fast Control Traffic (FCT) is a method of accelerating signaling over the O-Interface C1. It is of maximum value for time-critical operations such as handovers; it is of limited use when the signaling extends beyond the 0 Interface in either direction.

FCT relies on several mechanisms: the Next Slot Pointer, the Cl and the ARQ. FCT differs from Bearer AST in that it is very dynamic rather than being static (occurring in predetermined slots). In each BS transmission, the packet header identifies the next slot in which the MS shall transmit. This is all there is to FCT when there are no errors.

Error Recovery

BS loses MS Message

When the BS detects an error in an FCT message from the MS, it uses the standard ARQ procedure to recover.

MS loses BS Message

When the MS detects an error in an FCT message from the BS, it cannot use the ARQ procedure because it has an additional problem: it does not know which slot to transmit in because it didn't receive a Next Slot Pointer. Instead, it goes into a mode where it scans every packet transmitted by the BS, looking for a packet containing Packet Type =Signaling and the Cl which was assigned to the MS at the beginning of the session. When it finds the packet, it knows that the BS did not receive a message from it, since it did not transmit in the first part of the slot. Thus, the BS will, using the ARQ algorithm, have re-sent the message that the MS missed. This also gives the MS a new Next Slot Pointer, so it now knows where to respond.

Since the MS also did not receive the ARQ bits in the lost packet, it does not know whether the BS received its last packet or not. (The ARQ bits in the current packet tell the MS that the ES did not receive the packet which the MS already knows it didn't send.) However, the MS has two pieces of information from which it can make some inferences:

1. it knows whether ft sent an ACK or NAK in the last message, and
2. it knows whether the MSG# just received from the BS matches the last MSG# received.
3. The following table shows how the MS can determine whether to re-send old message or re-send new message based on these two pieces of information.

| ACK/NA K last | MSG# match? | Did BS receive last message? |
|---|---|---|
| NAK | Different | Not a possible outcome: if it occurs, resend last message and report protocol violation to OAM&P. |
| NAK | Match | Don't know: re-send last message |
| ACK | Different | Last message was received, send new message |

-continued

| ACK/NA K last | MSG# match? | Did BS receive last message? |
|---|---|---|
| ACK | Match | Last message not received, re-send last message |

Having the new Next Slot Pointer and knowing whether to send a new message or resend the old message, the MS can now recover correctly from the lost message.

Slow Control Traffic

Slow Control Traffic (SCT) is a method of supporting a low-rate continuous signaling link. This provides the ability to multiplex several MSs involved in non-time-critical signaling sequences onto a single OTA channel to conserve bandwidth. This mechanism is used for registration and may be used for other activities if desired.

SCT is a special case of Slow Slot Traffic (SST). The BS can assign the MS to a subframe slot where the BS and MS both skip n ($1 \leq n. \leq 31$) frames between timeslots. This allows the BS to interleave several MSs which are in SCT Mode on the same timeslot.

BS Procedures

Timeslot Management is the key to both FCT and SCT. If the BS does not wish to implement the more complex Timeslot Management algorithm required for FCT or SCT, it can simply insure that Frame SubRate=0, Frame Phase=0 and Slot Phase=0.

There are a couple of comments concerning SCT, below.

If the Service Type of the Link indicates that a voice or data circuit may be established, it might be advisable to not enter SCT mode. Otherwise a call might be lost because there were no longer resources available when it is time to leave SCT mode. This would work for a single slot call; it would not solve the problem for an aggregated data call.

If the BS recognizes a registration, CT-RRQ, it should attempt to enter SCT mode.

If a hold sequence proves lengthy, the BS might enter SCT at a fast rate-say every second frame-and then gradually slow the rate as the cumulative number of sequential CT-HLDs increases.

MS Procedures

To support SCT, the MS must:

Recognize and record the Cl during Slot Acquisition and be capable of using it during error recovery, as it does for FCT.

Handle non-zero values of Frame SubRate, Frame Phase and Slot Phase and use them for Control Traffic, just as it does for Bearer Traffic.

Entering SCT Mode

SCT Mode can be activated only by the BS and only by sending an OTA Map specifying the desired rate in a CT-SPO or CT-HLD message. When the BS, by whatever heuristics it uses, decides it will be beneficial to put the MS into SCT, it will set the Frame SubRate and, optionally, the Frame Phase and Slot Phase fields in the OTA Map information element to non-zero values. The Next Slot Pointer in the header of the CT-SPO or CT-HLD message continues to point to an FCT slot. The MS and BS do not enter SCT Mode until the MS has signaled its acceptance of the SCT parameters by echoing them back to the BS in a CT-HLD message in the next FCT signaling slot. (If Frame Phase=0 it is legal for Slot Phase and Next Slot Pointer to point to the same slot, but until the BS receives the acknowledging CT-HLD message from the MS, it does not enter SCT mode.) The SCT parameters—Frame SubRate, Frame Phase and Slot Phase—are relative to the slot in which they are transmitted, even though SCT mode does not take effect until the MS has acknowledged.

When the BS receives the acknowledging CT-HLD message, it will respond with a CT-HLD in its portion of the slot and enter SCT mode. The MS will interpret the ARQ bits of this message from the BS to determine whether the BS received the MS's acknowledging CT-HLD. If the ARQ bits indicate success, the MS will also enter SCT mode. If the ARQ bits do not indicate success, or if the MS does not receive the message without error, it will begin SCT Error Recovery.

Maintaining SCT Mode

Once SCT Mode has been entered, the MS and BS will maintain SCT mode by exchanging signaling messages at the rate specified by the Frame SubRate. Each CT-HLD message exchanged shall contain the same value of Frame SubRate and the Frame Phase and Slot Phase fields will equal zero. In particular, each CT-HLD message contains the sender's current understanding of the SCT rate. If the values are not the same, it means that the transmitting side is requesting a change of SCT mode.

At some time while the MS and BS are in SCT, one or the other of them will have information (other than CT-HLDS) to transmit. These CT messages can be transmitted in SCT mode, in fact, the possibility exists that there will not be sufficient resources (time slots) available to exit SCT.

Changing SCT Rate

Once SCT mode has been established, the Frame Phase and Slot Phase fields in subsequent CT-HLD messages will typically be zero and the Frame SubRate will typically remain at the same value it had when SCT mode was established. It is possible that the BS may decide to either change the rate of the SCT while remaining within the same slot, or to shift the MS to another location in its slot map. It will do this by manipulating the values of the Frame SubRate, Frame Phase and Next Slot Pointer fields. As with initial entry to SCT mode, the change will not take place until acknowledged via a CT-HLD reflecting the new rate-by the MS. This has the implication that the BS must maintain both slot maps until it is clear that the MS has accepted the change.

Exiting SCT Mode

In order for the BS and MS to exit SCT mode, there must be resources available-i.e., there must be an available slot or slots that can be used for normal or FCT signaling. The balance of this section assumes that sufficient resources are available, see the discussion of SCT Error Recovery for system behavior when there are not sufficient resources to exit SCT mode.

If the BS determines that it is time to exit SCT mode, it will transmit a CT-HLD map with all of the SCT parameters-Frame SubRate, Frame Phase and Slot Phase-set to zero. When the MS acknowledges-with a CT-HLD message with the SCT parameters also set to zero-the BS will transmit whatever signaling message it has to transmit in the same slot as the MS's acknowledgment; the Next Slot Pointer in this message will indicate a slot within the next frame and the signaling will revert to FCT signaling.

MS Influences

Although the BS controls SCT Mode, the MS is capable of requesting SCT entry, exit or rate change:

If the MS and BS are in FCT mode, the MS can request entry of SCT mode by transmitting a CT-HLD message with a non-zero value of Frame SubRate. The MS will, if possible, honor the MS's request by invoking SCT at a rate as close as possible to that requested by the MS.

If the MS and BS are in SCT mode, the MS can request a rate change by transmitting a CT-HLD message with the desired Frame SubRate (different from the current frame subrate); it may not request a change in Frame Phase or Slot Phase. The BS will, if possible, honor the MS's request by initiating a change to a new subrate as close as possible to that requested by the MS.

If the MS and BS are in SCT mode, the MS can request exit from SCT mode by transmitting a CT-HLD message with the zero value for Frame SubRate. The MS will, if possible, honor the MS's request by exiting SCT.

In all cases, the MS will know whether the BS has accepted or rejected the request by the values of the SCT parameters received in the next error free CT-HLD message. The requested rate will not become effective until the MS has acknowledged the change by echoing the SCT parameters to the BS in its next CT-HLD message.

Error Recovery

Because of the potentially long intervals between message exchanges while in SCT, special error recovery procedures are required when an error occurs in SCT mode.

BS loses MS Message

If the BS loses an MS message while attempting to establish SCT mode, it will continue with the attempt to establish SCT mode. Repeated lost messages will eventually prompt normal Lost Link Recovery.

If the BS loses an MS message during SCT mode, it will 'increment its leaky bucket" and attempt another transmission during the next assigned SCT slot. If the leaky bucket overflows, it will implement normal Lost Link Recovery and begin transmitting Specific Polls for the MS in the assigned SCT slots until its Lost Link Recovery timer expires. The OTA Map in the CT-SPO message will determine the signaling rate to be used when the link is recovered.

MS loses BS Message

If the MS loses a message while attempting to establish SCT mode, it will attempt to recover using the same technique defined for FCT; it will begin scanning for CT messages containing its Cl. If it sees such a message, it can respond in the slot indicated by the Next Slot Pointer in the CT message. If it does not see such a message after a reasonable amount of time-the amount shall be provisionable with a default setting of 24 slots (1.5 frames)-it will attempt to re-establish the link by responding to a GPO with a CT-HLD message. The BS will recognize the Cl associated with the CT-HLD as belonging to an MS that it thinks it is communicating with in SCT mode and will respond accordingly (probably a CT-HLD with the appropriate SCT parameters).

If the MS loses a message during SCT mode, it will increment its 'leaky bucket' and attempt another transmission during the next assigned SCT slot-this is why the BS must preserve the SCT map for this MS until it has 1) re-established the link, 2) gotten solid confirmation that the MS is switching to a different SCT map, or 3) given up after Lost Link Recovery. If the leaky bucket overflows, it will implement normal Lost Link Recovery, either initiating a handover, if appropriate, or searching for Specific Polls until its Lost Link Recovery timer expires.

No Slot Capacity to Exit SCT

If there are no available slots, then clearly the BS and MS cannot exit SCT mode. They will stay in SCT mode and continue signaling (non CT-HLD messages) until there are slots available. There is the risk that continuing to signal in SCT mode may cause timing problems for the higher level processes; if this occurs, the problems will be resolved by the higher level processes.

Technical Appendices

The disclosure herein is supplemented by material appearing in Technical Appendices A through G, each of which is hereby incorporated by reference as if set forth fully herein. No prior art admission is made with respect to the material appearing in any of the Technical Appendices.

Alternative Embodiments

While preferred embodiments are disclosed herein, many variations are possible which remain within the spirit and scope of the invention. Such variations would become clear to one of ordinary skill in the art after inspection of the specification, drawings and claims herein. The invention therefore is not to be restricted except by the scope of the appended claims.

What is claimed is:

1. A communication system comprising
   a base station, said base station comprising a base station transceiver, a dual access memory; a line card controller, and an over the air controller;
   a plurality of user stations, said user stations comprising a user station transceiver capable of receiving signals from said base station transceiver, said base station and said user station comprising circuitry for establishing a time frame comprising a plurality of time slots;
   said dual access memory comprising a first input and a second input, said first input coupled to said line card controller and said second input coupled to said over the air controller;
   said base station comprising a fast traffic control mode and a slow traffic control mode; said fast traffic control mode comprising transmission of control traffic signals between said base station transceiver and said user station transceiver in one or more time slots within a single time frame and said slow traffic control mode comprising transmission of control traffic signals between said base station transceiver and said user station transceiver a maximum of once per time frame and wherein said base station sets the rate of exchange of control traffic signals over time frames in said slow traffic control mode said transmission of control traffic signals between said base station transceiver and said user station transceiver in said slow traffic control mode need not occur in every successive timeframe.

2. The communication system of claim 1 wherein said control traffic signals comprise information directing said user station to exchange signals in said slow traffic control mode.

3. The communication system of claim 2 wherein a user station control traffic transmission comprises a signaling message comprising information requesting said base station to exchange signals in said slow traffic control mode.

4. The communication system of claim 1 wherein said control traffic signals comprise a message including information setting the rate of said exchange of signaling messages over a number of consecutive time frames.

5. The communication system of claim 1 wherein said control traffic signals comprises information for determining the quality and position of time slots to be used for said exchange of signaling messages in said fast traffic control mode.

6. A communication system comprising
   a base station,
   a first user station wherein said first user station and said base station periodically exchange traffic control information using a periodic time frame, said periodic time frame comprising one or more time slots,
   said periodic exchange of traffic control information at times occurring in a single time slot within a time frame, and
   at times occurring at a rate of once every other time frame.

7. The communication system of claim 6 wherein said periodic exchange of traffic control information comprises a base station transmission comprising information for adjusting said rate of said exchange of traffic control information.

8. The communication system of claim 6 further comprising
   a second user station which periodically exchanges traffic control information with said base station, wherein
   said periodic exchange of traffic control information between said base station and said second user station occurs in the same time slot as said time slot used by said first user station and said base station, and wherein
   said periodic exchange of traffic control information between said base station and said second user station occurs in a periodic time frame different from said periodic time frame wherein said periodic exchange of traffic control information between said base station and said first user station occurs.

9. The communication system of claim 6 wherein the number of consecutive time frames in which said periodic exchange of traffic control information does not occur is not greater than thirty-one.

10. A communication system comprising
    a base station, and
    a plurality of user stations, wherein
    each of said user stations exchanges control signals with said base station in a single time slot within a periodic time frame, and wherein
    said exchange of control signals between said base station and each respective user station occurs no more frequently than every other periodic time frame.

11. The communication system of claim 10 wherein at least two of said users stations alternately exchange control signals with said base station using the same time slot in a different time frame.

12. The communication system of claim 11 wherein the number of said user stations exceeds the number of available time slots within said periodic time frame.

13. A communication system for dynamically varying the transmission of signaling information, comprising
    a base station,
    a user station, and
    a signaling link between said base station and said user station, said signaling link comprising
    a first exchange of signaling information between said base station and said user station in a plurality of time slots in a first periodic time frame, wherein
    said first exchange of signaling information comprises a base station transmission comprising information data for determining the number and position of time slots to be used in a second time frame for a second exchange of signaling information.

14. The communication system of claim 13 further comprising
    a second exchange of signaling information between said base station and said user station in a second time frame using said time slots determined by said information data in said base station transmission in said first time frame.

15. The communication system of claim 14 wherein said number of said time slots used for said second exchange of signaling information in said second time frame is greater than the number of said time slots used for said first exchange of signaling information in said first time frame.

16. A method for establishing a low rate continuous signaling link between a base station and a user station in a communication system, comprising the steps of transmitting in one or more time slots within a periodic time frame a first transmission from said base station to said user station, said transmission comprising a signaling message comprising both a command for said user station to acknowledge entry into said signaling link and data specifying the rate of exchange of signaling messages over a fixed number of time frames in said signaling link, receiving said first base station transmission at said user station, transmitting from said user station in one or more time slots within said time frame a user transmission comprising an acknowledgement of said command by said base station, receiving said user station transmission at said base station, and exchanging signaling messages periodically between said base station and said user station over the course of a plurality of time frames, said periodic exchange of said signaling messages occurring at said rate specified by said base station.

17. The method of claim 16 further comprising the step of transmitting from said base station within a time frame during said signaling link a signaling message which varies said rate of said periodic exchange of said signaling messages in said signaling link, said rate-varying signaling message comprising information specifying a new rate.

18. A method for establishing a low rate continuous signaling link between a base station and a user station in a communication system comprising transmitting in one or more time slots within a periodic time frame a first transmission from said base station to said user station, said transmission comprising a signaling message comprising both a command for said user station to acknowledge entry into said signaling link and data specifying the rate of exchange of signaling messages over a fixed number of time frames in said signaling link, receiving said first base station transmission at said user station, transmitting from said user station in one or more time slots within said time frame a user transmission comprising an acknowledgement of said command by said base station, receiving said user station transmission at said base station, exchanging signaling messages periodically between said base station and said user station over the course of a plurality of time frames, said periodic exchange of said signaling message occurring at said rate specified by said base station, and transmitting from said base station within a time frame during said signaling link a signaling message which varies the slot position used by said base station and said user station for said exchange of signaling messages in said signaling link, said slot-position varying signaling message comprising information specifying a new slot position.

19. A method for accelerating signaling information over a communication interface, said interface comprising a plurality of control messages transmitted and received by a base station and a user station in one or more time slots within a periodic time frame, comprising the steps of exchanging control messages between said base station and said user station in one or more slot positions in a first time frame, during said exchange in said first time frame, transmitting from said base station a control message comprising information for designating a plurality of available slot positions to be used for a second exchange in a succeeding time frame, and exchanging control messages between said base station and said user station in said designated slot positions in said succeeding time frame.

20. The method of claim 19, wherein the quantity of said designated plurality of slot positions in said subsequent time frame is greater than quantity of said one or more slot positions in said first frame.

* * * * *